US008397574B2

(12) United States Patent
Tanaka et al.

(10) Patent No.: US 8,397,574 B2

(45) Date of Patent: Mar. 19, 2013

(54) ULTRASONIC TRANSDUCER, ULTRASONIC PROBE, AND ULTRASONIC IMAGING DEVICE

(75) Inventors: Hiroki Tanaka, Kokubunji (JP); Takashi Azuma, Kodaira (JP); Hiroshi Fukuda, London (GB)

(73) Assignees: Hitachi, Ltd., Tokyo (JP); Hitachi Medical Corporation, Tokyo (JP)

( * ) Notice: Subject to any disclaimer, the term of this patent is extended or adjusted under 35 U.S.C. 154(b) by 678 days.

(21) Appl. No.: 12/064,158

(22) PCT Filed: Aug. 2, 2006

(86) PCT No.: PCT/JP2006/315314

§ 371 (c)(1), (2), (4) Date: Jul. 31, 2009

(87) PCT Pub. No.: WO2007/046180

PCT Pub. Date: Apr. 26, 2007

(65) Prior Publication Data

US 2009/0301200 A1 Dec. 10, 2009

(30) Foreign Application Priority Data

Oct. 18, 2005 (JP) ................................ 2005-303701
Mar. 2, 2006 (JP) ................................ 2006-056541

(51) Int. Cl.
*G01N 29/24* (2006.01)

(52) U.S. Cl. ........................................... 73/603; 73/596

(58) Field of Classification Search .................... 73/603, 73/596

See application file for complete search history.

(56) References Cited

U.S. PATENT DOCUMENTS 6,271,620 B1 * 8/2001 Ladabaum .................... 310/334
6,426,582 B1 7/2002 Niederer et al.
2002/0189375 A1 * 12/2002 Takeuchi et al. ................ 73/865
2004/0085858 A1 5/2004 Khuri-Yakub et al.

FOREIGN PATENT DOCUMENTS

| | | |
|---|---|---|
| JP | S30-2421 | 4/1955 |
| JP | 53-057022 | 5/1978 |
| JP | 57-010179 | 6/1980 |
| JP | 57-065096 | 4/1982 |
| JP | 61-103988 | 7/1986 |
| JP | 61-157100 | 7/1986 |
| JP | 01-319395 | 12/1989 |
| JP | 2002-330963 | 11/2002 |

(Continued)

OTHER PUBLICATIONS

M. Haller, et al., "A surface micromachined electrostatic ultrasonic air transducer", Proceedings of 1994 IEEE Ultrasonics Symposium, pp. 1241-1244.

(Continued)

*Primary Examiner* — John Fitzgerald
*Assistant Examiner* — Gregory J Redmann
(74) *Attorney, Agent, or Firm* — Antonelli, Terry, Stout & Kraus, LLP.

(57) ABSTRACT

An ultrasonic transducer (100) includes a substrate (1) having a first electrode therein or on a surface thereof and a diaphragm (5) having a second electrode therein or on a surface thereof, with a cavity (4) therebetween. Further, at least one beam (7) is provided on a surface or inside of the diaphragm (5) or the second electrode.

24 Claims, 33 Drawing Sheets

FOREIGN PATENT DOCUMENTS

| | | | |
|---|---|---|---|
| JP | 2002-360571 | | 12/2002 |
| JP | 2004-040620 | A | 2/2004 |
| JP | 2004-088739 | | 3/2004 |
| JP | 2004-350700 | | 12/2004 |
| JP | 2005-110204 | | 4/2005 |

OTHER PUBLICATIONS

Japanese Office Action, dated Dec. 7, 2010, issued in corresponding Japanese Patent Application No. 2007-540890.

* cited by examiner

ULTRASONIC TRANSDUCER, ULTRASONIC PROBE, AND ULTRASONIC IMAGING DEVICE

TECHNICAL FIELD

The present invention relates to a diaphragm type ultrasonic transducer, ultrasonic probe, and ultrasonic imaging device.

BACKGROUND ART

Mainstream transducers transmitting and receiving ultra sound transmit and receive ultra sound, using piezoelectric effect and inverse piezoelectric effect of a ceramic piezoelectric element represented by PZT (lead zirconate titanate). This type of piezoelectric ceramic ultrasonic transducer currently still constitutes the majority of ultrasonic transducers in practical use. However, to take the place of this type, research and development of diaphragm type fine ultrasonic transducers having a structure in micrometer order by a semiconductor micro processing technology has been carried out since the 1990's (refer to Non-patent Document 1).

In a typical structure of such a transducer (an ultrasonic transducer 100*p*) is, as shown in a cross-sectional schematic view in FIG. 40, a capacitor is formed by a bottom electrode 2 (which is an electrode on a substrate side and will be herein after also referred to also merely as an electrode 2) and a top electrode 3 (which is an electrode on an outer diaphragm layer 5*b* side and will be herein after also referred to merely as an electrode 3) which are provided respectively on a substrate 1 and on a flat outer diaphragm layer 5*b* with a cavity 4 therebetween.

Hereinafter, for brevity of description, the direction where the ultrasonic transducer 100*p* receives ultra sound (downward direction in FIG. 40) will be referred to as z direction, the right direction in FIG. 40 will be referred to x direction, and the perpendicular downward direction with respect to the sheet of FIG. 40 will be referred to as y direction.

As shown in FIG. 40, when a voltage is applied between the electrodes 2 and 3, charges in opposite electric polarities are induced on the electrodes and attract each other, which displaces the outer diaphragm layer 5*b*. In this situation, when the outer surface of the outer diaphragm layer 5*b* is in contact with water or an organism, sound waves are radiated into such medium. This is the principal of electro-acoustic (ultra sound) conversion in transmission. On the other hand, when a DC bias voltage is applied to induce a certain amount of charges on the electrodes 2 and 3, and oscillation is forcibly applied to the diaphragm from a medium in contact with the diaphragm layer 5*b*, thereby displacing the diaphragm layer 5*b*, then a voltage is additionally generated between the electrodes 2 and 3 in accordance with the displacement. This principle of acoustic (ultra sound)-electro conversion in reception is the same as that of a DC bias type capacitor micro-phone adopted as a micro-phone for an audible band.

In order to form ultrasonic beams, a number of the above described transducers are disposed and arrayed, as shown in FIG. 43, to be used. In FIG. 43, plural hexagonal ultrasonic transducers 100 are electrically connected by connection 13 arranged between ultrasonic transducers to form a single channel partitioned by shown dashed lines 20. Ultrasonic pulses are transmitted and received, utilizing ultrasonic transducers. Herein, in imaging tomography of a subject from echo signals, the flatter the frequency spectrum of the electromechanical conversion efficiency of the ultrasonic transducers, the narrower the pulse width with respect to the time axis, achieving higher resolution. Further, the degree of freedom in controlling a device is advantageously increased, an example of which is that different frequencies can be selected, depending on the distance from an ultrasonic transducer to a subject. Therefore, a method is disclosed, in Patent Document 1, to achieve a broadband by simultaneously driving ultrasonic transducers 100, as shown in FIG. 44, having respective diaphragms in different diameters, the ultrasonic transducers being connected by connections therebetween to serve as a single element 14.

Further, Patent Document 2 discloses a capacitive ultrasonic transducer reinforced by a stiffing layer at the central portion of a film.

Still further, Patent Document 3 discloses an acoustic transducer with a structure, arranged above a cavity, having an insulating layer part and a top electrode which are disposed within the thickness dimension of a film.

Non-patent Document 1: "A surface micromachined electrostatic ultrasonic air transducer", Proceedings of 1994 IEEE Ultrasonics Symposium, pp. 1241-1244

Patent document 1: the specification of U.S. Pat. No. 5,870,351

Patent document 2: the specification of U.S. Pat. No. 6,426,582

Patent document 3: the specification of U.S. Pat. No. 6,271,620

DISCLOSURE OF THE INVENTION

Problems to be Solved by the Invention

However, in the technology disclosed in Patent Document 1, as shown in FIG. 44, an ultrasonic probe configured with diaphragms in polygonal or circular shapes in different sizes packed in an area inevitably has gaps between ultrasonic transducers. These gaps make a problem of deteriorating the performance of the ultrasonic probe due to the following two causes. First, a decrease in the effective element area drops the effective sensitivity for transmission and reception of waves. Second, if a portion of the element, the portion being provided with no diaphragm, is exposed in the aperture, of the ultrasonic probe, for transmission and reception of waves, a sound having entered through the portion into the substrate causes a reverberant sound and a false image on a diagnosis image. Reverberant sound may also be caused by the phenomenon that an ultra sound from a diaphragm passes through a portion not formed with a diaphragm, and this propagated ultra sound is reflected by the edge of an adjacent ultrasonic transducer, and finally returns to the original diaphragm.

Further, regarding transducer arrays, in general, the upper limits of the sizes of respective ultrasonic transducers are defined by the disposition pitch for which diffraction of ultra sound and the like is taken into account, and the lower limits of the sizes are defined from a point of view of securing radiation impedance which achieves a required radiation efficiency. Therefore, the sizes of these ultrasonic transducers are selected usually from a narrow range in designing.

Still further, since a semiconductor manufacturing technology is used for the above described conventional electrostatic transducer (described in Non-patent Document 1), masks corresponding to the planar shapes of diaphragms are used in a manufacturing process. There is a method of changing the frequency spectrum of a diaphragm, which changes the size (planar shape) of the diaphragm. However, it is necessary to design and manufacture a new mask for this method, which requires time and cost, causing a problem of decreasing the manufacturing efficiency.

Yet further, another method of changing the frequency spectrum of a diaphragm changes the thickness of the diaphragm. However, as described above, as the size of a diaphragm is limited in a narrow range, the thickness of the diaphragm which achieves a desired center frequency is substantially uniquely determined. Then, the size and thickness of the diaphragm define the sensitivity and fractional bandwidth of this ultrasonic transducer. Consequently, there has been a problem that a desired frequency spectrum, namely, a combination of a center frequency and a fractional band width cannot be realized.

Further, for the above described conventional capacitive ultrasonic transducer (refer to Patent Document 2), a diaphragm is reinforced by a stiffing layer. However, even obtaining a desired center frequency by arranging a stiffing layer, there has been a problem that the fractional bandwidth is automatically defined and a desired frequency spectrum cannot be achieved.

Still further, for the above described conventional acoustic transducer (described in Patent Document 3), a top electrode is arranged inside a diaphragm. Consequently, although the sensitivity may be improved, there has been a problem that means for obtaining a desired frequency spectrum is not provided, either.

Addressing problems, as described above, an object of the present invention is to provide an ultrasonic transducer, ultrasonic probe, and ultrasonic imaging device having a simple structure and being capable of improving the performance of transmission and reception of ultra sound.

Means for Solving the Problems

An ultrasonic transducer in accordance with the invention includes a substrate having a first electrode inside thereof or on a surface thereof and a diaphragm having a second electrode therein or on a surface thereof, the substrate and diaphragm being disposed with a cavity therebetween.

The ultrasonic transducer is provided with at least one beam on a surface or inside of the diaphragm or the second electrode.

Other means will be described in embodiments described later.

Effects of the Invention

According to the present invention, an ultrasonic transducer, ultrasonic probe, and ultrasonic imaging device are provided which have a simple structure and are capable of improving the performance of transmission and reception of ultra sound are provided.

DESCRIPTION OF REFERENCE SYMBOLS

Figure 1:
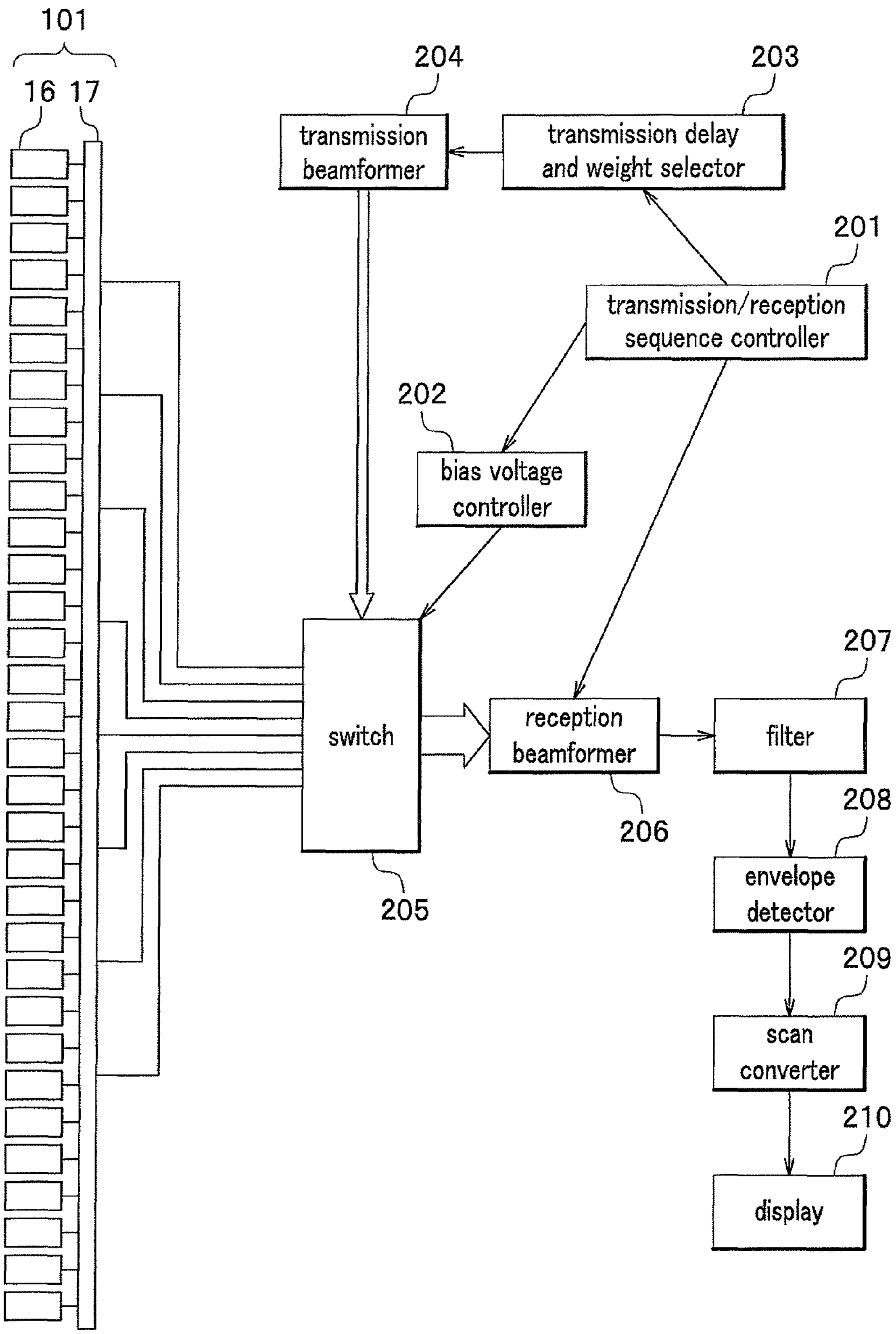
FIG. 1 is a diagram showing an example of a structure of an ultrasonic imaging device in a first embodiment.

1 substrate
2, 3 electrode
4 cavity
5 diaphragm
7 beam
13 connection
14 element
17 switch
100 ultrasonic transducer
1000 transducer array

BEST MODE FOR CARRYING OUT THE INVENTION

Now, embodiments in accordance with the present invention will be described in details, referring to FIGS. 1 to 42 and FIGS. 44 to 46.

Hereinafter, "a converter between electricity and ultra sound" will be referred to as "an ultrasonic transducer", "a group of plural ultrasonic transducers in an array" as "a transducer array", and "a member that has plural transducer arrays and transmits and receives ultra sounds to and from a specimen" as "an ultrasonic probe". Further, "an ultrasonic imaging device" will represent "an imaging device by the use of ultra sound provided with an ultrasonic probe, image former (means for forming an image from a signal obtained by an ultrasonic probe), display (means for displaying an image), controller, and the like".

(First Embodiment)

FIG. 1 is a diagram showing an example of a structure of an ultrasonic imaging device using ultrasonic transducers in a first embodiment. Referring to FIG. 1, the operation of the ultrasonic imaging device will be described.

Based on control by a transmission/reception sequence controller 201 programmed in advance, a transmission delay and weight selector 203 selects the values of a transmission delay time and a weight function for each channel to be supplied to a transmission beam-former 204. According to these values, the transmission beam-former 204 supplies an electro-acoustic conversion element 101 with transmission pulses through plural switches 205 for switching transmission/reception waves. Herein, an electro-acoustic conversion element 101 is also applied with a bias voltage by a bias voltage controller 202. As a result, the electro-acoustic conversion element 101 transmits ultra sound to a specimen, not shown here.

Then, the ultra sounds having been reflected by scatterers in the specimen and thereby reflected are partially received back by the electro-acoustic conversion element 101. A transmission/reception sequence controller 201 then controls a reception beam-former 206 after a predetermined time has elapsed from the timing of transmission so as to start a reception mode. The predetermined time described above, in a case of obtaining an image from a depth of a specimen deeper than 1 mm for example, is the turn around time for a sound to return a distance of 1 mm. The mode does not change to the reception mode immediately after transmission because the amplitude of the reception voltage is extremely smaller than the amplitude of the transmission voltage, being one hundredth to one thousandth. The reception beam-former 206 continuously controls the delay time and a weight function, corresponding to the arrival time of each reflected ultra sound, which is so-called a dynamic focus. Data after dynamic focus is converted into an image signal by image forming means including, for example, a filter 207, envelope detector 208, and scan converter 209, and then displayed on a display 210 as an ultrasonic tomographic image.

One of the basic characteristics which are significant in putting ultrasonic transducers in various practical uses is frequency spectrum represented by a center frequency and a fractional bandwidth. A center frequency $f_c$ is a frequency with the highest electromechanical conversion efficiency (sensitivity). A fractional bandwidth $f_h$ is, for example in a case of 3 dB width, defined as a difference between two frequencies divided by the center frequency, wherein the sensitivity at these two frequencies is 3 dB lower than the sensitivity at the center frequency. If the fractional bandwidth is wider, a single ultrasonic transducer can be used for more various frequency bands, or ultrasonic pulses with a shorter time width can be formed, which achieves advantageous characteristics, such as obtaining a high distance resolution in a case of imaging by the use of ultrasonic beams. The center frequency $f_c$ of a diaphragm type ultrasonic transducer is substantially equal to the value of resonance frequency of the diaphragm, and is accordingly represented by following Expression (1), while the fractional bandwidth $f_h$ is represented by Expression (2), wherein the stiffness and the mass of the diaphragm are represented respectively by D and m.

$$f_c \propto \sqrt{\frac{D}{m}} \tag{1}$$

$$f_h \propto \frac{1}{\sqrt{Dm}} \tag{2}$$

The stiffness and mass of an oscillation diaphragm are determined by the shape and dimensions of the oscillation diaphragm and the thickness thereof in a case of a solid material. Accordingly, in principle, by defining a proper shape and thickness of an oscillation diaphragm, a desired frequency spectrum can be obtained. However, only the two-degree-of-freedom of D and m for designing is not enough to optimize the three parameters of the center frequency, maximum value of sensitivity and fractional bandwidth.

An ultrasonic probe for an ultrasonic imaging device for photographing common two-dimensional tomographic images performs fixed focusing by an acoustic lens in the direction (short axis direction) perpendicular to the tomographic plane, and performs electronic focusing of an ultrasonic beam at a desired position on the tomographic plane, having arrayed oscillators arranged in the direction (long axis direction) along the tomographic plane. In order to form excellent ultrasonic beams, ultrasonic transducers are arrayed ideally with a width of approximately a half of the wavelength at the center frequency of beams. For example, with a center frequency of 5 MHz, ultrasonic transducers are arrayed with a width of approximately 0.15 mm. In the short axis direction, the wider the width of an ultrasonic transducer is, the narrower the beam width at the focus is, achieving a tomographic image with a higher space resolution. However, if the focus region of the fixed focus on the short axis is too narrow, it is difficult to control the focus region by electronic focusing on the long axis. Further, also in viewpoint of usability in operation by pressing the ultrasonic probe on an affected area, such as a gap between costae of a patient, the width along the short axis is preferably 7 to 8 mm.

That is, since the size of an electric element is approximately 7 to 8 mm×0.15 mm, in a case where the diameter of a diaphragm is approximately 50 μm for example, 450 (150×3=450) diaphragms are used in a state of being disposed in a single electric element. By changing the shape and material of each of the several hundred diaphragms, the fractional bandwidth of the entire single electric element can be designed more freely. There is a degree of freedom for the shape and material in principle. However, in a practical semiconductor process, a layer structure is formed on a substrate, layer by layer, it is not realistic to change the material for each transducer adjacent to one another, and it is also difficult to change the thickness of diaphragms. As a result, designing a desired fractional bandwidth by changing the diameters of diaphragms is the most practical method.

Figure 44:
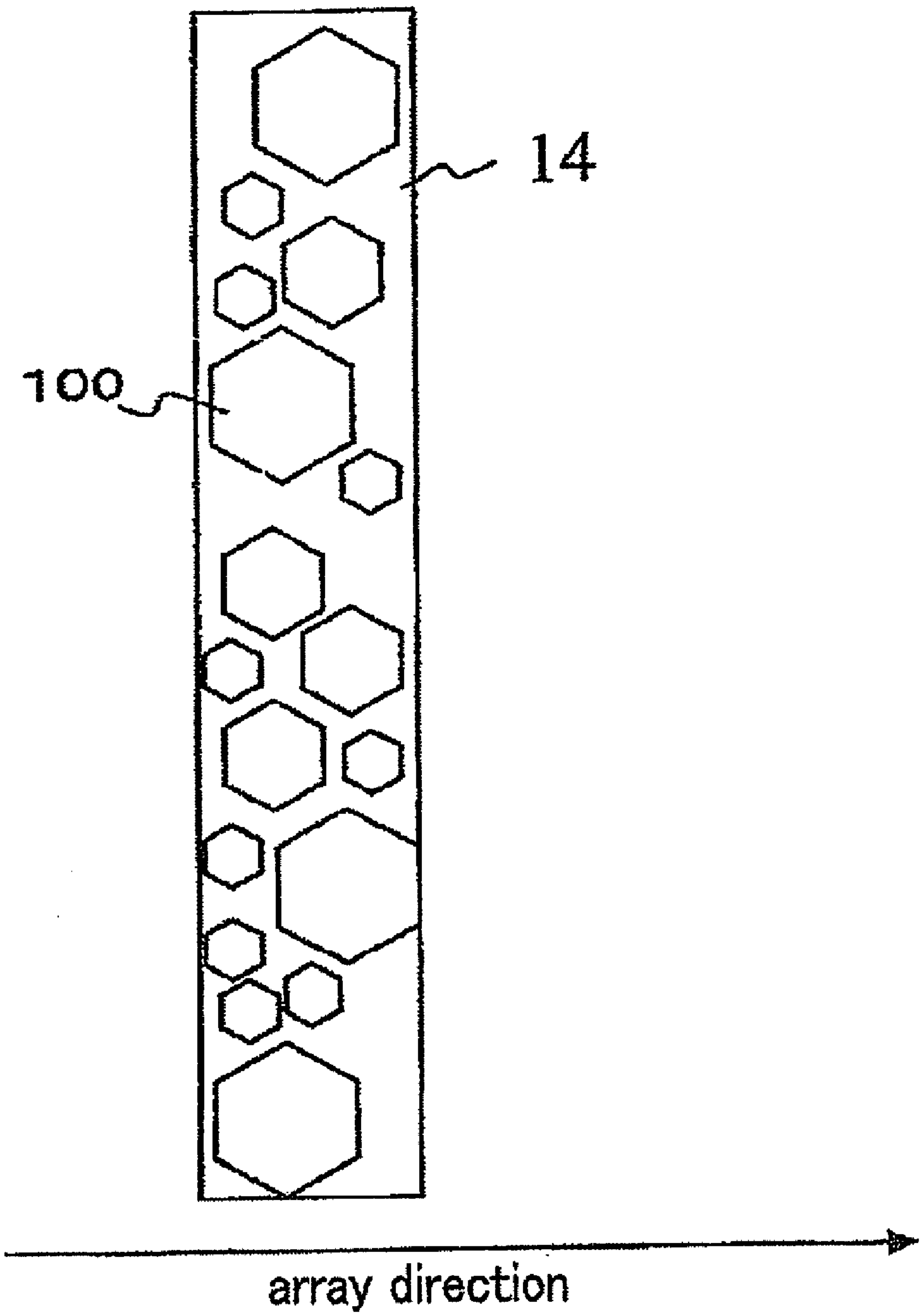
FIG.44 PRIOR ART
FIG. 44 is a diagram illustrating an ultrasonic transducer in which diaphragms with different diameters are disposed.
Figure 45:
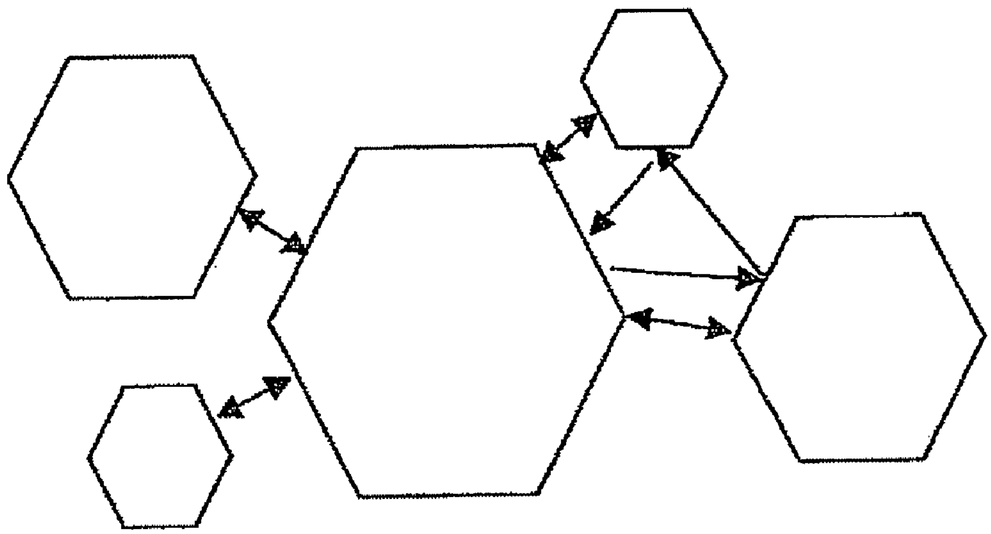
FIG. 45 is a diagram illustrating the path of an ultra sound reflecting between diaphragms.

In the specification of U.S. Pat. No. 5,870,351 (Patent Document 1), an example, as shown in FIG. 44, is disclosed where a number of hexagonal shapes of diaphragms with different diameters are disposed in a single element which are electrically connected. However, when circles or polygonal shapes with different diameters are packed in an area, there arises a problem that the packing efficiency drops. To be more significant than the problem of drop in the sensitivity due to the drop in the ratio of "diaphragm area/entire element area", the pulse response of the element is greatly affected. This deterioration of pulse response will be described, referring to FIG. 45. As shown in FIG. 45, when plural diaphragms in hexagonal shapes in different sizes are disposed, the total length of a path (arrow in the figure) on which an ultrasonic wave passes from one diaphragm through spaces where no diaphragm is formed, gets reflected by the surfaces of diaphragms adjacent to the one diaphragm, and returns to the one diaphragm is longer than in a case where hexagonal diaphragms with the same diameter are packed to form an array.

Figure 2:
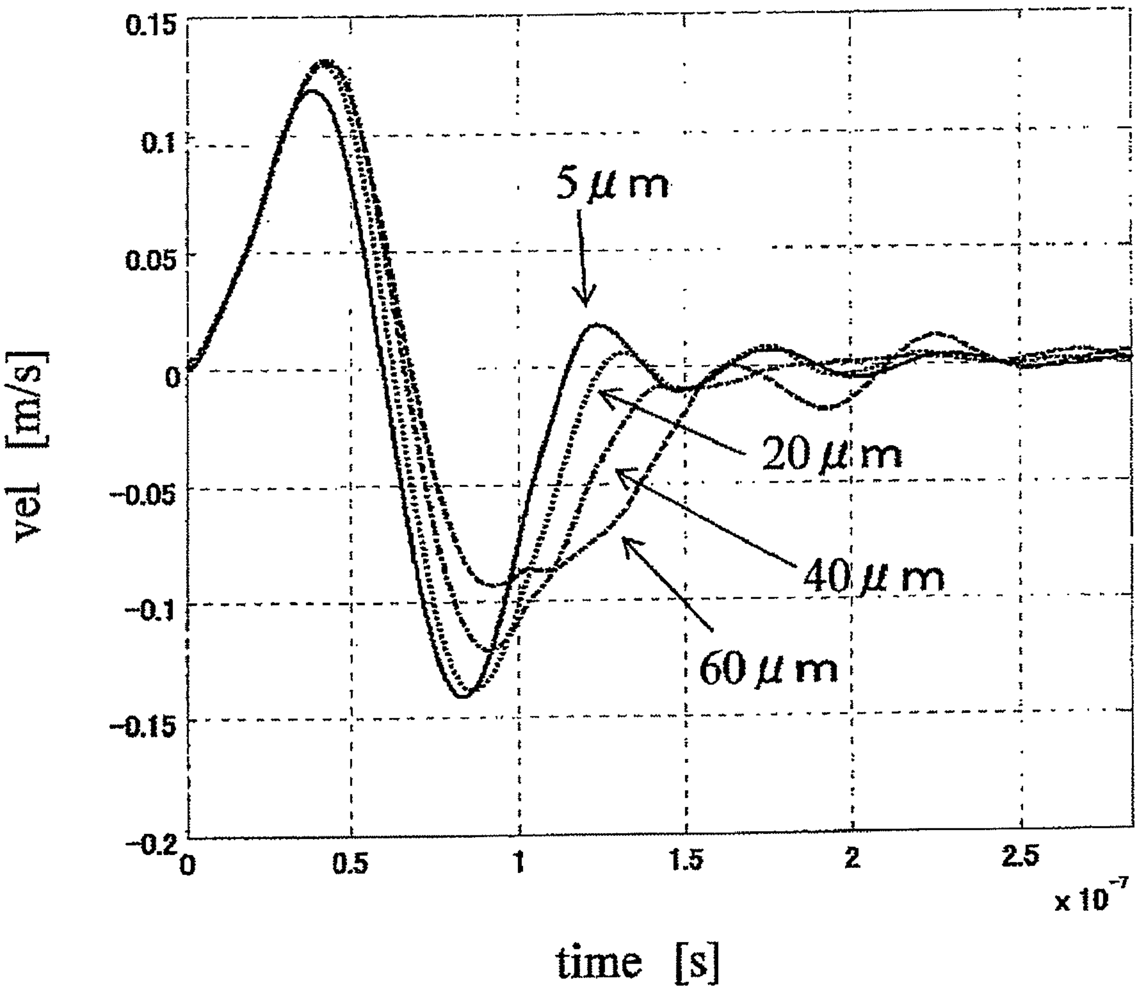
FIG. 2 is a diagram illustrating the relationship between the distance between diaphragms and a pulse waveform.

FIG. 2 is a diagram of graphs showing a result of a simulation of a received ultrasonic pulse response by finite element method in a case of changing the distance between one diaphragm and adjacent diaphragms. Herein, as an example, a two dimensional model with diaphragms with a width of 60 μm and an unlimited length is employed. The material of the diaphragms is silicon nitride (SiN), and the thickness is 1.2 μm. Ultrasonic waves arriving from the front face of the array are sine waves with a center frequency of 10 MHz, and a cycle number of one periodic time. The horizontal axis represents time with an origin being the time when an ultrasonic pulse arriving from the front face of the array arrives at the surface of a diaphragm. The vertical axis represents the vertical velocity of the central portion of the diaphragm. The four graphs show the cases where the distance between adjacent diaphragms are 5 μm, 20 μm, 40 μm and 60 μm.

From FIG. 2, it is understood that the wider the distance between adjacent diaphragms, the wider the pulse width. When the distance between adjacent diaphragms is 5 μm, the diaphragm is deformed substantially the same as the waveform of an ultrasonic wave arriving from outside; the central portion of the diaphragm oscillates in a sine wave for one periodic time; thereafter (approximately 0.1μ sec later), the oscillation amplitude rapidly becomes small; the pulse width is narrow; and the frequency spectrum of the transmission function converting the ultrasonic wave to the deformation of the diaphragm is substantially flat. On the other hand, the wider the distance between the adjacent diaphragms is, the more the pulse waveform is extended. When the distance between adjacent diaphragms is 60 μm, the pulse width is extended substantially 1.5 times compared with the case of the distance between adjacent diaphragms of 5 μm, showing that using an array in such conditions deteriorates the space resolution.

Figure 3:
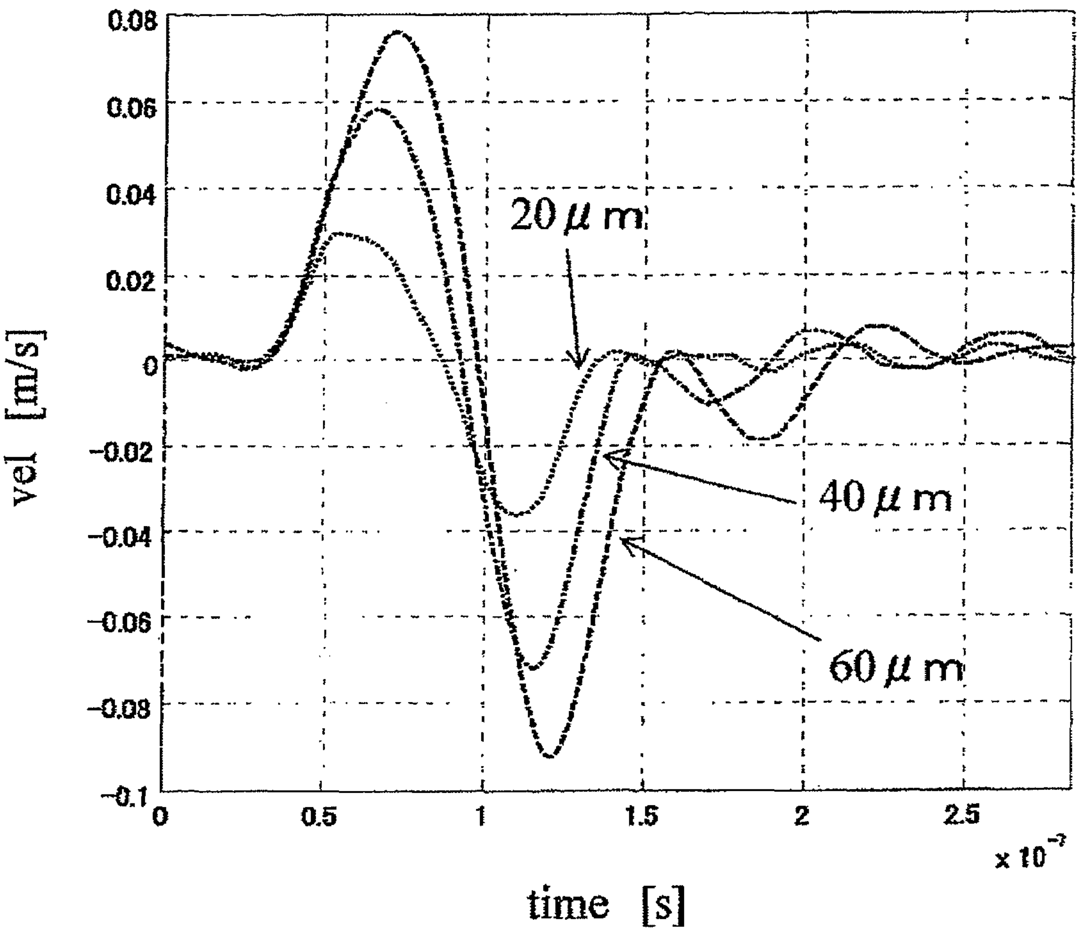
FIG. 3 is a diagram illustrating the relationship between the distance between diaphragms and a reflected waveform.

FIG. 3 is a diagram of graphs showing waveforms of reception pulses in cases with the distance between adjacent diaphragms of 20 μm, 40 μm, and 60 μm, subtracted by a waveform of a reception pulse in a case of the distance between adjacent diaphragms of 5 μm. By comparing with the waveform of the reception wave with the distance between adjacent diaphragms of 5 μm, which is almost free from affect by reflected waves form adjacent diaphragms, reflected waves from the adjacent diaphragms can be extracted. It is apparently shown that the reflected waves from the adjacent diaphragms become larger, corresponding to the distance between the adjacent diaphragms.

Figure 4:
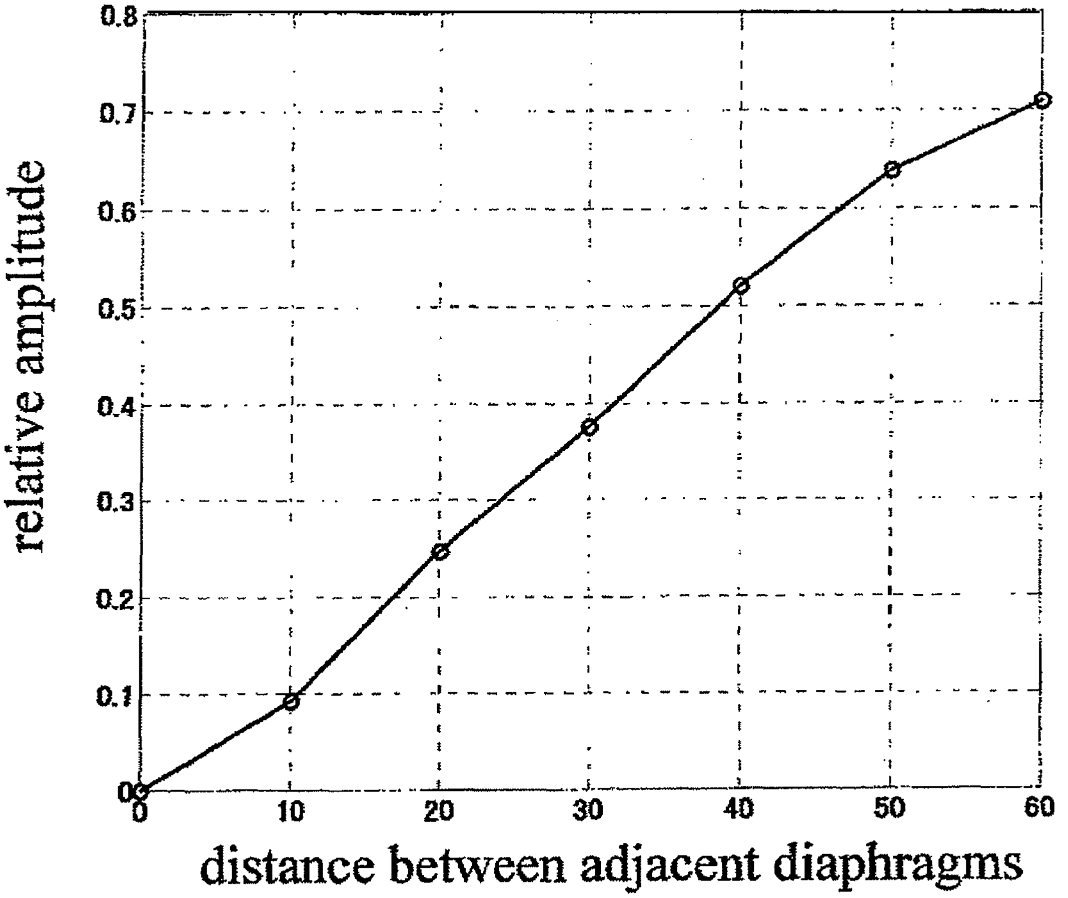
FIG. 4 is a diagram illustrating the distance between diaphragms and the intensity of a reflected waveform.

The integrated values of the amplitudes of the reflected waves are represented by the vertical axis, and the distances between adjacent diaphragms are represented by the horizontal axis, in the graph in FIG. 4. The vertical axis is normalized by the integrated value of the amplitude of the original reception waveform. It is shown that the value of the vertical axis becomes 0.1 or smaller where affects by a reflected wave can be almost neglected, when the distance between adjacent diaphragms is 10 μm or smaller. Taking into account that the acoustic velocity propagating in silicon material is 8000 m/s, this means that the distances between adjacent diaphragms is 1/80 of the wavelength or shorter because the wave length of an ultrasonic wave at 10 MHz is 800 μm.

Figure 46:
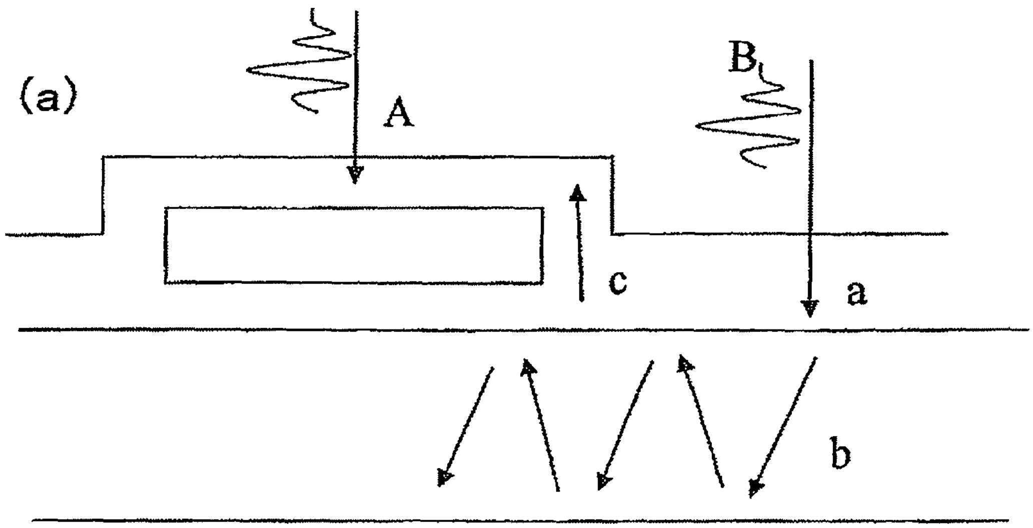
FIG. 46 is a diaphragm illustrating noise generation due to ultra sound having entered a substrate through gaps between diaphragms.
Figure 46:
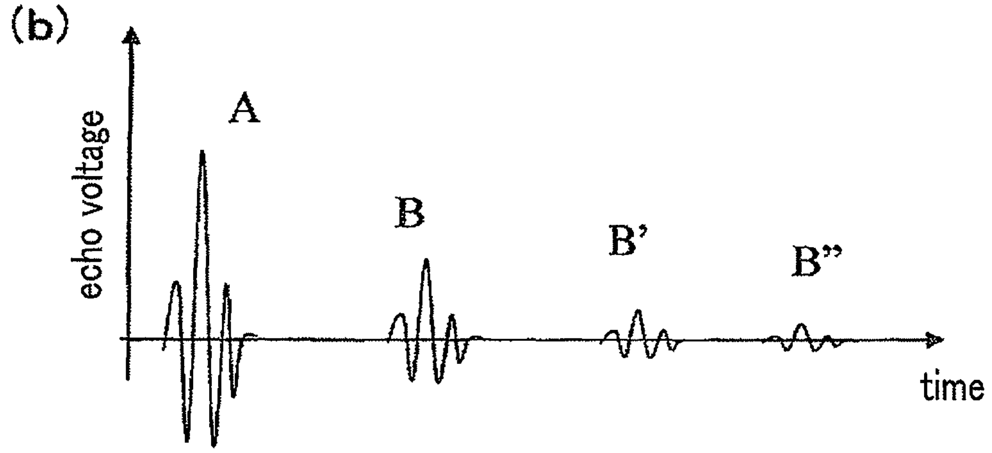

In the ultrasonic transducer region as one element configured by electrically connecting diaphragm type plural ultrasonic transducers, if there is a region in which diaphragms are not formed, the pulse response is deteriorated also in the process described below. FIGS. 46(*a*) and 46(*b*) illustrate the mechanism in which an ultrasonic wave entering a substrate from a gap between diaphragms generates a noise. FIG. 46(*a*) is a schematic cross-sectional view of a diaphragm and the peripheral, and FIG. 46(*b*) is a diagram showing the temporal change in a gain voltage signal.

As shown FIG. 46(*a*), regarding a case of receiving an ultrasonic pulse coming from above a diaphragm, an ultrasonic pulse A having directly entered a diaphragm is first converted into an electrical signal, as shown as A in the graph with the horizontal axis of time and the vertical axis of echo voltage signal in FIG. 46(*b*). On the other hand, an ultrasonic pulse B having arrived in a region of a gap between diaphragms, as shown by paths a, b and c in FIG. 46(*a*), repeats multiple reflections in the substrate, passes through a limb portion of a diaphragm, and arrives at the diaphragm. The ultrasonic pulse having passed through the paths a, b and c is also converted into an electric signal by deforming the diaphragm, and appears as an electric signal with waveforms B, B' and B" as shown in FIG. 46(*b*).

With an ultrasonic imaging device, in a case, for example, of observing the inner structure of a blood vessel, in order to observe sites of which reflectance intensities differ from each other by 40 dB to 60 dB, such as the tissue site of the blood vessel and the lumen of the blood vessel, an image of the structure is created by compressing the brightness and with a wide dynamic range. Therefore, even if the echo of B and B' are imperceptible, when echo of delayed B and B' accompanies the reflectance signal A from the tissue site of the blood vessel, the echo is observed as an image inside the blood vessel, which does not allow distinction between a plaque in the blood vessel and a false image of B or the like. Judging from the dynamic range of an image by a common ultrasonic imaging device, the amplitude of a reflectance signal B is necessary to be reduced to one thousandth, namely approximately −60 dB, compared with the amplitude of a reflectance signal A. As described above, by shortening the gap between diaphragms approximately to one eightieth of a wave length, the transmission efficiency of a sound through the gap drops and effect by a reverberant sound, such as B, does not become a problem. By making the amplitude of an ultra sound entering a wafer along the path "a" small enough, the reverberant sound of B becomes small even if the reflectance ratio of the multiple reflections along the path b cannot be made small enough. As a result, it is possible to increase the degree of freedom in selection of the thicknesses and material of the adhesive to be applied to a wafer and a backside material having significant effects on the reflectance ratio of the multiple reflections along the path b, thereby improving the degree of freedom of manufacturing process.

In the present embodiment, the shapes and structures of diaphragms are adopted which are suitable for making the resonance frequencies differ from each other to widen the fractional bandwidth, while minimizing the areas of gaps between diaphragms.

Figure 5:
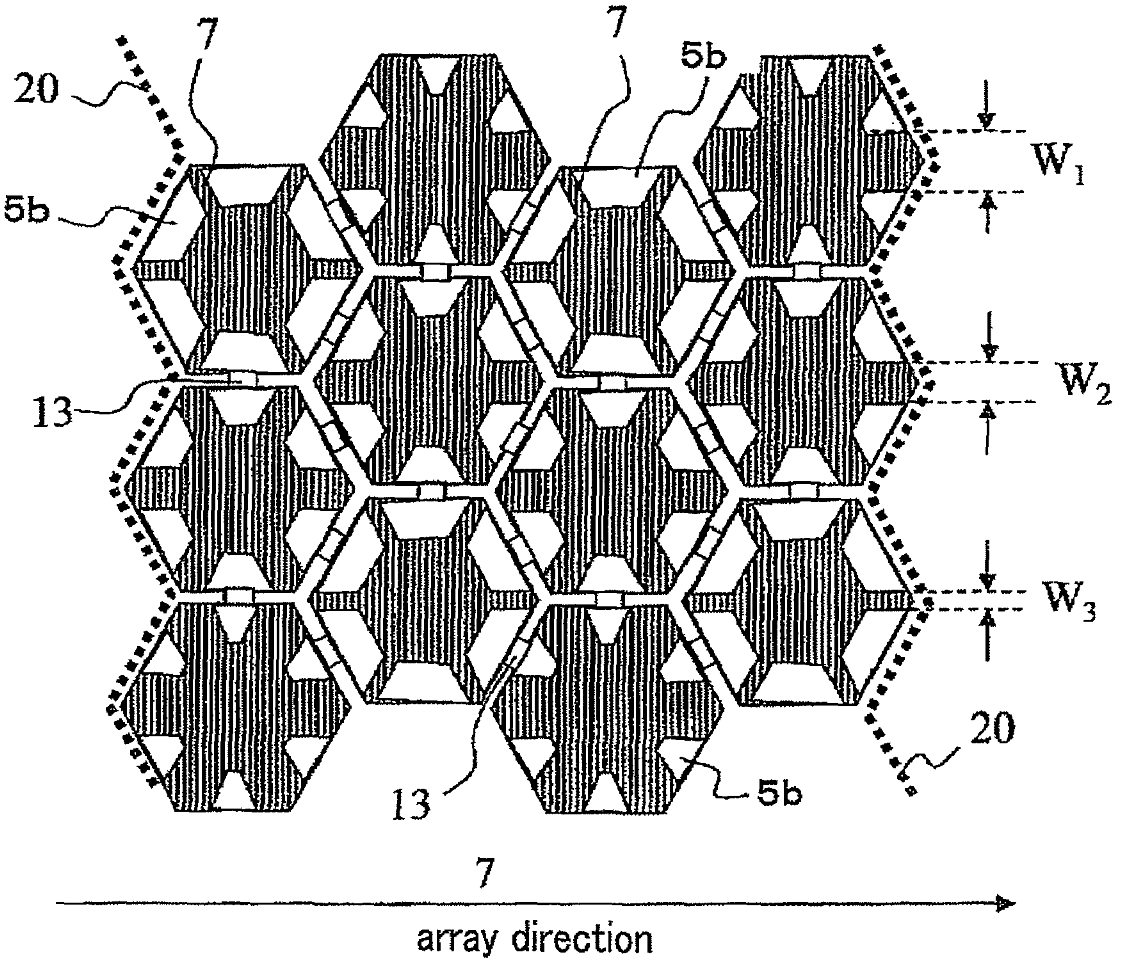
FIG. 5 is a plan view showing an ultrasonic probe in the first embodiment.
Figure 6:
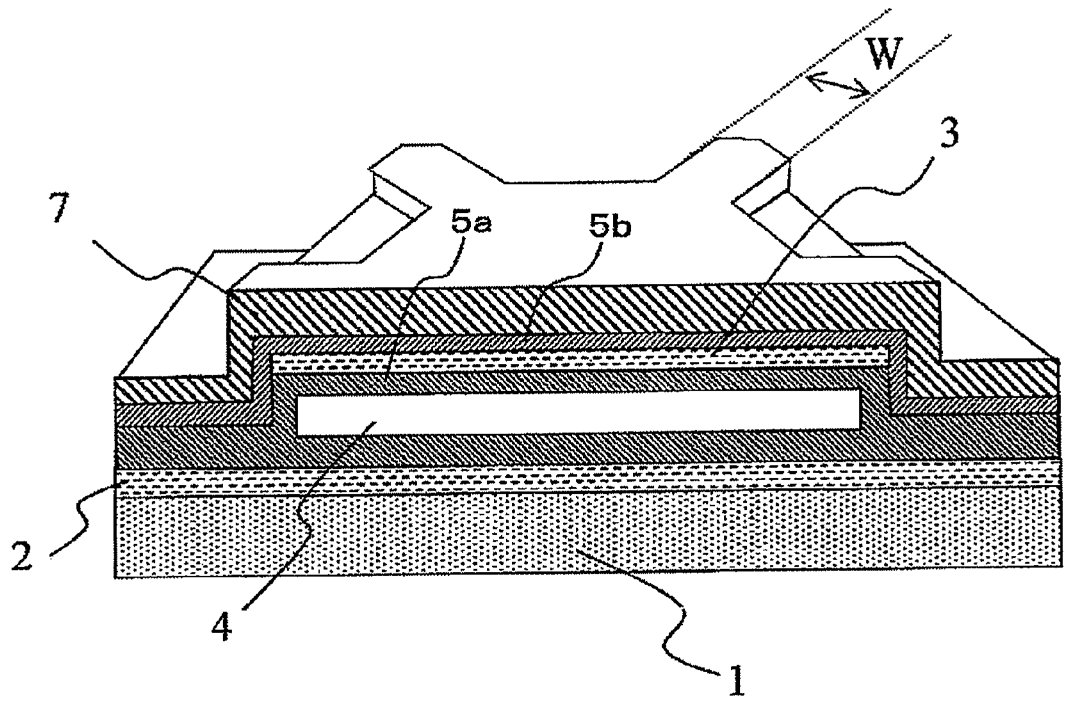
FIG. 6 is a diagram showing a structure of a semiconductor diaphragm type ultrasonic transducer in the first embodiment.

FIG. 5 shows an example of an ultrasonic probe in the present embodiment, and is a top view showing a part of a semiconductor diaphragm type transducer array configuring the ultrasonic probe. FIG. 6 is a schematic diagram showing an oblique top view of one of the diaphragm type ultrasonic transducers in the array shown in FIG. 5, the one being cut for viewing.

Each diaphragm type ultrasonic transducer is, as shown in FIG. 6, includes a bottom electrode 2 (the first electrode) formed on a substrate 1, an inner diaphragm layer 5*a* being formed on the bottom electrode 2 and having a cavity 4 therein, a top electrode 3 (the second electrode) provided on the inner diaphragm layer 5*a*, and an outer diaphragm layer 5*b*, which are disposed in this order, and a beam 7 connecting opposite apexes of the diaphragm, the beam being formed on the outer diaphragm layer 5*b*. The bottom electrode 2 and the top electrode 3 are facing each other through the inner diaphragm layer 5*a* having the cavity 4 therein, and configure a capacitor. At the central portion of each diaphragm in a hexagonal shape, a film in a homothetic shape of the diaphragm is formed to be continuous with the beam 7.

Hereinafter, both or either the inner diaphragm layer 5*a* or the outer diaphragm layer 5*b* may be described merely as "diaphragm". Further, symbols of other elements may be omitted.

Figure 7:
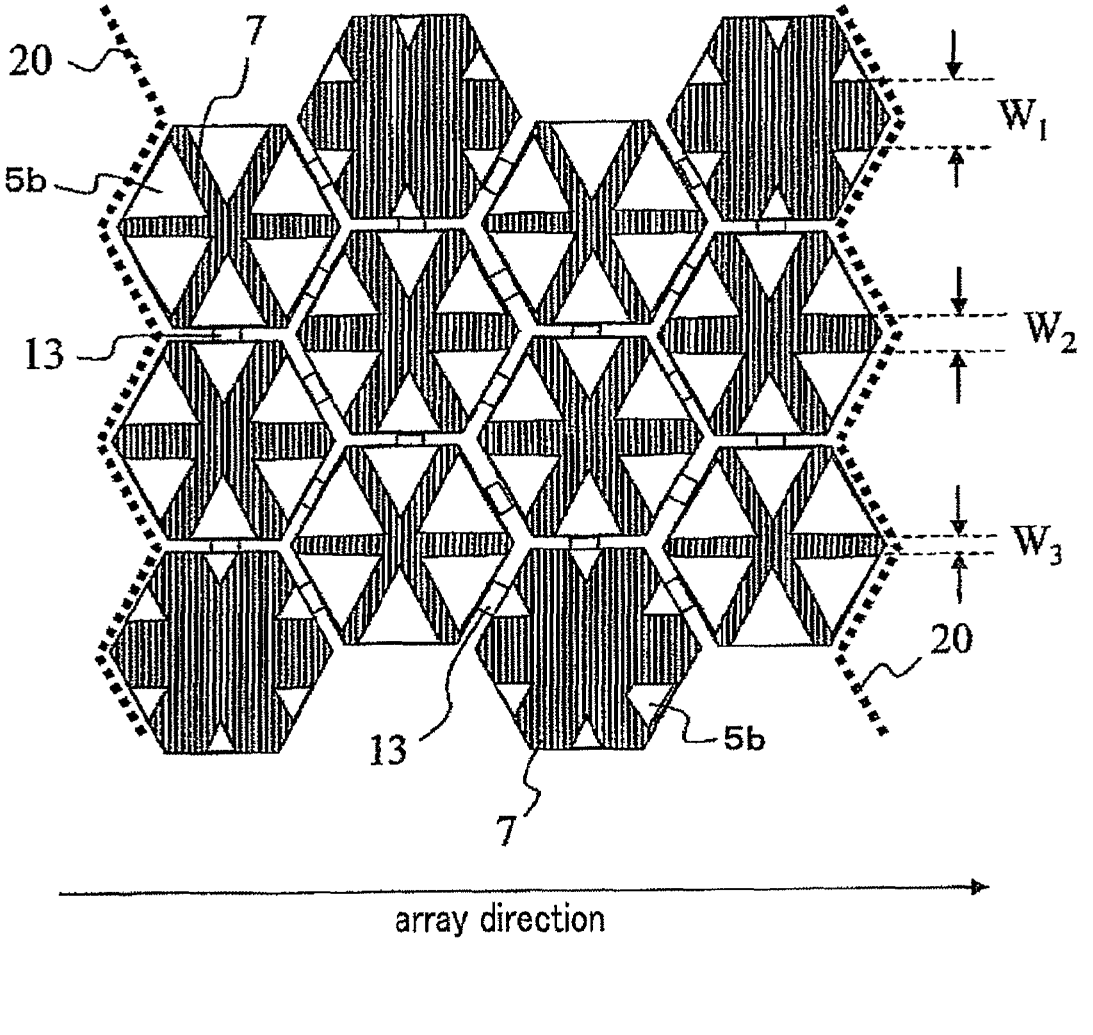
FIG. 7 is a top view of the semiconductor diaphragm type ultrasonic transducers in the first embodiment.

As shown in FIG. 7, if beams 7 only are formed, acute angles are formed in a part where beams 7 near the central part of a diaphragm intersect each other, which may cause variation in trimming the acute angle portion by etching process of semiconductor or the like. Herein, forming a homothetic shape portion at the center brings an advantage of not forming an acute angle portion. Further, in a diaphragm type ultrasonic transducer, applying a high DC bias improves the sensitivity of transmission and reception because more charges are accumulated. However, if an excessive DC bias is applied, a part of the diaphragm comes in contact with the opposite surface of the cavity 4. Such a contact causes charge emission into the diaphragm, and drifts the electro-acoustic conversion characteristics of the element. In a case of forming beams 7, the contact starts at the gaps between the beams 7 and a portion adjacent to the center of the diaphragm. In order to increase the upper limit of the DC bias which can be applied causing no contact, since deformation without unflatness is advantageous, it is advantageous to form a film in a homothetic shape of the diaphragm in the vicinity of the intersection between the beams 7. Herein, if the homothetic shape is too large, the gaps between the beams 7 are all filled to lose the effect of forming the beams 7. Accordingly, the diameter of the homothetic shape is preferably approximately 50% to 80% of the diameter of the entire diaphragm.

Herein, the beams 7 have a structure having a smaller width compared with the length and a shape covering only a part of the diaphragm. The beams 7 effect the resonance frequency of the diaphragm type entire ultrasonic transducer, by having the hardness conditions described below. That is, the hardness of the beams 7 is made great enough compared with the hardness of the material of the diaphragm portion forming the upper wall of the cavity 4, or the thickness of the beams 7 is made great enough compared with the thickness of the diaphragm portion. Thus, the resonance frequency of the diaphragm type entire ultrasonic transducer can be controlled by the shape and material of the beam 7. For example, with beams 7 in a simple rectangular solid shape of a width W, length 1 and thickness t, the resonance frequency $f_b$ in the thickness direction is represented by the following Expression (3). Herein, E denotes Young's Module, I denotes the cross-sectional moment, and m denotes the mass.

$$f_b \propto \sqrt{\frac{EI}{l^3 m}} \tag{3}$$

A beam 7 with a cross-section in a rectangle shape has a cross-sectional moment I of $Wt^3/3$, and accordingly Equation (3) is equivalent to Equation (4). As Equation (4) is a proportional expression, coefficients are omitted.

$$f_b \propto \sqrt{\frac{Et^3 w}{l^3 m}} \tag{4}$$

Accordingly, if the materials of beams 7 are the same and the thickness t and length 1 are constant, the resonance frequency $f_b$ is proportional to the square root of the width W.

If the beams 7 are in a rectangular solid shape with a width of W at the marginal portion, and are in a homothetic shape of the diaphragm, as shown in FIGS. 5 and 6, at the central portion of the diaphragm, assuming that the central portion of the diaphragm to be approximately a spindle with a mass of M, Expression (3) is described as Expression (5), and almost the same case as described above is applicable.

$$f_b \propto \sqrt{\frac{EI}{l^3(M+0.37m)}} \tag{5}$$

If the resonance frequency of a diaphragm can be controlled by the width W of beams 7 in such a manner, then, by packing ultrasonic transducers having diaphragms with a constant diameter and beams 7 with different widths W provided on the front surfaces or back surfaces of the respective diaphragms, as shown in FIG. 5, it is possible to configure a single ultrasonic transducer with diaphragm type plural ultrasonic transducers with different resonance frequencies, without gaps between the diaphragms. In FIG. 5, the boundary of an ultrasonic transducer that functions as a single element is shown by dashed lines 20. Herein, the bottom electrode 2 is common to the diaphragm type plural ultrasonic transducers configuring the single ultrasonic transducer, and the top electrodes of the diaphragm type plural ultrasonic transducers configuring the single ultrasonic transducer are electrically connected mutually by connections 13.

An example including materials and dimensions configuring the diaphragm type ultrasonic transducer, shown in FIG. 6, will be described below. A substrate 1 is made of silicon and a bottom electrode 2 with a thickness of approximately 500 nm and made of metal or polysilicon is formed on the silicon substrate. On the bottom electrode 2, an insulation film of silicon oxide or the like is formed with a thickness of approximately 50 nm on which a cavity 4 with a dimension in the thickness direction of approximately 200 nm is formed. An insulation film (the first diaphragm) 5 is formed with a thickness of approximately 100 nm to form the upper wall of the cavity 4, and a top electrode 3 is formed with a thickness of approximately 400 nm of metal such as aluminum on the insulation film 5. On the top electrode 3, formed is an outer diaphragm layer 5*b* with a thickness of approximately 200 nm of silicon nitride to cover the entire cavity 4, and further on the outer diaphragm layer 5*b*, formed is a film of silicon nitride with a thickness of approximately 1000 nm to form beams 7.

However, these materials and dimensions are only an example, and materials and dimensions may not be as described above. For example, assuming that the beams 7 are made of silicon nitride, the diameter of the diaphragm is 60 μm, the thickness of the film is 2 μm, and the thickness of the beams 7 is 4 μm, then, the center frequency is 7.8 MHz and −6 dB fractional bandwidth is 120% (−6 dB fractional band is 3 to 12.5 MHz) with $W_1$ of 0.5 μm, the center frequency is 10 MHz and −6 dB fractional bandwidth is 100% (−6 dB fractional band is 5 to 15 MHz) with $W_2$ of 4 μm, and the center frequency is 11.5 MHz and −6 dB fractional bandwidth is 96% (−6 dB fractional band is 6 to 17 MHz) with $W_3$ of 20 μm. By optimizing the number of ultrasonic transducers having the beam width of $W_1$, $W_2$ and $W_3$ (When the numbers of ultrasonic transducers having the beam width of $W_1$ and $W_3$ are greater than the number of ultrasonic transducers having the beam width of $W_2$, a flatter frequency spectrum can be obtained.), −6 dB band becomes 3 to 17 MHz, that is, −6 dB fractional bandwidth becomes 140%. Compared with a known diaphragm structure with which −6 dB fractional bandwidth is approximately 100 to 120%, −6 dB fractional bandwidth is improved by 40 to 20 points.

Figure 8:
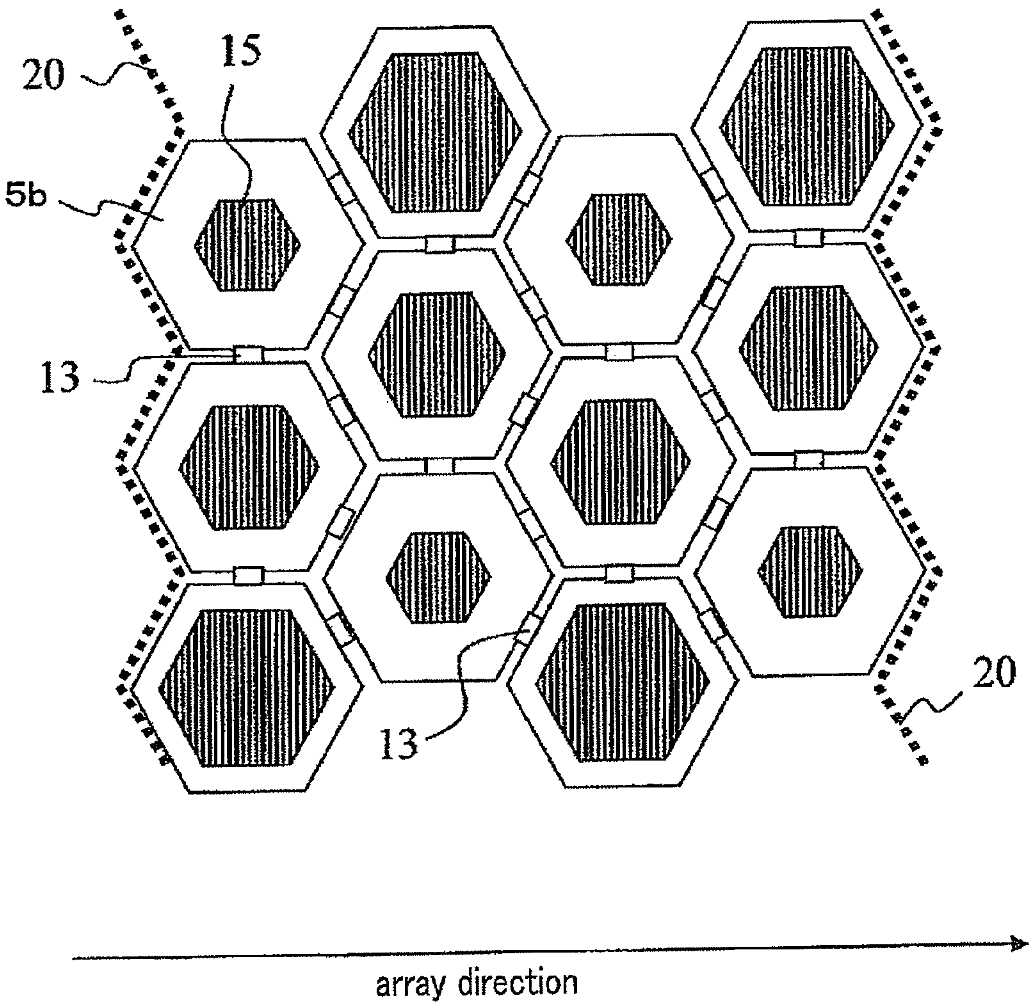
FIG. 8 is a top view of the semiconductor diaphragm type ultrasonic transducers in the first embodiment.

In the example shown in FIG. 5, a film in a homothetic shape of the diaphragm in a polygonal shape is formed at the central portion of the diaphragm continuously with the beams 7. However, even arranging beams 7, as shown in FIG. 7, without a film in a homothetic shape of the diaphragm at the central portion, the same effect can be obtained of course. On the other hand, as shown in FIG. 8, it is also possible to set different resonance frequencies of individual diaphragms by providing hard regions 15 in the respective central portions of the diaphragms and changing the sizes of the hard regions 15, without changing the size of the entire diaphragms. However, although the resonance of a diaphragm can be understood by breaking down into respective spring contributions defined by mass, structure and material, when a diaphragm is thick, contribution by the material and shape at a lib portion of the diaphragm is dominating with respect to the strength of the spring. Accordingly, in the case of the shape shown in FIG. 8, it is difficult to set different frequencies for individual diaphragms. Therefore, compared with a structure in which hard regions 15 in different sizes are formed at the respective centers of diaphragms as shown in FIG. 8, preferable is a structure in which beams 7 having different widths and connecting opposite apexes of diaphragms in a polygonal shape are formed on the front surfaces or back surfaces of diaphragms, as shown in FIG. 5 and FIG. 7.

Figure 9:
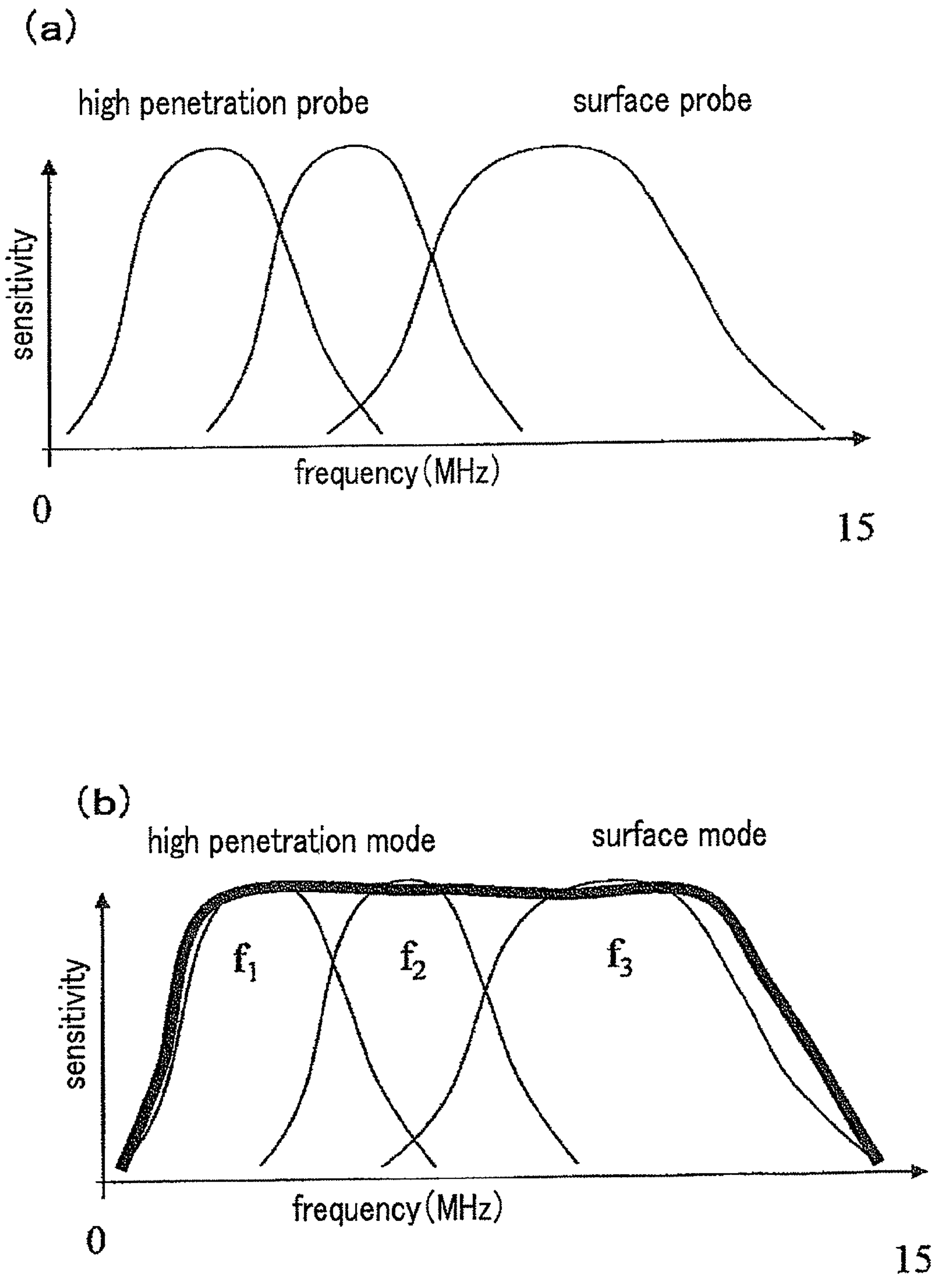
FIG. 9 is a diagram illustrating utilization of a broaden frequency band.

Next, a method of utilizing the wide band characteristics of an ultrasonic probe in accordance with the invention will be described. FIG. 9(*a*) is an illustration on how to select frequencies for respective observation sites, in a case of using a conventional probe with a fractional bandwidth of approximately 60%. In general, the higher the frequency is, the shorter the wavelength is, improving the space resolution. However, attenuation accompanying propagation of an ultra sound becomes greater substantially proportionally to the frequency. Therefore, in a case of observing with high penetration into a specimen, almost no signal returns due to attenuation. Thus, deterioration of signal/noise ratio due to attenuation and space resolution are in a trade-off relationship, and therefore, a frequency as high as possible is selected within a range satisfying a desired signal/noise ratio. Accordingly, depending on the depth of an observation object, an optimum frequency is substantially automatically determined, wherein selected are frequencies of approximately 2 MHz for observation at a depth of 15 to 20 cm from a body surface (such as a liver), approximately 10 MHz for observation at a depth of several centimeters from the body surface (such as a thyroid), and higher for a case such as a probe in a blood vessel.

Conventionally, as there has not been an ultrasonic probe that covers such a wide range of frequencies approximately from 2 MHz to 15 MHz, probes have been used for each of which a predetermined center frequency is set, optimizing each probe for a corresponding object site. Accordingly, a constant width among elements has been applicable, and arrays of elements of a fixed element width, such as to be a half to 75% of a wavelength, have been adopted. However, according to the invention, as shown in FIG. 9(*b*), a single probe can cover almost a frequency band necessary for an object of a human body. The symbols $f_1$, $f_2$ and $f_3$ in FIG. 9(*b*) represent drive frequencies in respective modes.

Herein, in order to operate a single probe with greatly different center frequencies by switching the drive frequency depending on the depth of the object site from the body surface, the element width is necessary to be switchable. Switching of the element width is determined when an object site is selected. In a case, the element width is constant in a single imaging plane. In another case, the object site is relatively large and the element width is necessary to be changed even in a single screen depending on the place to set the object site. In still another case, the object site is extending from a vicinity of the body surface to a deep portion and the element width is necessary to be switched accompanying the movement of the focus position while receiving ultra sound. For example, a case of switching the element width while receiving ultra sound will be described, referring to a device diagram. An ultrasonic pulse in a wide band is applied from a transmission beam-former 204 in FIG. 1 through a switch 205 and sub-element cross point switch 17 to an ultrasonic probe configured with sub-elements 16, and the ultrasonic pulse is transmitted to a specimen not shown.

In the transmission beam-former 204, improving signal/noise ratio by widely transmitting ultrasonic pulses is more important than increasing the space resolution by narrowing the beam. Therefore, the number of sub-elements per channel is set small, and the total aperture is set narrow. Since ultra sounds scattered in a specimen return in order of nearness to the surface of the specimen, ultra sounds return in ascending order of the propagation distance in the specimen. In a conventional technology, ultra sounds returning from the specimen are received by reception beam-former 206 through the switch 205; the delay time and weight coefficient are adjusted between channels; and a tomographic image is displayed through an envelope detector and a scan converter. On the other hand, in the invention, in a sub-element cross point switch 17 between the sub-elements 16 and the switch 205, when ultra sounds from near-surface portions are received, sub-elements are bundled in the quantity corresponding to the upper end of the band having transmitted the ultra sounds, and when ultra sounds from deeper portions are received, sub-elements are bundled in the quantity corresponding to the lower end of the band having transmitted the ultra sounds. The time is continuous from when ultra sounds are received from the near-surface portions until when ultra sounds are received from deeper portions, and accordingly, switching of the quantity of sub-elements is necessary to be carried out continuously in terms of time.

Figure 10:
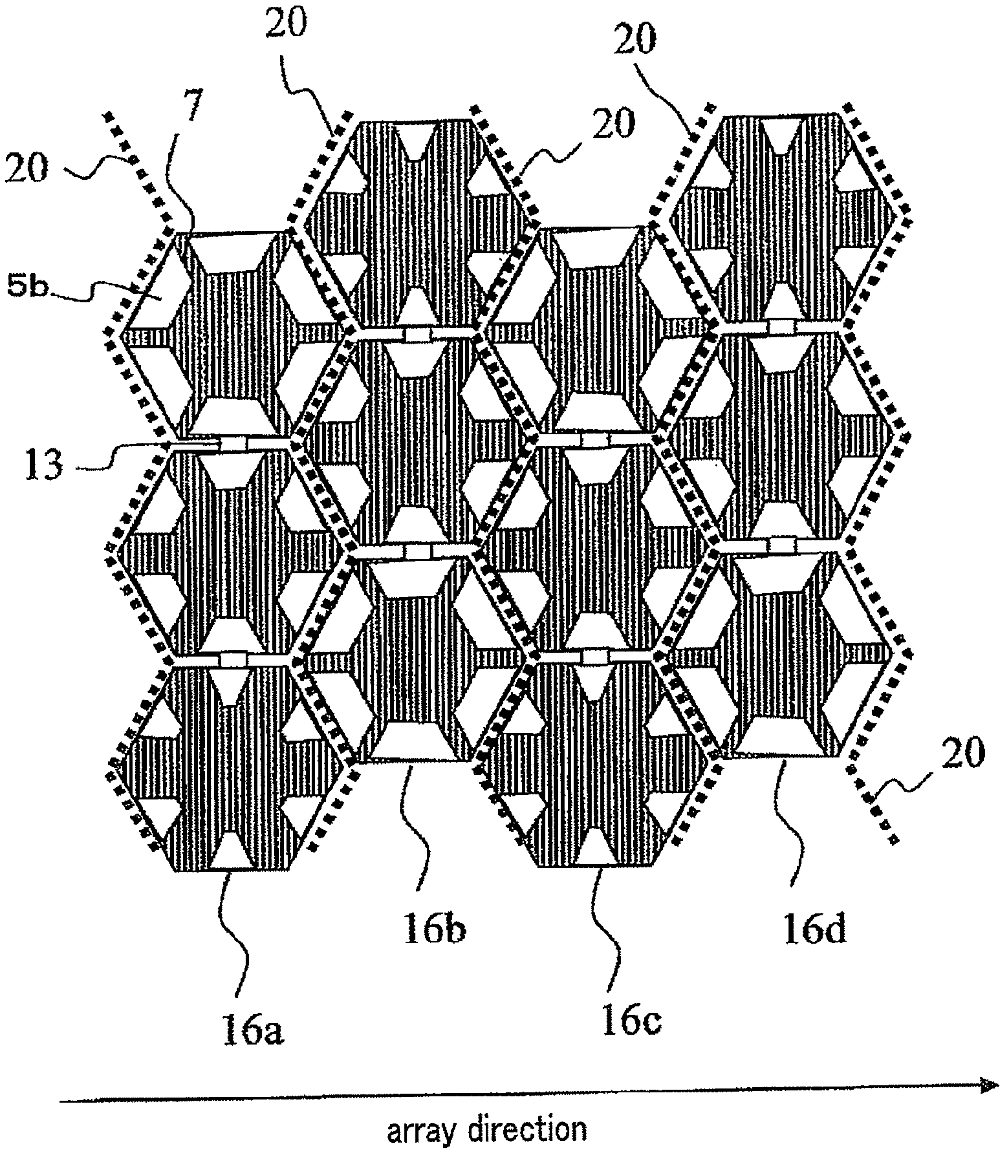
FIG. 10 is a diagram showing ultrasonic transducers to be used, switching the width/widths of a single electrical element/elements, depending on the mode.

In the example in FIG. 5, diaphragms in a hexagonal shape are connected criss-crossingly to form an ultrasonic transducer of a single electrical element. However, in order to realize the above described mode, as shown in FIG. 10, by connecting plural ultrasonic transducers by connections 13 only in the short axis direction, having the electrically connected ultrasonic transducers be a sub-element, and changing the quantity of sub-elements to be bundled in the long axis direction (array direction), the element width can be changed corresponding to the mode. Herein, the mode is imaging conditions automatically determined by the depth of the object site. The photographing conditions include the drive frequency, cut-off value of the frequency filter for reception, the number of transmission sine waves, temporal weight function, aperture weight function, and the like.

When an operator of the ultrasonic transducer selects or inputs an object site, the range of the depth of imaging is usually determined, and the degree of attenuation of propagation medium can be estimated. Accordingly, various conditions, such as an optimum frequency, are determined. In a case, for example, of observing a relatively large body organ, such as liver or heart, the object site often extends from a near portion to a far portion even if the object site is determined. Therefore, in some cases, plural modes are applied even for a single object site, and the modes are automatically switched depending on the depth generated by a reflected echo. Sub-elements are configured by a group of diaphragm type ultrasonic transducers of which top electrodes are permanently connected by conductors. When a sub-element configures one element for beam forming, the sub-element serves as a unit of ultrasonic transducer bundled by a switchable switch. In FIG. 10, dashed lines 20 show the boundaries between sub-elements of ultrasonic transducers which are electrically connected. In FIG. 10, four sub-elements 16*a* to 16*d* are shown which are electrically connected in a direction perpendicular to the array direction.

For example, when a diameter of diaphragms which configure a single diaphragm type ultra sound transducer is 50 μm, although it is of course impossible to adjust the element width to a range narrower than the width of one diaphragm, an element width of 0.55 mm being 75% of a wavelength at 2 MHz can be achieved by 11 rows of diaphragms with a diameter of 50 μm, and the element width of 55 μm being 75% of a wavelength at 20 MHz can be achieved by one row of diaphragms with a diameter of 50 μm, which achieves an optimal element pitch for each mode in the range from 2 MHz to 20 MHz. That is, in this case, when driving an ultrasonic probe at 2 MHz, an element width of 0.55 mm can be attained by simultaneously driving eleven bundled adjacent sub-elements as one element, and when driving an ultrasonic probe at 20 MHz, an element width of 55 μm can be attained by driving individual sub-elements independently.

Figure 11:
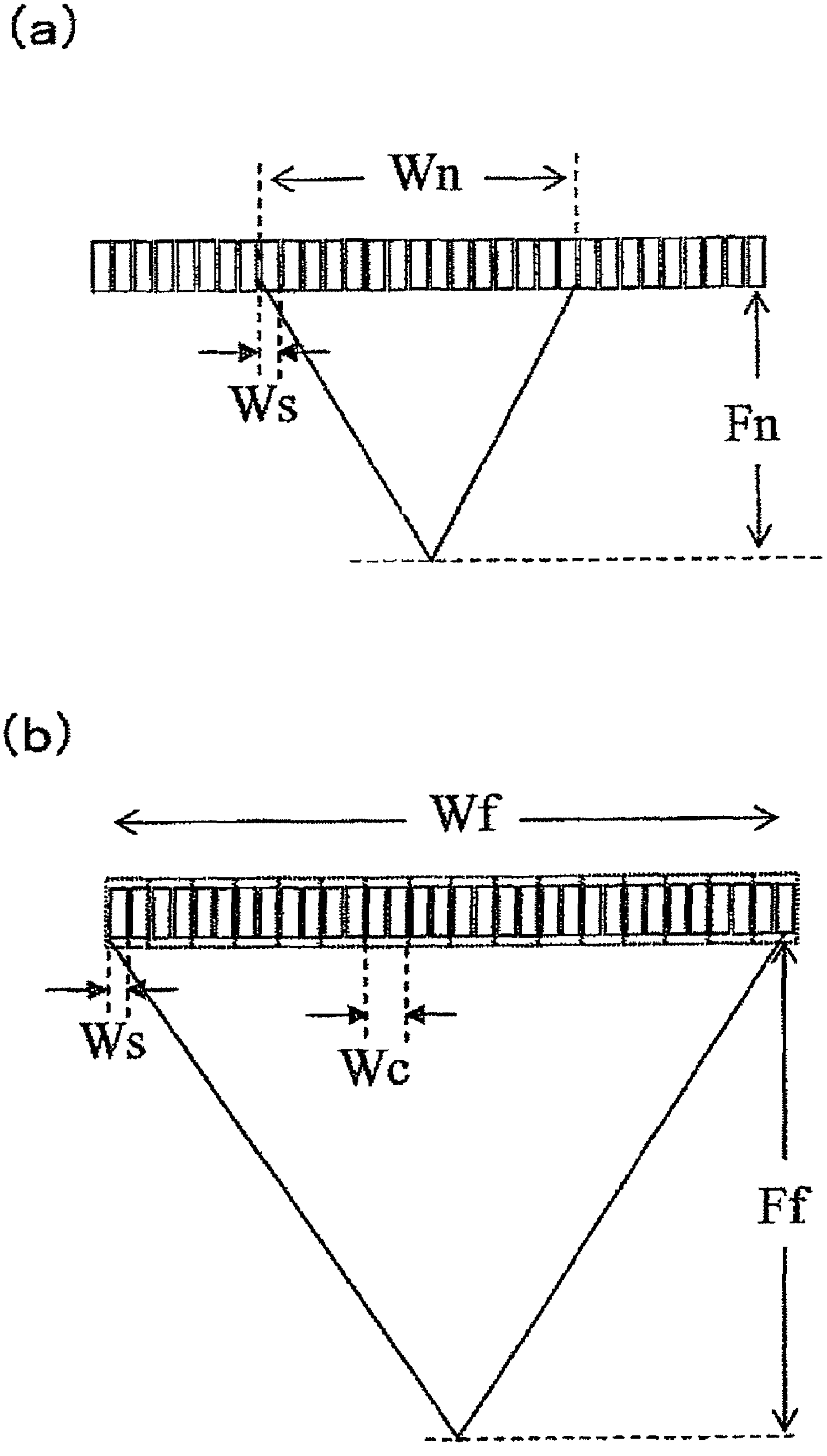
FIG. 11 is a diagram illustrating the effect of switching a manner of bundling a sub-element, corresponding to the distance to a focal point.

FIG. 11 is a diagram specifically illustrating how to change the number of sub-elements to be bundled and an effect of it. FIG. 11(*a*) shows the state where the focus of a transmission wave or reception wave is set to the nearest distance Fn. In this case, since each element is arranged in such a manner that a single sub-element with a width of Ws forms one element, the total aperture width Wn=Ws×N for a system with the number of channels N. On the other hand, FIG. 11*b* shows a state where the focus is set to a deeper distance Ff. In this case, since an element with a width of Wc is structured by bundling two sub-elements, the total aperture width Wf=Wc×N=2×Ws×N. For a still deeper focus, the total aperture width can be widened by increasing the number of sub-elements to be bundled. In this way, even changing the focus of the ultrasonic probe, F value, in other words, focal length/aperture width can be maintained to be substantially constant. Accordingly, compared with a case where the element width and the number of channels are constant, it is possible to inhibit generation of grating lobes (unnecessary emission) due to a too small F value at a near distance. Also, at a far distance, defocusing due to a too large F value can be inhibited.

Figure 12:
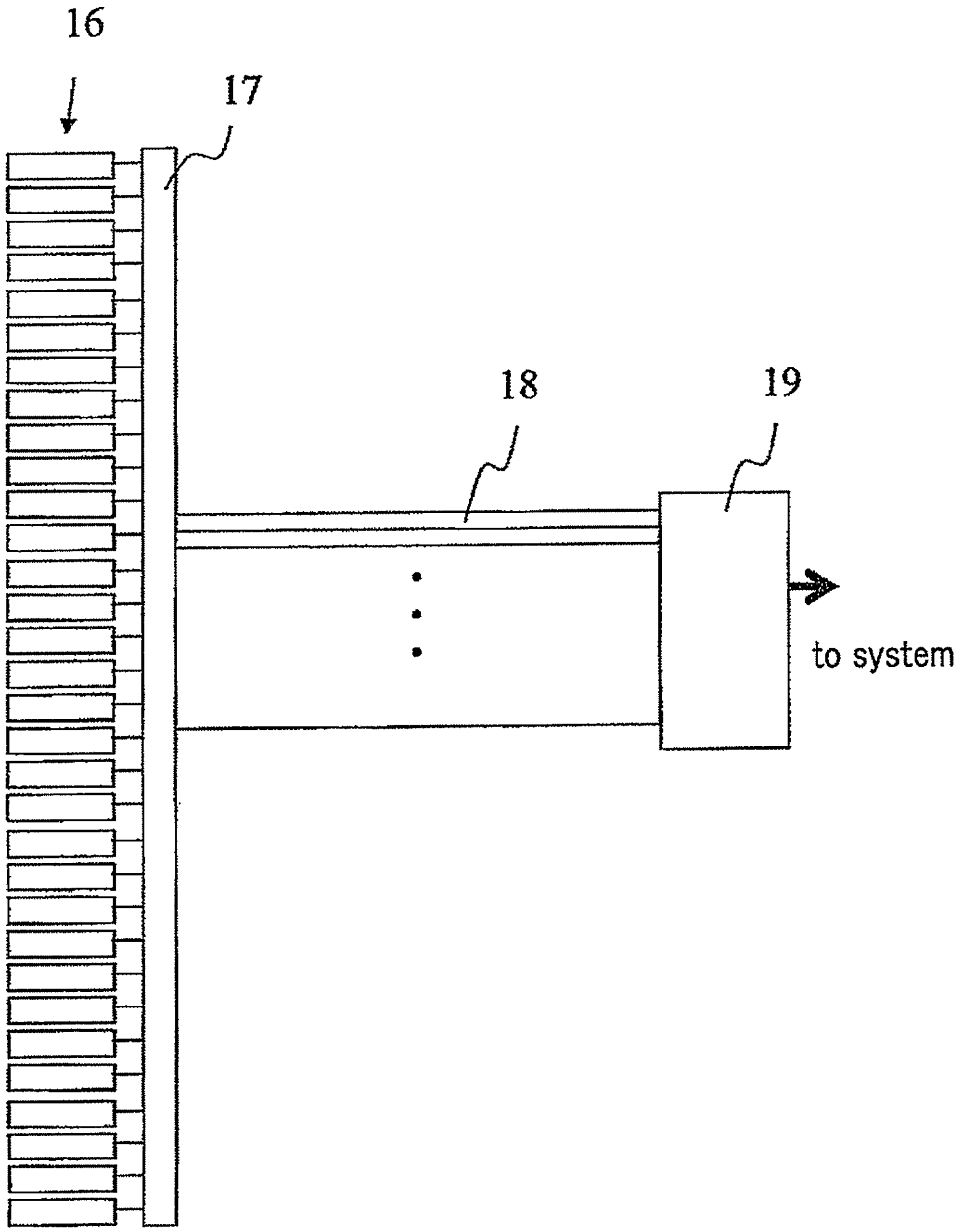
FIG. 12 is a diagram illustrating a sub-element cross point switch and the periphery.

This sub-element cross point switch can be mounted in the ultrasonic imaging device. However, as shown in FIG. 12, the number of cables 18 can be reduced to the necessity minimum by providing a sub-element cross point switch 17 on the sub-elements 16 side, rather than arranging cables 18 connecting the connector 19 in connection with the ultrasonic imaging device and the ultrasonic transducers. As a result, it is possible to reduce, as much as possible, the load on the operator for operation of the ultrasonic probe with a hand.

Now, an example of a diaphragm type transducer array using diaphragms in a shape other than a hexagonal shape will be described. Covering a transmission and reception surface of an ultrasonic probe with diaphragms with different resonance frequencies while minimizing the area of gaps between the diaphragms can be achieved also by using rectangular diaphragms. In this case, if the ratio between the longer sides and the shorter sides of the rectangular is nearly 1:1, a connected oscillation between modes corresponding to the respective sides makes the resonance mode complicated, and even though a wide band appears, the phase is not constant when the frequency spectrum is viewed in terms of both in the amplitude and the phase, resulting in different delays of respective frequency components and deterioration of the pulse spectrum along the time axis. However, by making a great difference between the length of the short sides and the length of the long sides (fore example, 1:8 or greater), diaphragms in a rectangular shape oscillates with deformation along the short sides, and accordingly, the resonance frequency is defined almost by the length of the shorter sides.

Figure 13:
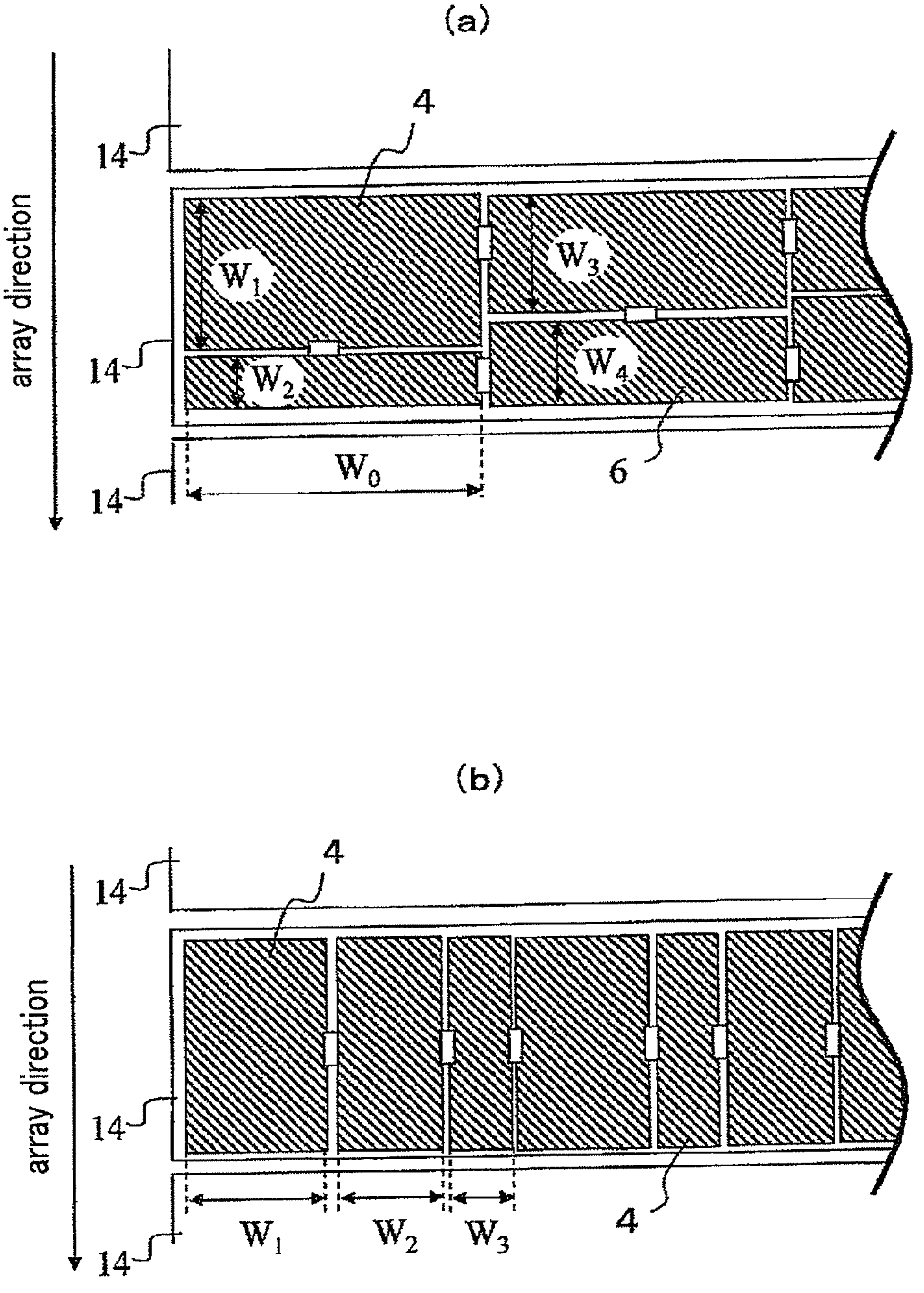
FIG. 13 is a top view of a transducer array in the first embodiment.
Figure 14:
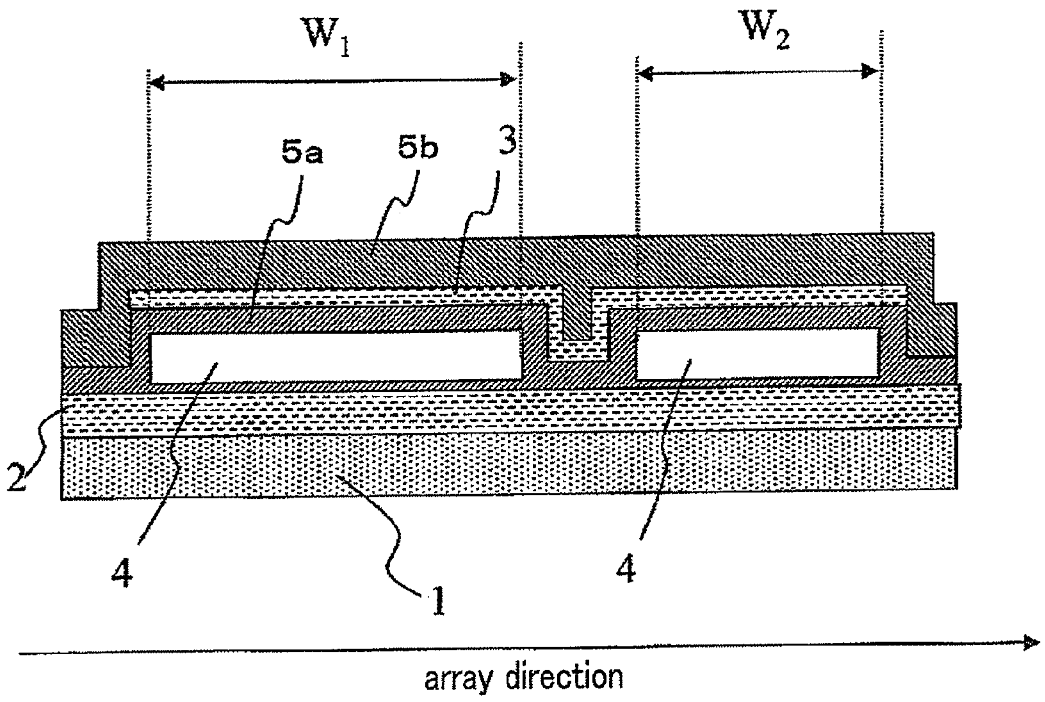
FIG. 14 is a schematic cross-sectional view of a semiconductor diaphragm type ultrasonic transducer in the first embodiment.

FIG. 13(*a*) is a schematic plan view showing an example of an ultrasonic probe using diaphragm type ultrasonic transducers having a rectangular diaphragm. FIG. 14 is a cross-sectional view along the array direction. As shown in FIG. 14, with a structure where the widths of the cavity portions are different from each other, plural diaphragms having different resonance frequencies can be provided in an electrically connected single element. In this ultrasonic probe, plural diaphragms, each of which is an element configuring the respective diaphragm type ultrasonic transducer, are disposed in such a manner that the longer sides of the diaphragms are in the same direction as the longer sides of a single electrically connected element 14, namely, in the direction perpendicular to the array direction of the transducer array. Below each diaphragm, a top electrode substantially in the same shape as the diaphragm and a cavity are provided, and a common (shared) bottom electrode arranged below the cavity and the top electrode configure a capacitor.

Further, each ultrasonic transducer provided with a rectangular diaphragm has a resonance frequency defined by the length of shorter sides of the diaphragm. A single ultrasonic transducer can be obtained in which plural diaphragms, which are disposed without a gap therebetween and have different center frequencies, are simultaneously driven electrically, by selecting a combination of the lengths of the shorter sides of diaphragms such as to divide the shorter side of the electrically connected single element 14 into plural parts. For example, if $W_0$ is 500 μm and the thickness of a film of silicon nitride is 3 μm, then, the center frequency is 7.8 MHz and the −6 dB fractional bandwidth is 120% (−6 dB fractional band is 3 to 12.5 MHz) for $W_1$ of 60 μm, the center frequency is 10 MHz and the −6 dB fractional bandwidth is 100% (−6 dB fractional band is 5 to 15 MHz) for $W_2$ of 50 μm, and the center frequency is 11.5 MHz and the −6 dB fractional bandwidth is 100% (−6 dB fractional band is 6 to 17 MHz) for $W_3$ of 40 μm. By optimizing the numbers of ultrasonic transducers having the respective lengths of the shorter sides of $W_1$, $W_2$ and $W_3$ (Flatter frequency spectrum is obtained with the numbers of $W_1$ and $W_3$ greater than the number of $W_2$.), −6 dB band becomes 1 to 15 MHz, that is, −6 dB fractional bandwidth becomes 140%. Since −6 dB fractional bandwidth of a conventional known diaphragm structure is approximately 100 to 120%, −6 dB fractional bandwidth is improved by 20 to 40 points.

FIG. 13(*b*) is a schematic plan view showing another example of an ultrasonic probe using a diaphragm type transducer array, the diaphragms being rectangular. In this ultra sound probe, plural diaphragms each of which is an element configuring the respective ultrasonic transducer are disposed in such a manner that the longer sides of them are in the same direction as the shorter sides of an electrically single element 14, in other words, in the same direction as the array direction of the transducer array. Below each diaphragm, a top electrode substantially in the same shape as the diaphragm and a cavity are provided, and a common bottom electrode arranged below the cavity and the top electrode configure a capacitor. Also by such disposition of diaphragms, it is possible to form the surface of an ultrasonic probe with plural diaphragms having different center frequencies without gaps therebetween. In disposing these diaphragms with different center frequencies, it is preferable to dispose the diaphragms with regularity as little as possible in order not to create unnecessary grating beams. Also in FIG. 13(*b*), since resonance frequencies are defined for $W_1$, $W_2$ and $W_3$, similarly to the case shown in FIG. 13(*a*), the way to select of them and the effect are also the same as in the case shown in FIG. 13(*a*).

Figure 15:
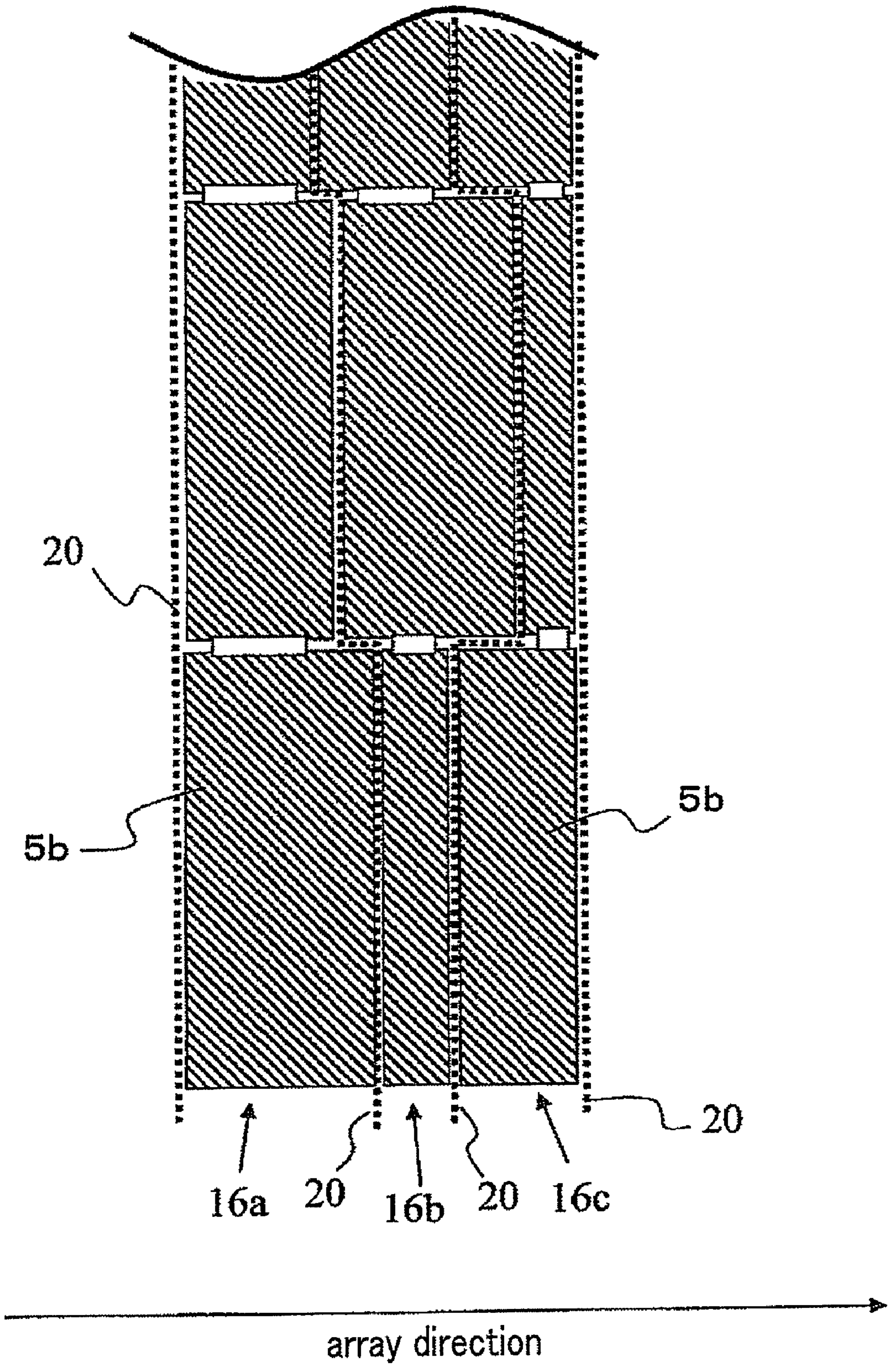
FIG. 15 is a top view of a transducer array to be used, switching the width/widths of a single electrical element/elements, depending on the mode.

Also in the present embodiment, as shown in FIG. 15, setting such as to allow free changing of the element width along the array long axis direction, depending on the mode, is advantageous in a viewpoint of fully utilizing the wide band characteristics which an ultrasonic probe in accordance with the present invention has. In FIG. 15, plural ultrasonic transducers are connected only along the direction perpendicular to the array direction and a number of sib-elements are formed, and the element width along the array long axis is changed by changing bundling of sub-elements. However, as shown in FIG. 13(*a*) or 13(*b*), by having an element 14 configured by plural diaphragm type ultrasonic transducers be one sub-element, and changing bundling of sub-elements by a switch, the element width along the array long axis may be changed, corresponding to the mode.

(Second Embodiment)

Figure 16:
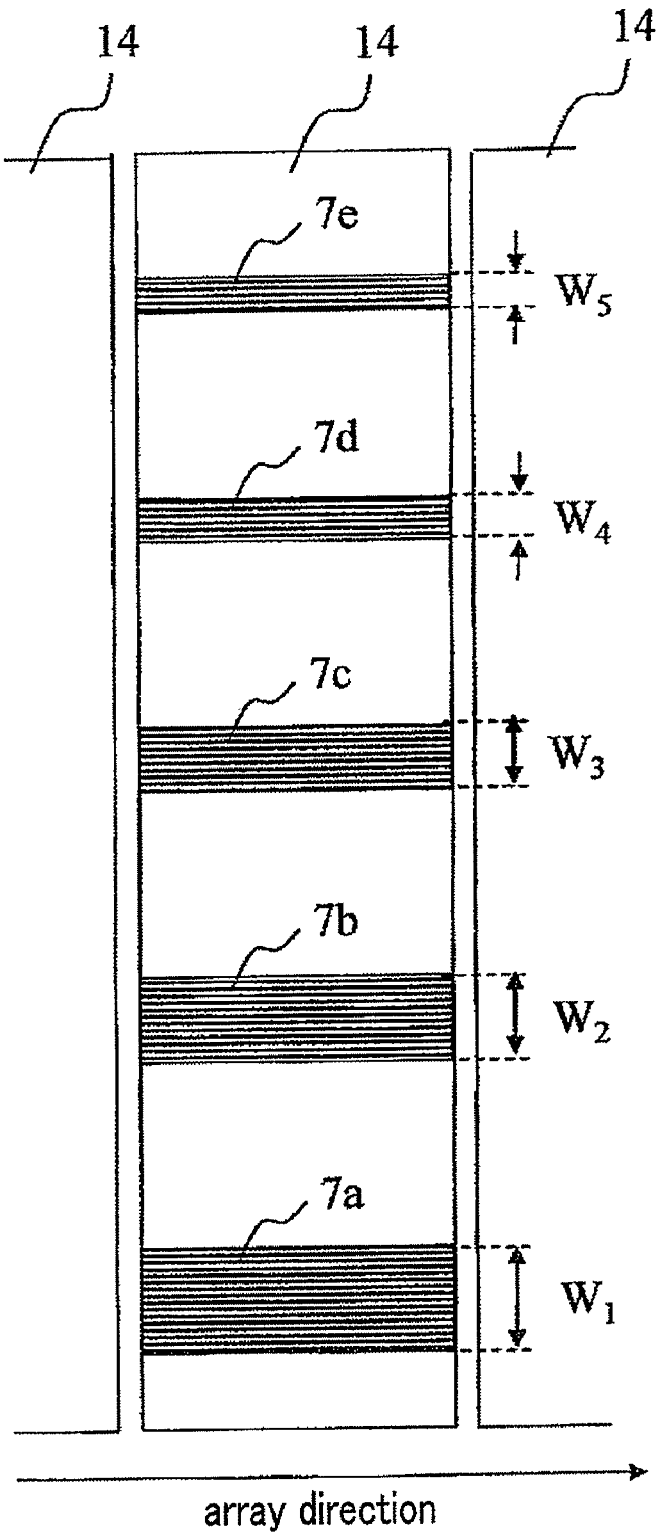
FIG. 16 is a top view of an ultrasonic transducer in a second embodiment.
Figure 17:
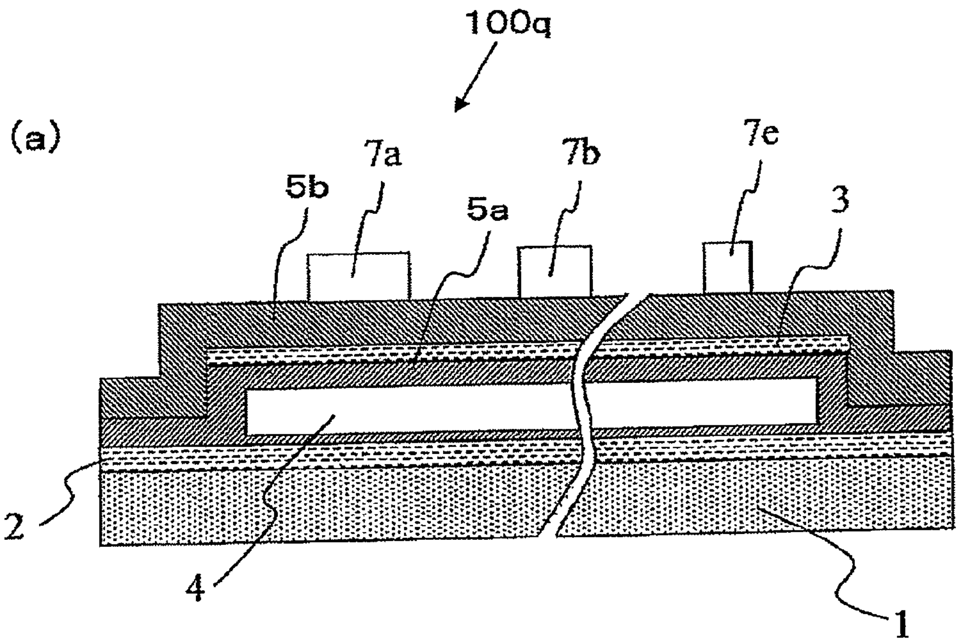
FIG. 17 is a schematic cross-sectional view of the ultrasonic transducer in the second embodiment.
Figure 17:
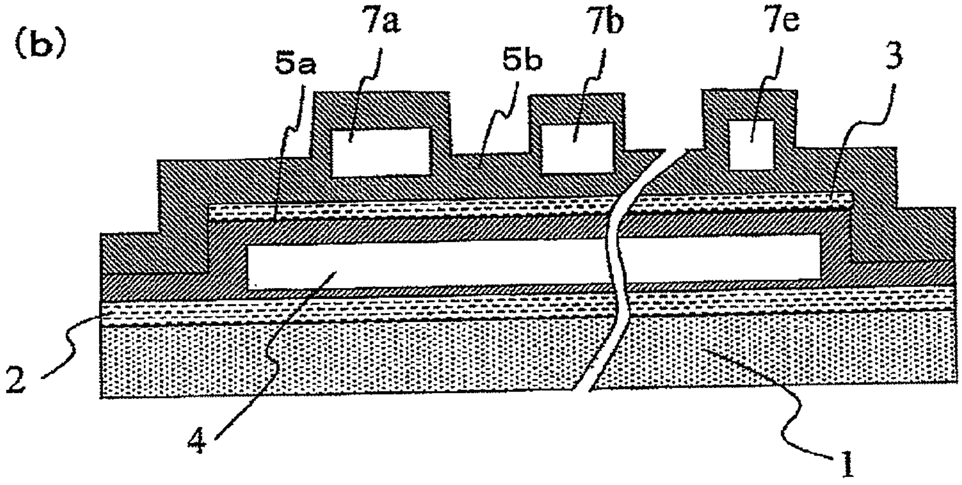

FIG. 16 is a schematic plan view of an ultrasonic transducer in a second embodiment. FIG. 17(*a*) is a schematic cross-sectional view of it. As shown in FIGS. 16 and 17(*a*), by arranging plural beams 7*a* to 7*e* having different widths on the surface of an outer diaphragm layer 5*b*, an ultrasonic transducer 100*q* having a wide band can be realized. For the ultrasonic transducer 100*q* in the present embodiment, an element driven by a single electric signal, in other words, a single electric element, is configured with a single diaphragm, wherein the bandwidth as the entire diaphragm is widened by aligning plural beams 7 having different center frequencies on the single diaphragm.

In the example, shown in FIG. 16, plural rectangular beams 7*a* to 7*e* are formed crossing the short side direction of diaphragms, on a rectangular outer diaphragm layer 5*b* configuring a single ultrasonic transducer. The widths of the shorter sides of the beams 7*a*, 7*b*, 7*c*, 7*d*, and 7*e* are respectively $W_1$, $W_2$, $W_3$, $W_4$ and $W_5$, and the widths $W_1$ to $W_5$ are different from each other. In a case where the beams 7 do not intersect, as shown in FIG. 16, or the intersection parts of beams 7 have little contribution, the relationship between the diaphragm and the beams 7 is the same as the relationship between $W_1$, $W_2$ and $W_3$, in FIG. 5, and the resonance frequencies. As shown in FIG. 17(*b*), beams with different widths may be embedded inside the outer diaphragm layer 5*b*.

Also in the case of the ultrasonic transducer 100*q* shown in FIG. 16, beams 7 having respective center frequencies are disposed with periodicity as little as possible, the same as described above, with care not to form grating lobes (unnecessary emission).

In the above described embodiments, description has been made taking an example of one dimensional array for photographing a two dimensional tomographic image. However, also in the case of a two dimensional array or 1.5 dimensional array, plural diaphragms configure one electric element though the number of diaphragms configuring one element decreases. Therefore, it is possible to achieve a transducer array for which electric elements are disposed, wherein each of the electric elements is configured with plural diaphragms having minimized gaps therebetween and different center frequencies. This is a feature of the invention. An 1.5 dimensional array has a structure for which an array is arranged also along the direction (long axis) for scanning the position or direction of an ultrasonic beam, in other words, along the direction (short axis) perpendicular to the imaging plane, and thereby focusing along the short axis can be made variable.

(Third Embodiment)

Now, a third embodiment in accordance with the invention will be described, referring to FIGS. 18 to 27. Herein the same elements as those in the first and second embodiments will be given the same symbols, and description common to these elements will be appropriately omitted.

Figure 18:
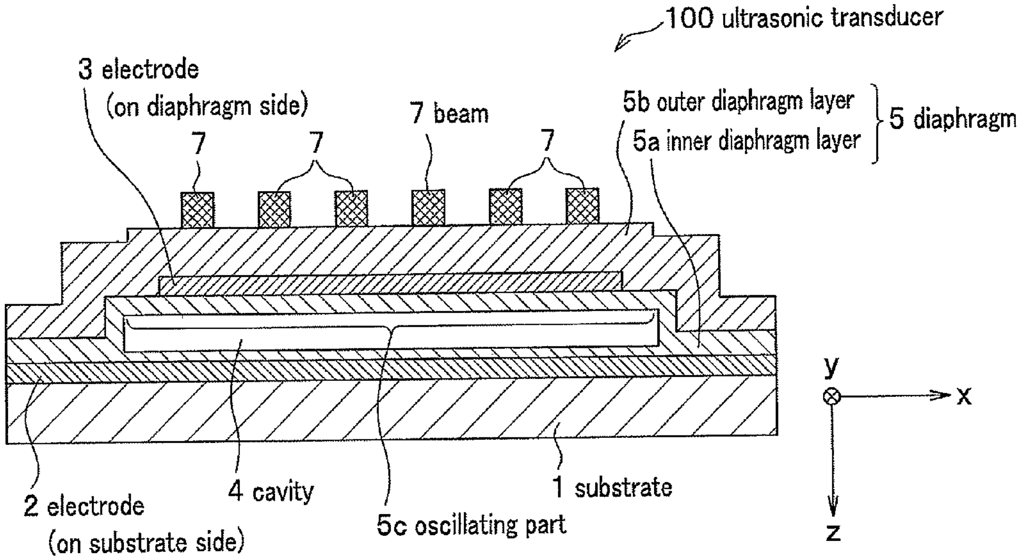
FIG. 18 is a vertical cross-sectional view showing an ultrasonic transducer in a third embodiment.
Figure 19:
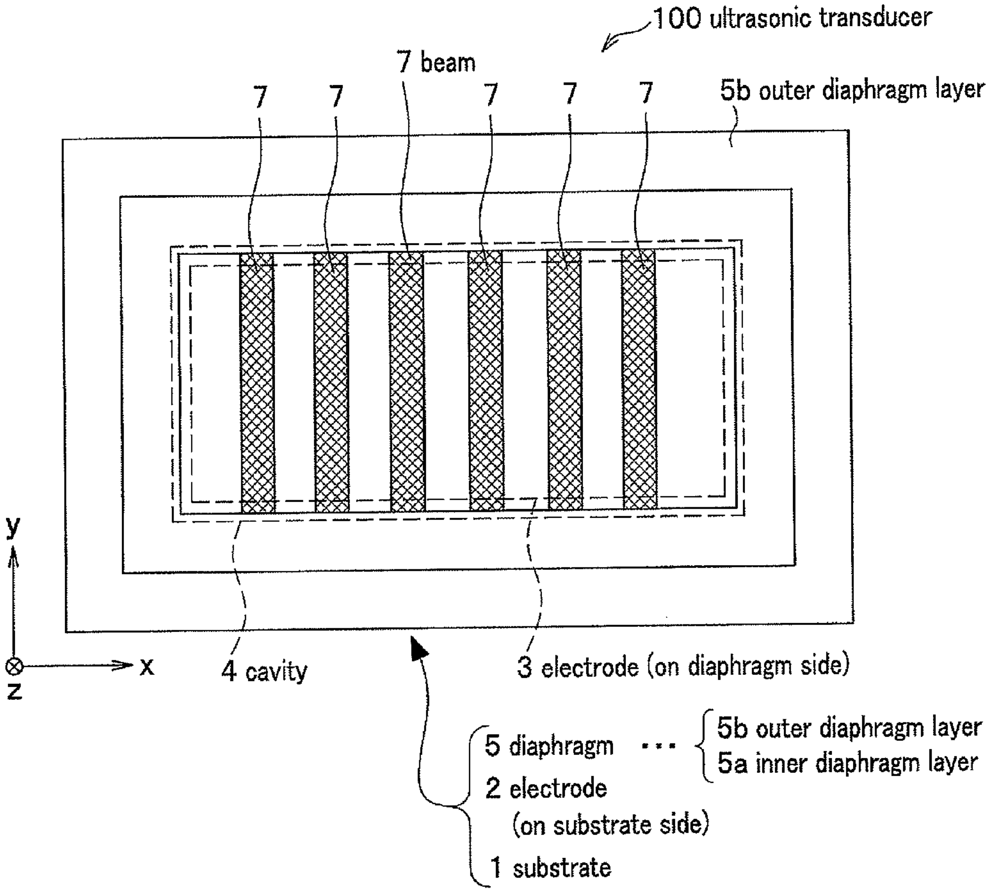
FIG. 19 is a plan view showing the ultrasonic transducer in the third embodiment.

FIG. 18 is a vertical cross-sectional view showing an ultrasonic transducer 100 in the third embodiment. FIG. 19 is a plan view showing the ultrasonic transducer 100.

Hereinafter, for brevity of description, the same as in the case of FIG. 40, the direction where the ultrasonic transducer 100 receives ultra sound, namely, the downward direction in FIG. 18 and the perpendicular downward direction with respect to the sheet of FIG. 19 will be referred to as z direction. Further, right direction in FIGS. 18 and 19 will be referred to as x direction, and the perpendicular downward direction with respect to FIG. 18, which is also the upward direction in FIG. 19, will be referred to as y direction.

As shown in FIGS. 18 and 19, this ultrasonic transducer 100 is an electrostatic diaphragm transducer including a flat plate shaped substrate 1 of insulating material, such as a monocrystalline silicon, or semiconductor material, an electrode 2 disposed on the top of the substrate 1 and formed of a conductive material, such as aluminum, in a thin film shape, a diaphragm 5 disposed on the top surface of the electrode 2 and formed in a thin plate shape, and one or plural beams 7 formed on the top of the diaphragm 5. Herein, for brevity of description, for this ultrasonic transducer 100, the surface which is provided with the diaphragm 5 and transmits ultra sound will be referred to as the top surface and the surface on the side of the substrate 1 will be referred to as the bottom surface.

The diaphragm 5 has a cavity 4 therein, and the portion covering the top of the cavity 4 forms an oscillating part 5*c* for generating ultra sound by oscillation. The diaphragm 5 includes the cavity 4 making the distance between the oscillating part 5*c* of the diaphragm 5 and the electrode 2 on the substrate 1 side, and provided with an inner diaphragm layer 5*b* which causes insulation so that the electrode 2 on the substrate 1 side and an electrode 3 (described later) on the diaphragm 5 side are not electrically conducted with each other even when the oscillating part 5*c* is deformed excessively, an outer diaphragm 5*b* formed such as to cover the top surface of the inner diaphragm 5*a*, and the electrode 3 disposed on the diaphragm 5 side and formed of the same material as the electrode 2 and in a thin film shape between the inner diaphragm layer 5*a* and the outer diaphragm layer 5*b*.

The materials of diaphragms 5 and beams 7 are those described in U.S. Pat. No. 6,359,367, for example. Examples are silicon, sapphire, any sort of glass material, polymers (such as polyimide), polysilicon, silicon nitride, silicon oxynitride, thin film metals (such as aluminum alloys, copper alloys and tungsten), spin-on-glasses (SOGs), implantable or diffused dopants and grown films such as silicon oxides and silicon nitrides.

In a steady state, the distance between the oscillating part 5*c* of the diaphragm 5 and the substrate 1, that is the thickness of the cavity 4 (dimension in z direction) is maintained mainly by the stiffness in the upper and lower direction (z direction) of both or either the inner diaphragm layer 5*a* or the outer diaphragm layer 5*b*. Further, this stiffness is reinforced in a predetermined direction by the beams 7.

That is, a significant feature of an ultrasonic transducer 100 in the present embodiment is that beams 7 are arranged on a diaphragm 5, and the stiffness of the diaphragm 5 is adjusted. For the transducer 100, a desired combination of a resonance frequency $f_b$ and a fractional bandwidth $f_h$ can be achieved by appropriately setting the combination of the thickness (the length along z direction) of the diaphragm 5 and the thickness (the length in z direction) of the beams 7.

In order to change the planar shape (dimensions in x direction and y direction) of the diaphragm 5 and beams 7, different masks (not shown) are required in the manufacturing process. However, these thicknesses (dimension in z direction) can be changed by just changing the control of the manufacturing process, such as adjusting the time for depositing a material of the diaphragm to a desired thickness, which brings an advantage of manufacturing by the same manufacturing equipment.

When briefly described as an electric element, this ultrasonic transducer 100 acts as a variable capacity capacitor having an electrode 2 on the substrate 1 side and an electrode 3 on the diaphragm 5 side, the both electrodes serving as polar plates, with the cavity 4 disposed therebetween and functioning as a dielectric. Specifically, when a force is applied to the diaphragm 5, the diaphragm is displaced and thereby the distance between the electrode 2 and electrode 3 changes, thus the capacitance of the capacitor changes. When a difference in potential is applied to the electrode 2 and electrode 3, respective opposite charges are accumulated in them to cause forces acting on each other, and thus the diaphragm 5 is displaced. That is, the ultrasonic transducer 100 is an electro-acoustic conversion element that converts a high frequency electric signal, which has been input, into an ultrasonic signal and emits the ultrasonic signal to a medium, such as water or a living organism, and then converts an ultrasonic signal being input from the medium into a high frequency electric signal and outputs the high frequency electric signal.

Figure 20:
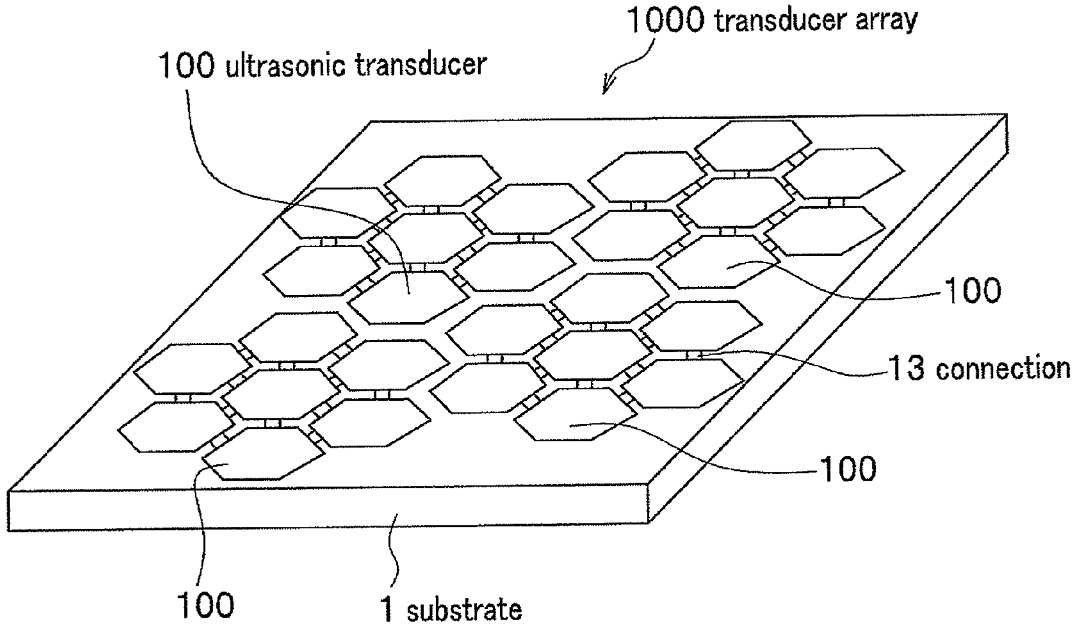
FIG. 20 is a perspective view of a transducer array.

FIG. 20 is a perspective view showing a transducer array 1000.

This transducer array 1000 serves as the ultra sound transmission/reception surface of an ultrasonic probe (not shown), and is formed with a number of ultrasonic transducers 100, described above, on a substrate 1, the ultrasonic transducer 100 being connected by connections 13 by the unit of a predetermined number. The number of the ultrasonic transducers 100 is not limited to the number shown, and ultrasonic transducers 100 in an even greater number may be integrated on a larger substrate 1, depending on a semiconductor manufacturing technology. Individual ultrasonic transducers 100 or ultrasonic transducers 100 bundled by a unit of predetermined number are connected through a transmission and reception switch to a transmission beam-former and a reception beam-former (both not shown) of an ultrasonic imaging device provided with this ultrasonic probe, and acts as a phased array to be utilized for transmission and reception of ultra sounds. The shown array of the ultrasonic transducer 100 is an example, and other forms of arrays may be arranged, including a honeycomb shape and grid shape. Further, the array surface may be either a flat surface or curved surface, and the outline of the surface may be formed in a circle shape, polygonal shape, or the like. Or, the ultrasonic transducers 100 may be disposed on a line or a curve.

This ultrasonic probe is provided with a transducer array 1000 formed, for example, in an array shape having a plurality of groups of ultrasonic transducers 100 arrayed on a line, or formed in a convex type having a plurality of ultrasonic transducers 100 arrayed in a fan shape. Further, on the medium (specimen) side of the ultrasonic transducers 100 of this ultrasonic probe, there are arranged an acoustic lens for convergence of ultrasonic beams, and an acoustic matching layer for matching the acoustic impedance between the ultrasonic transducers 100 and the medium (specimen). Further, on the back side (reverse side with respect to the medium side), a packing member for absorbing propagation of ultrasonic waves is arranged.

Figure 21:
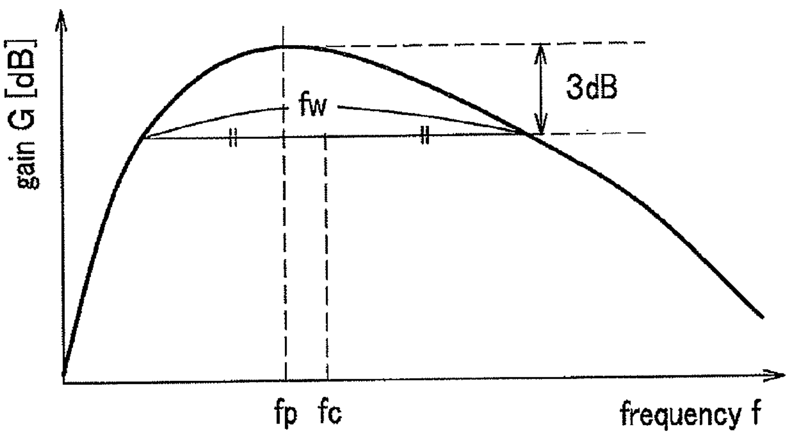
FIG. 21 is a diagram of a graph showing an example of the frequency versus gain response of an ultrasonic transducer.

FIG. 21 is a diagram of a graph showing an example of frequency versus gain response of an ultrasonic transducer 100. In this graph, the horizontal axis represents frequency f, and the vertical axis represents sensitivity G (Gain) indicating electro-mechanical conversion efficiency. Herein, frequency f at which the sensitivity G is the highest is defined as peak frequency $f_p$, and the range where sensitivity G is not smaller than −3 [dB] from the highest value is defined as the frequency bandwidth $f_w$. The frequency at the center of frequency bandwidth $f_w$ is defined as center frequency $f_c$, and the value of frequency bandwidth $f_w$ divided by center frequency $f_c$ (in other words, the value of frequency bandwidth $f_w$ normalized by center frequency $f_c$) is defined as fractional bandwidth $f_h$ (not shown).

One of the significant basic characteristics of an ultrasonic transducer 100 is gain G. Gain G means the efficiency of mutual conversion between electric energy and mechanical energy, such as mechanical energy of a sound wave. Accordingly, in view of increasing the transmission efficiency and detecting faint sound wave signals, gain G of the ultrasonic transducers 100 is desired to be high.

Further, another one of the significant characteristics of the ultrasonic transducers 100 is the fractional bandwidth $f_h$. The greater the fractional bandwidth $f_h$, the wider the usable frequency range, and thus a single ultrasonic transducer 100 can be used for various purposes, which is an advantage of the ultrasonic transducer 100. Further, if the fractional band width $f_h$ is greater, ultrasonic pulses with narrower pulse widths (in other words, the occupied frequency band width is wider) can be formed, which is an advantage achieving high distance resolution in ultrasonic imaging.

However, as derived from the energy conservation law, the height of sensitivity G and the width of fractional bandwidth $f_h$ contradict with each other. Therefore, in designing an ultrasonic transducer 100, it is important to be able to select a combination of a desired center frequency $f_c$ and fractional band width $f_h$ within this limitation.

Since an ultrasonic transducer 100 is a diaphragm type, the center frequency $f_c$ and the resonance frequency $f_b$ are substantially the same. The resonance frequency fb, stiffness D and mass m of a diaphragm 5 have relationship in Expression (1). Fractional band width $f_h$ has a relationship in Expression (2).

The stiffness D and mass m of a diaphragm 5 are defined by the planar shape and thickness thereof when the material is determined in advance. Accordingly, if both the planar shape and the thickness of the diaphragm 5 can be properly set, a desired frequency spectrum (combination of the center frequency $f_c$ (≅ resonance frequency $f_b$) and the fractional band width $f_h$) can be obtained.

Figure 22:
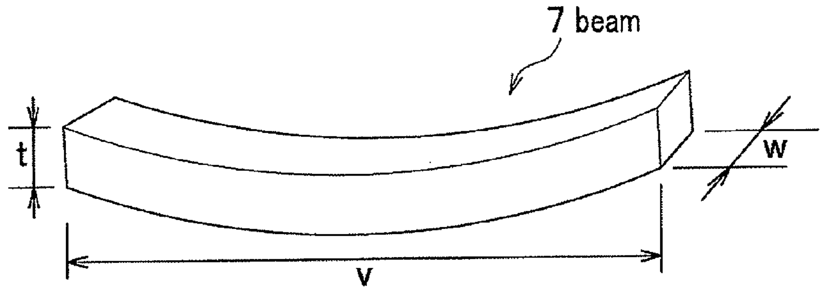
FIG. 22 is a schematic view showing a bending state of a beam.

FIG. 22 is a schematic diagram showing a bending state of a beam 7.

The beam 7 is in a rectangular solid shape with a width of w, length of v and thickness of t when no force is applied. The stiffness D in the thickness direction (oscillation direction of the diaphragm 5: z direction) of the beam 7 has the following relation in Expression (6), wherein the mass of the beam 7 is represented by m, and the Young's Module is represented by E.

$$D \propto Ew\left(\frac{t}{v}\right)^3 \tag{6}$$

On the other hand, the mass m of the beam 7 is obtained by the following Expression (7), wherein the density is represented by ρ.

$$m=\rho wvt \tag{7}$$

The resonance frequency $f_b$ in the thickness direction t (z direction; oscillation direction of the diaphragm 5) of the beam 7 has the relationship of the following Expression (8).

$$f_b^2 \propto D/m=Et^2/(\rho v^4) \tag{8}$$

Therefore, the resonance frequency $f_b$ of the beam 7 is proportional to the thickness t.

Further, the fractional band width $f_h$ is proportional to the attenuation constant ζ, and the attenuation constant ζ has the relationship in the following Expression (9).

$$\zeta \propto 1/\sqrt{Dm} \tag{9}$$

Herein, if Expression (8) is assigned to Expression (9), the following Equation (10) is obtained.

$$\zeta \propto 1/(f_b m) \tag{10}$$

From this Expression (10), it is understood that the attenuation constant ζ is inversely proportional to the mass m of the beam 7 when the resonance frequency $f_b$ is constant. That is, it is understood that the fractional band width $f_h$ is inversely proportional to the thickness t when the width w and the length v are determined in advance.

In order to realize a desired resonance frequency $f_b$ of a beam 7 in a rectangular solid shape, the thickness t is uniquely determined, when the planar shape (width w and length v) is determined in advance. Further, if the material and respective dimensions of the beam 7 are determined, then the mass m is also determined, and thereby the fractional band width $f_h$ is also uniquely determined. Still further, this description on the beam 7 is also true in the case of parts which can be assumed to be a rectangular homogeneous solid shape, for example, the oscillating part 5*c* (the flat shaped portion excluding the beams 7) of the diaphragm 5.

Figure 23:
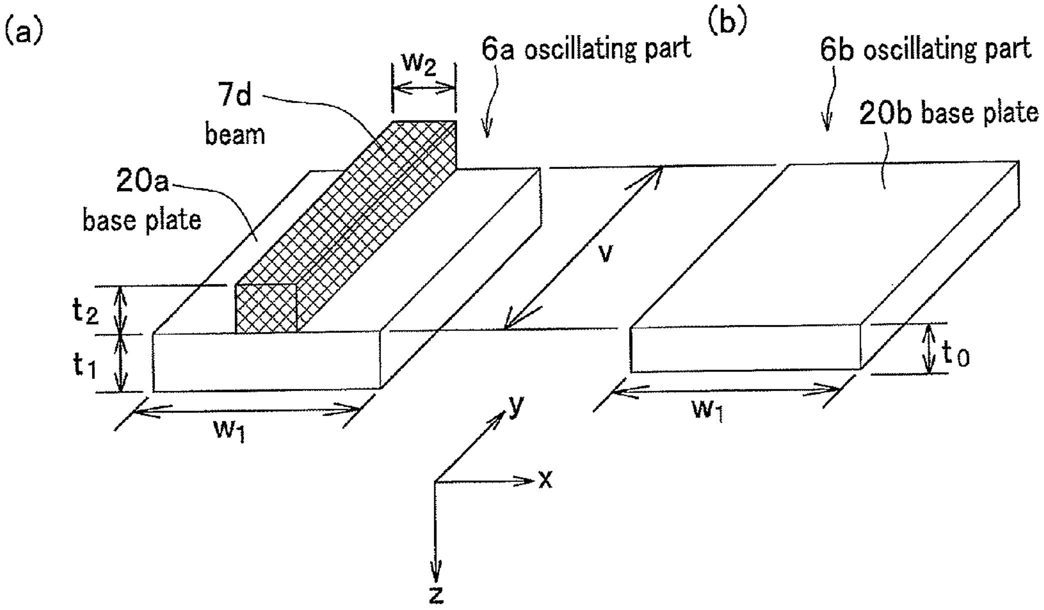
FIG. 23 is a schematic perspective view of an oscillating body in accordance with the invention and an oscillating body of a comparative example.

FIG. 23 is a perspective view schematically showing an oscillating body 6*a* in accordance with the invention, and an oscillating body 6*b* in a comparative example.

As shown in FIG. 23(*a*), the oscillating body 6*a* in accordance by the invention follows the oscillating part 5*c* of the diaphragm 5 in the third embodiment, and is provided with a base plate 20*a* in a flat plate form and a single beam 7*d* on the base plate 20*a*. The thickness of the base plate 20*a* is $t_1$, and the thickness of the beam 7*d* is $t_2$. As shown in FIG. 23(*b*), the oscillating body 6*b* of the comparative example has a shape of the above described oscillating body 6*a* without the beam 7, and formed of a base plate 20*b* in a flat plate form. The thickness of the base plate 20*b* is $t_0$.

The length (dimension in y direction) of the base plate 20*a* and beam 7*d* of the oscillating body 6*a* and the length of the base plate 20*b* of the oscillating body 6*b* are both v. The both widths (dimension in x direction) of the base plate 20*a* and the base plate 20*b* are $w_1$, and the width (dimension in x direction) of the beam 7*d* is $w_2$. The materials of the base plate 20*a*, base plate 20*b*, and beam 7*d* are all the same.

Figure 24:
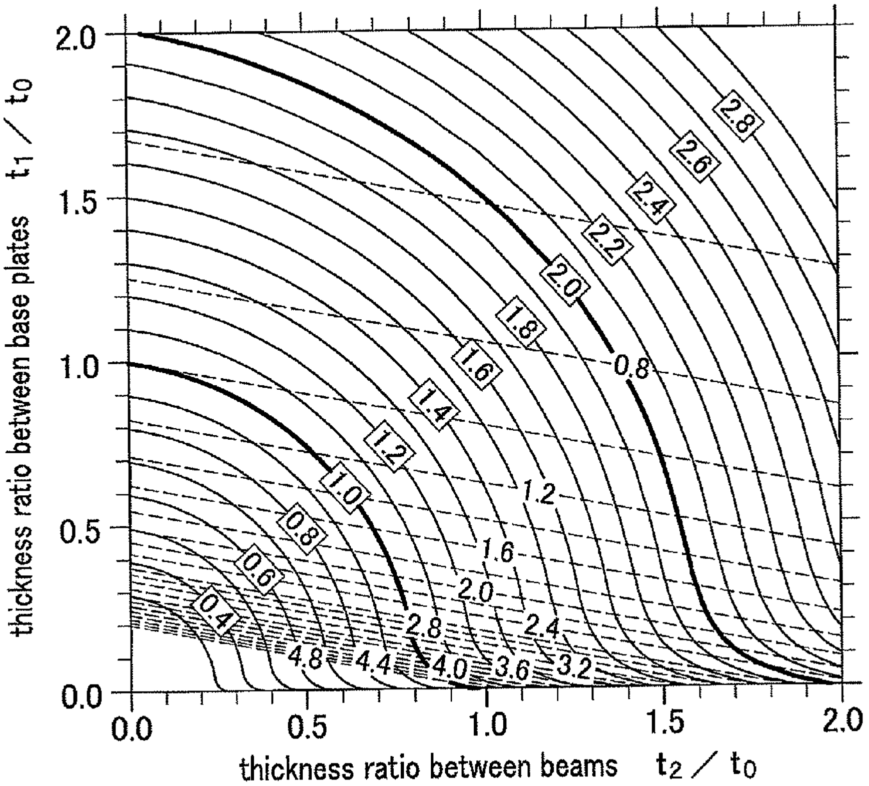
FIG. 24 is diagram of graphs showing a result of calculation of resonance frequency and fractional bandwidth in a case where the width of a beam of an oscillating body is set to 20 percent of the width of a base plate.

FIG. 24 is a diagram of graphs showing a result of calculation of resonance frequencies $f_b$ and fractional bandwidths $f_h$ in a case where the width $w_2$ of the beam 7*d* of an oscillating body 6*a* in accordance with the invention is set to 20 percent of the width $w_1$ of a base plate 20*a*. The horizontal axis indicates the thickness ratio $t_2/t_0$ of a beam, namely, the value of the thickness $t_2$ of the beam 7*d* of the oscillating body 6*a* normalized by the thickness $t_0$ of the base plate 20*b* of an oscillating body 6*b*. The vertical axis indicates the thickness ratio $t_1/t_0$, namely, the thickness $t_1$ of the base plate 20*a* of the oscillating body 6*a* normalized likewise by the thickness $t_0$ of the base plate 20*b* of the oscillating body 6*b*.

Each solid graph represents the value of the resonance frequency $f_b$ of oscillating bodies 6*a* in accordance with the invention normalized by the resonance frequency $f_b$ of an oscillating body 6*b* of a comparative example. The numeral given to each solid graph indicates the value of a normalized resonance frequency $f_b$, wherein the values of normalized resonance frequencies $f_b$ are all the same at arbitrary positions on a same solid graph.

Each dashed graph represents the fractional bandwidth $f_h$ of oscillating bodies 6*a* in accordance with the invention normalized by the fractional bandwidth $f_b$ of the oscillating body 6*b* of the comparative example. The numeral given to each dashed graph indicates the value of a normalized fractional bandwidth $f_h$, wherein the values of normalized fractional bandwidths $f_h$ are all the same at arbitrary positions on a same dashed line.

For example, when a beam 7*d* is not provided on an oscillating body 6*a* in accordance with the invention (in other words, the thickness $t_2$ of the beam 7*d* is set to zero), this oscillating body 6*a* is equivalent to a base plate 20*b* with a thickness of $t_0$ of a comparative example. That is, the thickness ratio $t_1/t_0$ of the base plate 20*a* of this oscillating body 6*a* is set to 1.0, and the thickness ratio $t_2/t_0$ of the beam 7*d* is set to 0.0. Herein, in order to change the fractional bandwidth $f_h$, having the resonance frequency $f_b$ be constant, a combination of a thickness ratio $t_1/t_0$ and a thickness ratio $t_2/t_0$ is selected such that the value of the normalized resonance frequency $f_b$ is 1.0 (moving on a solid graph given with "1.0"), and thus the thickness $t_1$ of a base plate 20*a* and the thickness $t_2$ of a beam 7*d* can be obtained.

Further, for example, in order to make the resonance frequency $f_b$ of an oscillating body 6*a* in accordance with the invention be twice as large as that of an oscillating body 6*b* of the comparative example and obtain a desired fractional bandwidth $f_h$, a combination, which achieves the desired normalized value of a fractional bandwidth $f_h$, of a thickness ratio $t_1/t_0$ and a thickness ratio $t_2/t_0$ is selected with the value of a normalized resonance frequency $f_b$ be 2.0 (moving on the solid graph given with "2.0" and finding the intersection point between this solid graph and a dashed graph given with the desired normalized value of a fractional bandwidth $f_h$), and thus the thickness $t_1$ of a base plate 20*a* and the thickness $t_2$ of a beam 7*d* can be obtained.

As described above, since an oscillating body 6*a* has a structure provided with a beam 7*d* on a base plate 20*a*, by properly setting the respective thicknesses (dimension in z direction) of these elements (the base plate 20*a* and the beam 7*d*), a desired frequency spectrum (a combination of a resonance frequency $f_b$ and a fractional bandwidth $f_h$) can be realized, even without changing the planar shape of these elements.

Figure 25:
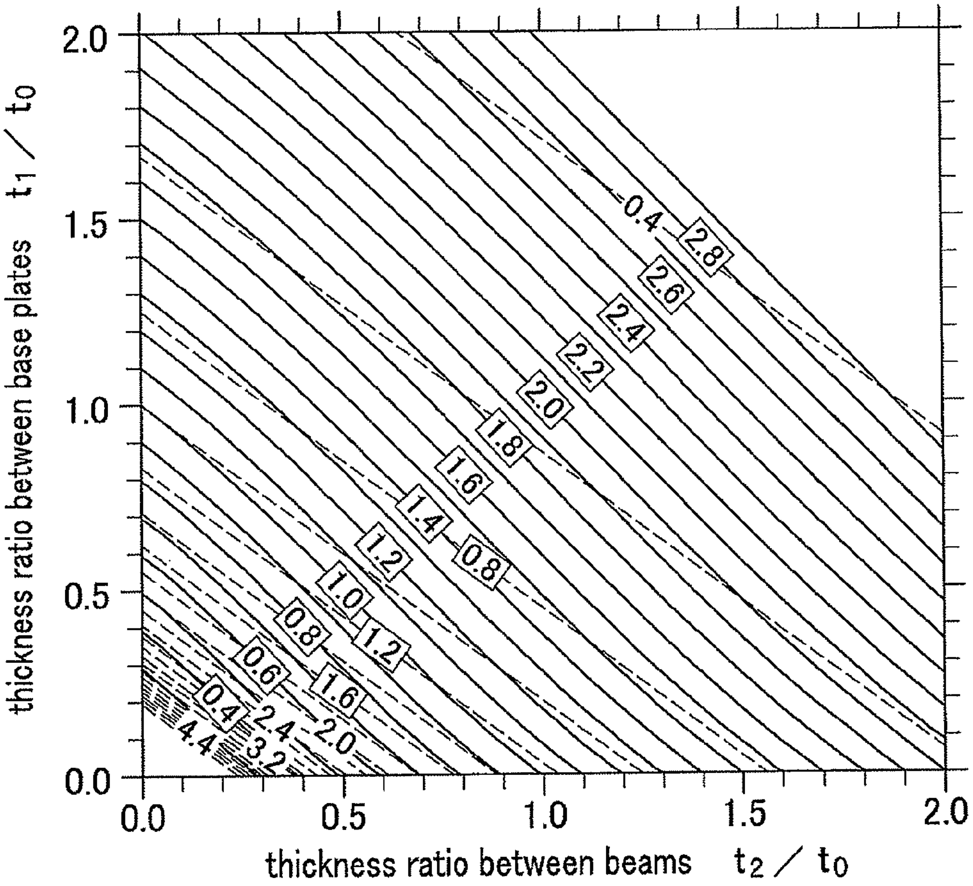
FIG. 25 is a diagram of graphs showing a result of calculation of resonance frequency and fractional bandwidth in a case where the width of a beam of an oscillating body is set to 80 percent of the width of a base plate.

FIG. 25 is a diagram of graphs showing a result of calculation of resonance frequencies $f_b$ and fractional bandwidths $f_h$ in a case where the width $w_2$ of the beam 7*d* of an oscillating body 6*a* in accordance with the invention is set to 80 percent of the width $w_1$ of a base plate 20*a*.

Comparison of FIG. 24 and FIG. 25 proves that, if the ratio of the width $w_2$ of the beam 7*d* of an oscillating body 6*a* to the width $w_1$ of a base plate 20*a* is different from that in another case while the thickness $t_2$ of the beam 7*d* and the thickness $t_1$ of the base plate 20*a* are changed in the same way as in the other case, the frequency spectrum changes differently from the other case.

Specifically, when the width $w_2$ of the beam 7*d* is increased having the width $w_1$ of the base plate 20*a* be constant, the planar shape of the beam 7*d* and the planar shape of the base plate 20*a* become closer to each other. Accordingly, if the resonance frequency $f_b$ is maintained constant, the adjustable range of the fractional bandwidth $f_h$ achieved by selecting a combination of the thickness $t_1$ of the base plate 20*a* and the thickness $t_2$ of the beam 7*d* becomes narrower.

Therefore, in order to effectively change the frequency spectrum by changing the thickness t2 of the beam 7*d*, the width w2 of the beam 7*d* is made as small as possible compared with the width w1 of a base plate 20*a* in a range allowed by manufacturability. In the above description, the material of the base plate 20*a* and the material of a beam 7*d* are the same, however, the same effect can be achieved also using different materials.

Figure 26:
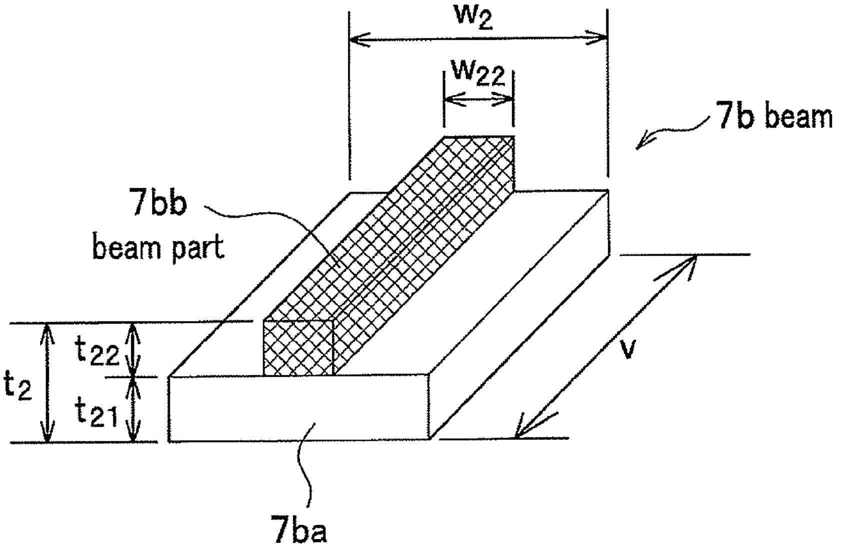
FIG. 26 is a schematic perspective view of a beam of a modified example.

FIG. 26 is a schematic perspective view showing a beam 7*d* of a modified example.

This beam 7*b* is configured with a beam part 7*ba* with a width of $w_2$, the beam part 7*ba* being a part of the beam 7*b*, and a beam part 7*bb* with a different width of $w_{22}$, the beam part 7*bb* being another part of the beam 7*b*, wherein the beam parts 7*ba* and 7*bb* are joined with each other with respect to the thickness direction (z direction) with the same long axis direction. For this beam 7*d*, the thickness $t_{21}$ of the beam part 7*ba* and the thickness $t_{22}$ of the beam part 7*bb* can be selected independently. Consequently, without changing the planar shapes of the beam part 7*ba* and the beam part 7*bb*, it is possible to obtain an infinite number of combinations of the thickness $t_{21}$ of the beam part 7*ba* and the thickness $t_{22}$ of the beam part 7*bb* which maintain a constant ratio between the stiffness D with respect to the thickness direction and the mass m of the entire beam 7*b*. That is, using such a beam 7*b*, while having the resonance frequency $f_b$ be constant, the fractional bandwidth $f_h$ can be continuously changed by changing the combination of the thickness $t_{21}$ of the beam part 7*ba* and the thickness $t_{22}$ of the beam part 7*bb*.

Figure 27:
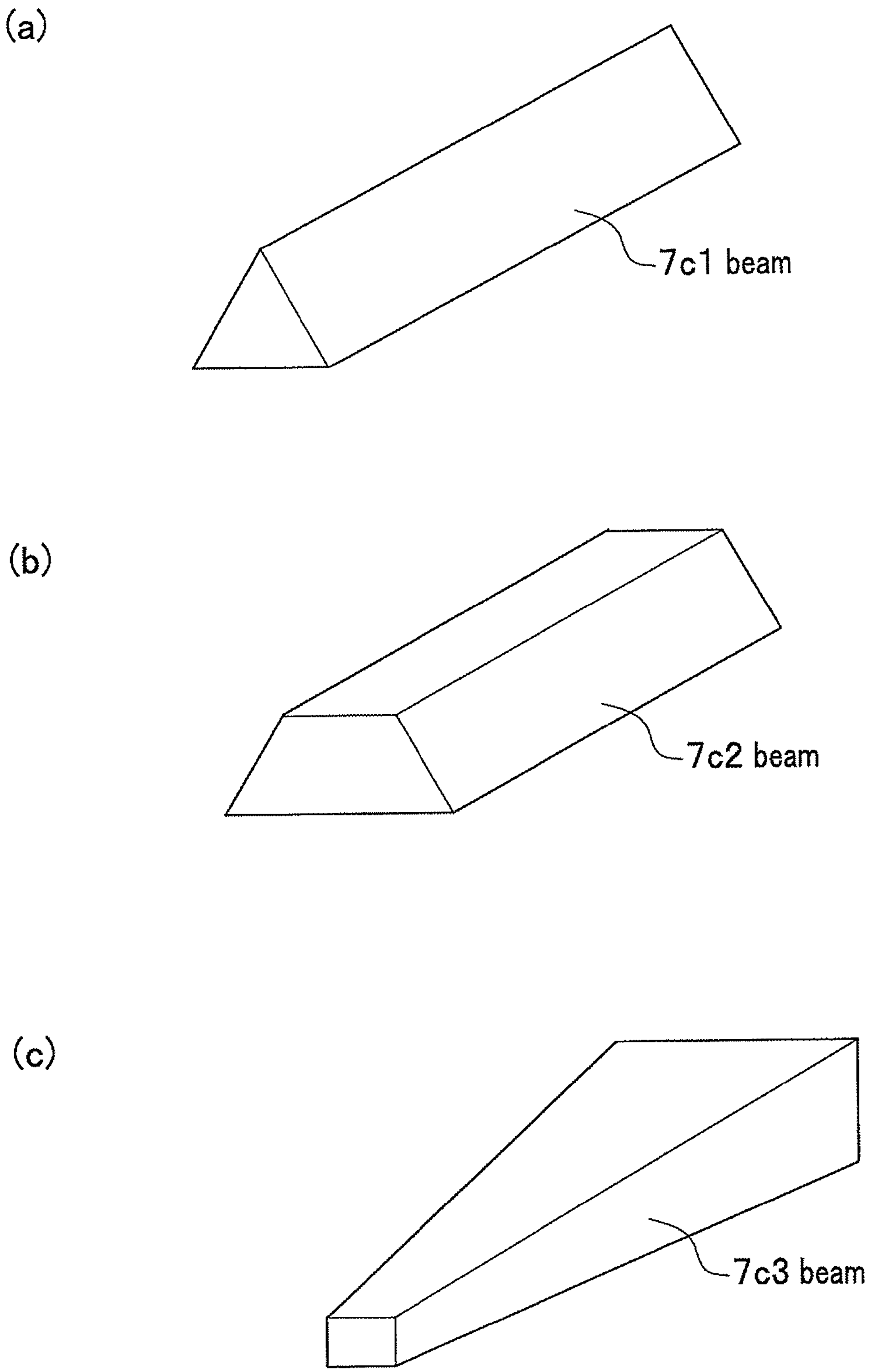
FIG. 27 is a schematic perspective view of beam shapes of other modified examples.

FIG. 27 is a perspective view showing the shapes of a beam 7*c*1, 7*c*2 and 7*c*3 of other modified examples.

For example, as shown in FIG. 27(*a*), the beam 7*c*1 having a cross-section in a triangle shape may be employed. As shown in FIG. 27(*b*), the beam 7*c*2 having a cross-section in a trapezoidal shape may be employed. Further, as shown in FIG. 27(*c*), the beam 7*c*3 of which width changes along the long axis direction may be employed.

In such a manner, the beam may have a rectangular solid shape, in other words, a shape with rectangular cross-sections in the short and long axis directions, or any other shape as long as the thickness (dimension along the oscillation direction of the diaphragm 5, namely, z direction) can be controlled during a manufacturing process. For example, the beam may have a cross-section in a polygonal shape, such as a triangular, rectangular, trapezoidal or another quadrilateral shape, or a cross-section, such as a circular, ellipsoidal shape or the like, or a cross-section which changes along a certain direction.

Next, referring to FIGS. 28 to 39, other embodiments in accordance with the invention will be described. The structures and operations in these embodiments may be basically the same as those in the third embodiment except the points described later. Ultrasonic transducers 100*b* to 1001 in the later described fourth to fourteenth embodiments can also be used in the ultrasonic probe described above.

(Fourth Embodiment)

Figure 28:
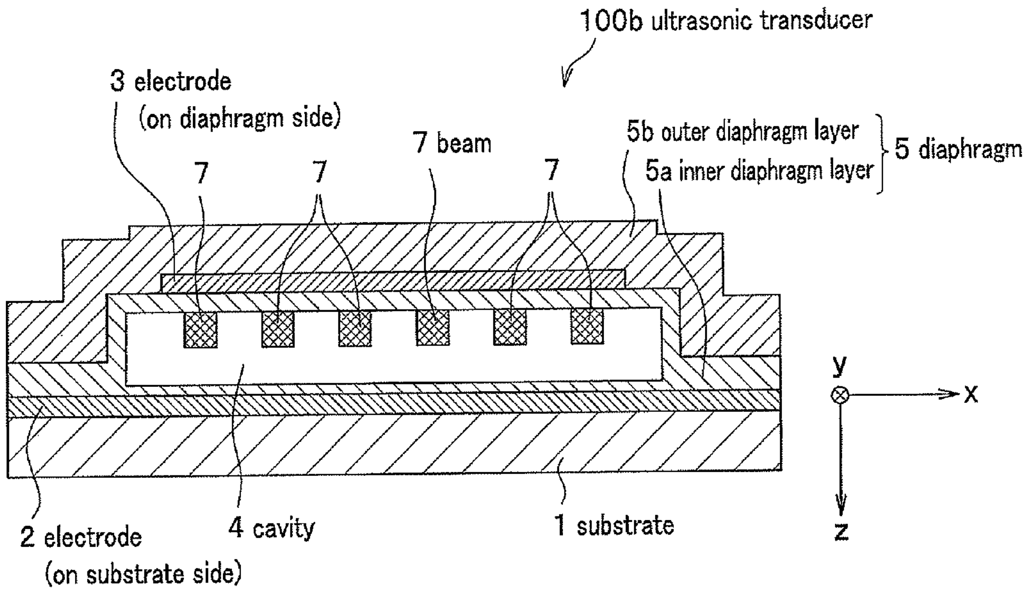
FIG. 28 is a vertical cross-sectional view of an ultrasonic transducer in a fourth embodiment.

FIG. 28 is a vertical cross-sectional view showing an ultrasonic transducer 100*b* in a fourth embodiment. This ultrasonic transducer 100*b* has a structure having beams 7 inside a cavity 4 of a diaphragm 5 (inner diaphragm layer 5*a*). That is, in the present embodiment, the beams 7 are disposed adjacent to an electrode 3 on the surface of the diaphragm 5 and on the side facing an electrode 2 on the substrate 1 side.

This ultrasonic transducer 100*b* has the same effects as in the third embodiment, and allows the surfaces of the diaphragm 5 to be flat.

(Fifth Embodiment)

Figure 29:
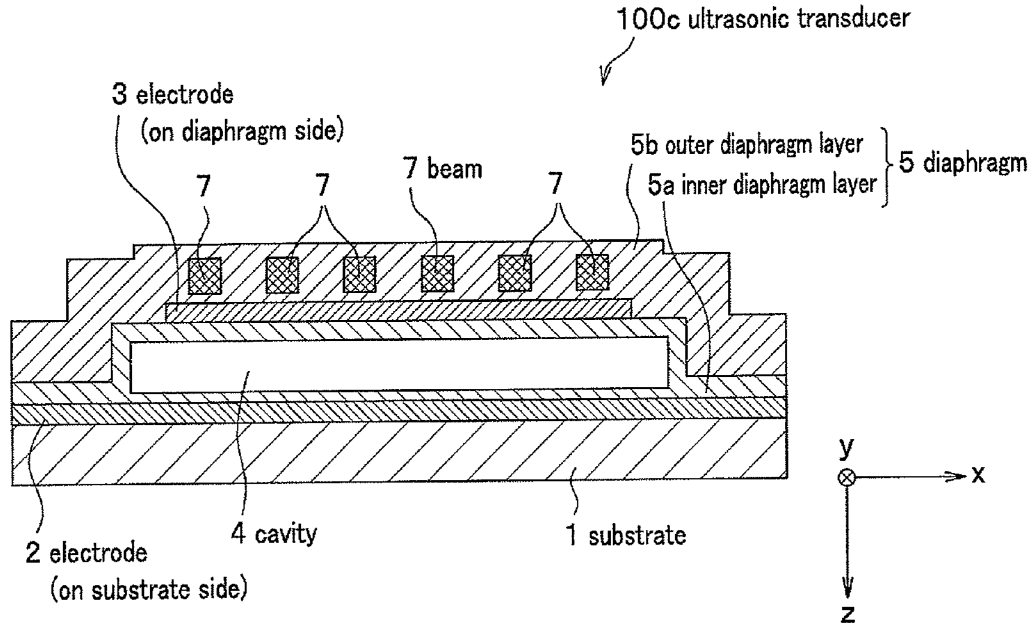
FIG. 29 is a vertical cross-sectional view of an ultrasonic transducer in a fifth embodiment.

FIG. 29 is a vertical cross-sectional view showing an ultrasonic transducer 100*c* in a fifth embodiment.

This ultrasonic transducer 100*c* has a structure having beams 7 implanted in the substrate of a diaphragm 5 (more specifically, an outer diaphragm layer 5*b*). These beams 7 are formed of a material having a higher stiffness (the Young's Module) than that of the diaphragm 5 or a material having a lower stiffness than that of the diaphragm 5. Or, the beams 7 may be formed by cavities with vacuum therein or with air or another kind of gas charged therein.

In this ultrasonic transducer 100*c*, the direction and the amplitude of the stiffness of the diaphragm 5 can be adjusted as desired to change the stiffness, without changing the shape or thickness of the diaphragm 5. Further, the electro-acoustic efficiency can be increased by narrowing the distance between the electrode 2 and electrode 3.

Herein, the beams 7 may be formed directly inside the inner diaphragm layer 5*a* or the outer diaphragm layer 5*b*, or may be formed by arranging recessions on the surface of the inner diaphragm layer 5*a* or the outer diaphragm layer 5*b* and joining the inner diaphragm layer 5*a* and the outer diaphragm layer 5*b* to seal these recessions.

(Sixth Embodiment)

Figure 30:
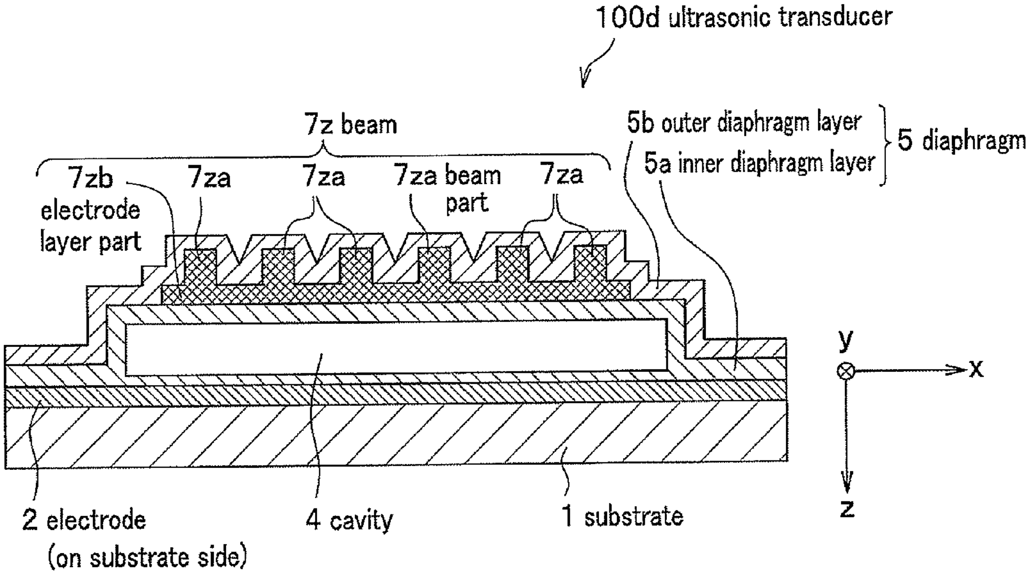
FIG. 30 is a vertical cross-sectional view of an ultrasonic transducer in a sixth embodiment.

FIG. 30 is a vertical cross-sectional view showing an ultrasonic transducer 100*d* in a sixth embodiment. This ultrasonic transducer 100*d* has a structure having a beam 7*z* instead of the above described electrode 3 on the diaphragm side and beams 7. This beam 7*z* is formed, for example, of the same material as the above described electrode 3 on the diaphragm 5 side, or of another conductive material, and includes an electrode layer part 7*zb* in the same shape as the above described electrode 3 on the diaphragm 5 side, the electrode layer part 7*zb* being a part of the beam 7*z*, and beam parts 7*za* having a shape elongated along shown y direction and increasing the stiffness of the diaphragm 5 in y direction, each beam part 7*za* also being a part of the beam 7*z*. Or, the beam parts 7*za* may be disposed in a grid pattern for example, without being limited to a single direction.

In this ultrasonic transducer 100*d*, since the beam parts 7*za* and the electrode-layer part 7*zb* can be formed as a single body, the manufacturing process can be simplified and the structure can be hardened.

Further, this ultrasonic transducer 100*d* may have a structure which secures the most of the stiffness of the diaphragm 5 by the beam 7*z* serving also as an electrode and either the inner diaphragm layer 5*a* or the outer diaphragm layer 5*b*. Accordingly, either the inner diaphragm layer 5*a* or the outer diaphragm layer 5*b* is not required to take the role of securing the stiffness, and can be thinned or omitted. If the beam 7*z* secures most of the stiffness, the inner diaphragm 5*a* is unnecessary in principle. This allows narrowing the distance between the electrode 2 and the electrode 3 and improving the electro-acoustic conversion efficiency.

Or, from the point of view of protecting the beam 7*z* against, or insulating the beam 7*z* from, an external object (not shown), the outer diaphragm layer 5*b* may have a thickness enough for protection or insulation. By thinning the outer diaphragm layer 5*b*, the manufacturing process can be simplified, and the distance between the electro-acoustic conversion section, configured by the beam 7*z* and the electrode 2 on the substrate 1 side, and a measured medium (not shown) can be shortened, which improves the sensitivity.

(Seventh Embodiment)

Figure 31:
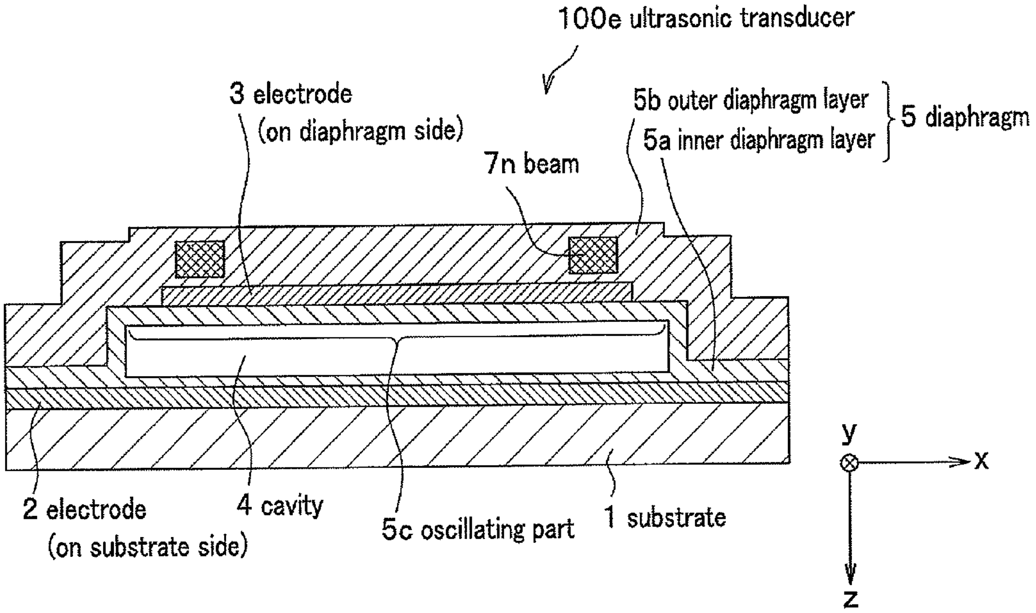
FIG. 31 is a vertical cross-sectional view of an ultrasonic transducer in a seventh embodiment.

FIG. 31 is a vertical cross-sectional view showing an ultrasonic transducer 100*e* in a seventh embodiment.

Instead of the beams 7 in the third embodiment, this ultrasonic transducer 100*e* has a structure having a beam 7*n* formed of a material with a lower stiffness than that of a diaphragm 5 or formed as a cavity, adjacent to the portion where the diaphragm 5 supports itself on the electrode 2 on the substrate 1 side. In other words, this portion is a ring shaped potion inside the diaphragm 5 and is located above the marginal portion of the cavity 4, and is also a portion enclosing the oscillating part 5*c* of the diaphragm 5.

In this ultrasonic transducer 100*e*, the beam 7*n* lowers the stiffness of the marginal portion of the oscillating part 5*c* of the diaphragm 5, and thereby the stiffness of the entire oscillating part 5*c* improves relatively.

Figure 32:
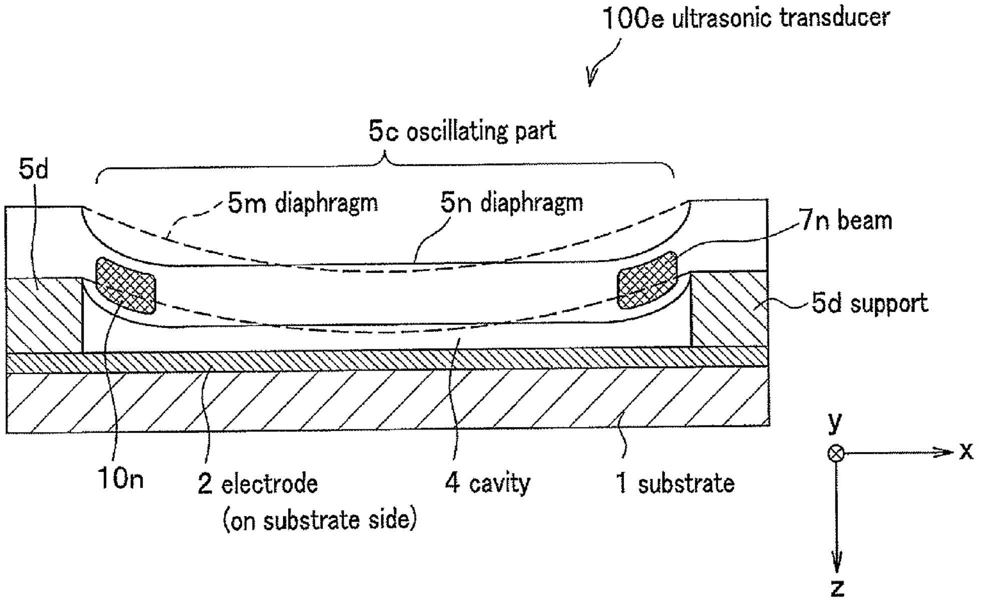
FIG. 32 is a vertical cross-sectional view schematically showing the movement of the ultrasonic transducer in the seventh embodiment.

FIG. 32 is a vertical cross-sectional view schematically showing the movement of the ultrasonic transducer 100*e* in the seventh embodiment.

It is understood that this ultrasonic transducer 100*e* has a structure where a support 5*d* holds the diaphragm 5*n* (shown by the solid curves) on the electrode 2 on the surface of the substrate 1. For comparison, a diaphragm 5*m* in a case where the beam 7*n* is not provided is shown by the dashed curves.

In this ultrasonic transducer 100*e*, when the diaphragm 5 oscillates upon transmission and reception of ultra sound, the diaphragm 5 is deformed greatly in the vicinity of the beam 7*n*, however, the entire oscillating part 5*c* of the diaphragm 5 (shown as diaphragm 5*n*) is uniformly displaced overall while a satisfactory flatness thereof is maintained. Therefore, the average displacement amount of the diaphragm 5 can be made large even without changing the maximum displacement amount, and also, it is possible to reduce the thickness (the length in z direction) of the cavity 4 and the distance between the electrode 2 and the electrode 3. In such a manner, the electro-acoustic conversion efficiency can be improved, and a high sensitivity and high output can be realized.

In comparison of the diaphragm 5*n* provided with this beam 7*n* and the diaphragm 5*m* not provided with the beam 7*n*, it is understood that the deflection of the diaphragm 5*n* is small and the central portion thereof hardly contacts the electrode 2 on the substrate 1.

(Eighth Embodiment)

Figure 33:
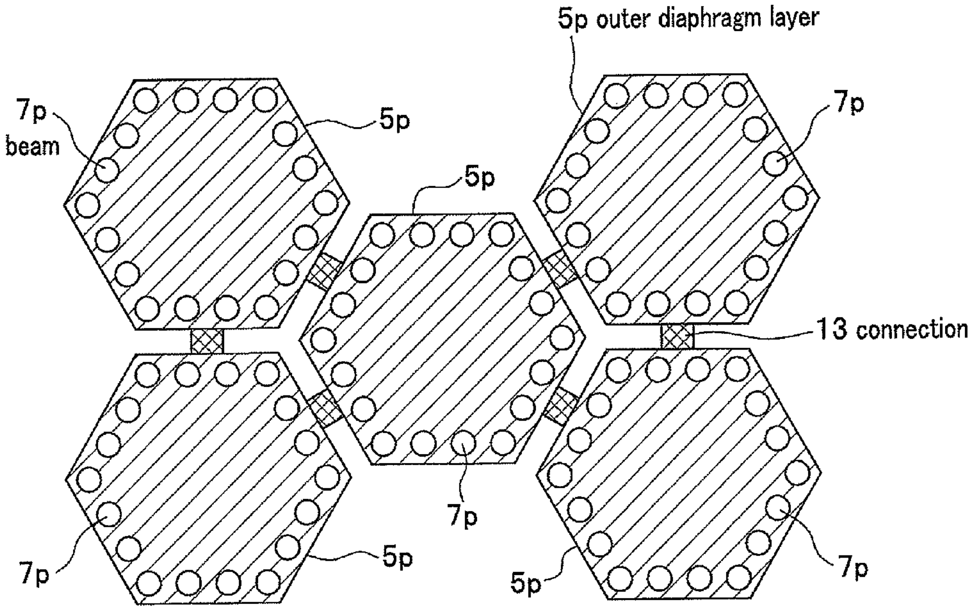
FIG. 33 is a plan view of an outer diaphragm layer in an eighth embodiment.

FIG. 33 is a plan view of an outer diaphragm layer 5*p* in an eighth embodiment.

An ultrasonic transducer 100*f* (not shown) in the eighth embodiment has a structure having an outer diaphragm layer 5*p* instead of the above described outer diaphragm layer 5*b*.

This outer diaphragm layer 5*p* is provided with a number of beams 7*p* in a hole (or hollow) shape at the marginal portion of a planar shape. Similarly to the above described beam 7*n*, these many beams 7*p* lower the stiffness of the marginal portion of the outer diaphragm layer 5*p* and relatively improve the stiffness of the planar portion enclosed by the beams 7*p*.

Thus, with this ultrasonic transducer 100*f* in the eighth embodiment, the same effects as the ultrasonic transducer 100*e* in the seventh embodiment can be achieved.

(Ninth Embodiment)

Figure 34:
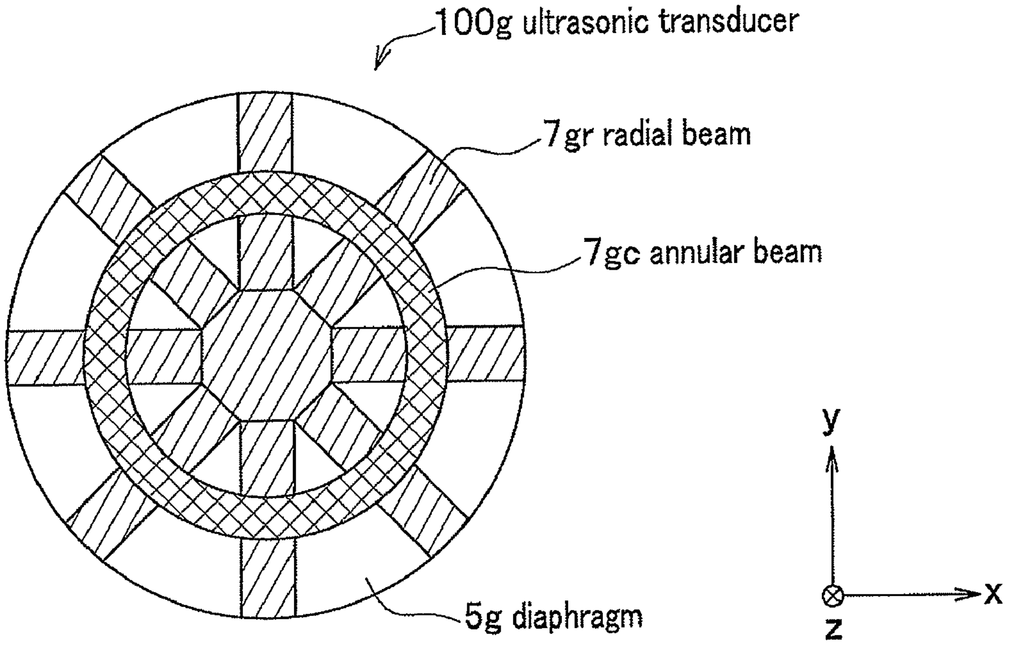
FIG. 34 is a plan view of an ultrasonic transducer in a ninth embodiment.

FIG. 34 is a plan view of an ultrasonic transducer 100*g* in a ninth embodiment.

This ultrasonic transducer 100*g* includes a circular diaphragm 5*g*, radial beams 7*gr* disposed radially on the top surface of the diaphragm 5*g*, and an annular beam 7*gc* disposed likewise. Herein, the diaphragm 5*g* may be in an ellipse shape.

(Tenth Embodiment)

Figure 35:
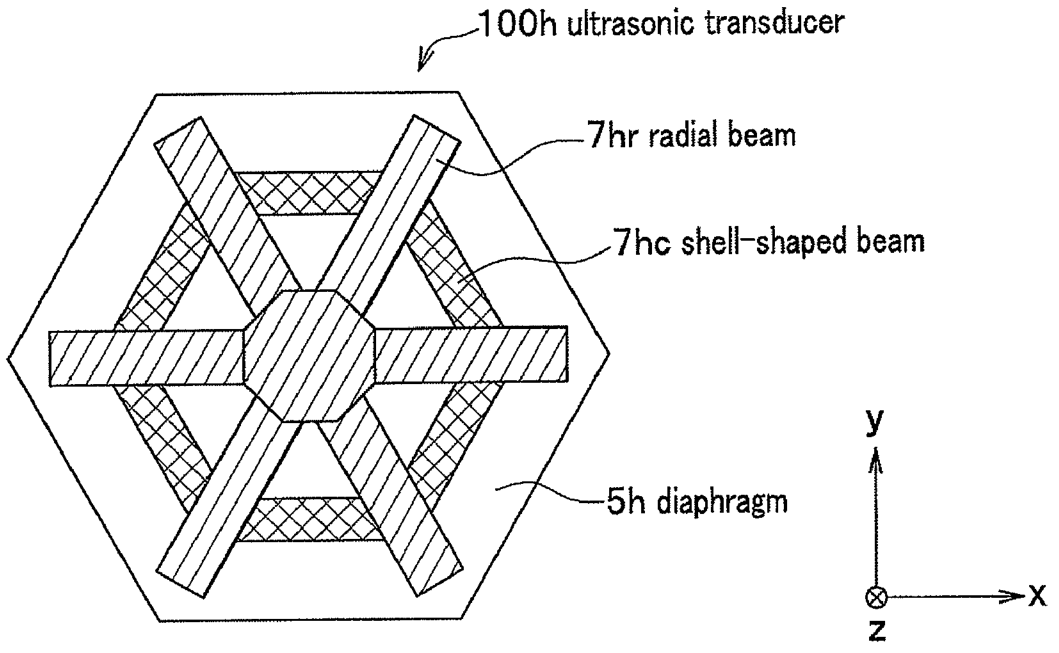
FIG. 35 is a plan view of an ultrasonic transducer in a tenth embodiment.

FIG. 35 is a plan view of an ultrasonic transducer 100*h* in a tenth embodiment.

This ultrasonic transducer 100*h* includes a diaphragm 5*h* in a hexagonal shape, radial beams 7*hr* disposed radially on the top surface of the diaphragm 5*h*, and a cell shaped beam 7*hc* disposed along the inner margin of the diaphragm 5*h* likewise. The hexagonal shape is an example, and the shape of the diaphragm 5*h* may be a triangle, pentagon, heptagon, or another polygon.

As examples, the above described radial beams 7*gr* are provided in a quantity of four (in eight directions from the center) in the ninth embodiment, and the above described radial beams 7*hr* are provided in a quantity of three (in six directions from the center) in the tenth embodiment. However, a suitable number of such beams may be provided, depending on the shapes of the diaphragms 5*g* and 5*h*, desired frequency spectrum and the like. Further, in the cases described in the ninth embodiment and the tenth embodiment, the annular beam 7*gc* in the ninth embodiment and the cell shaped beam 7*hc* in the tenth embodiment are provided respectively in a single quantity, as examples. However, a suitable number of such beams may be provided, concentrically for example, depending on the shapes of the diaphragms 5*g* and 5*h*, desired frequency spectrum and the like.

(Eleventh Embodiment)

Figure 36:
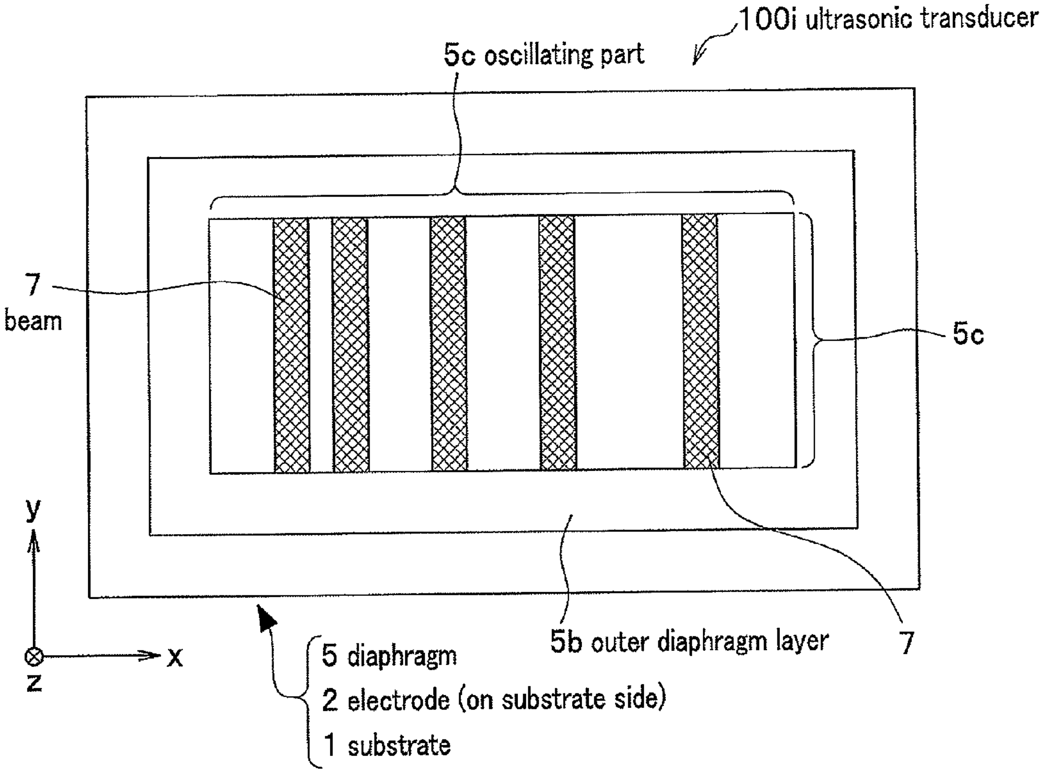
FIG. 36 is a plan view of an ultrasonic transducer in an eleventh embodiment.

FIG. 36 is a plan view of an ultrasonic transducer 100*i* in an eleventh embodiment.

This ultrasonic transducer 100*i* has a structure having plural beams 7 which are elongated in y direction and disposed at uneven intervals.

In the ultrasonic transducer 100*i* in the eleventh embodiment, the distribution of stiffness of the oscillating part 5*c* of a diaphragm 5 can be partially adjusted and an oscillation mode can be desirably inhibited or excited, by suitably setting the pitches of disposing the plural beams 7.

(Twelfth Embodiment)

Figure 37:
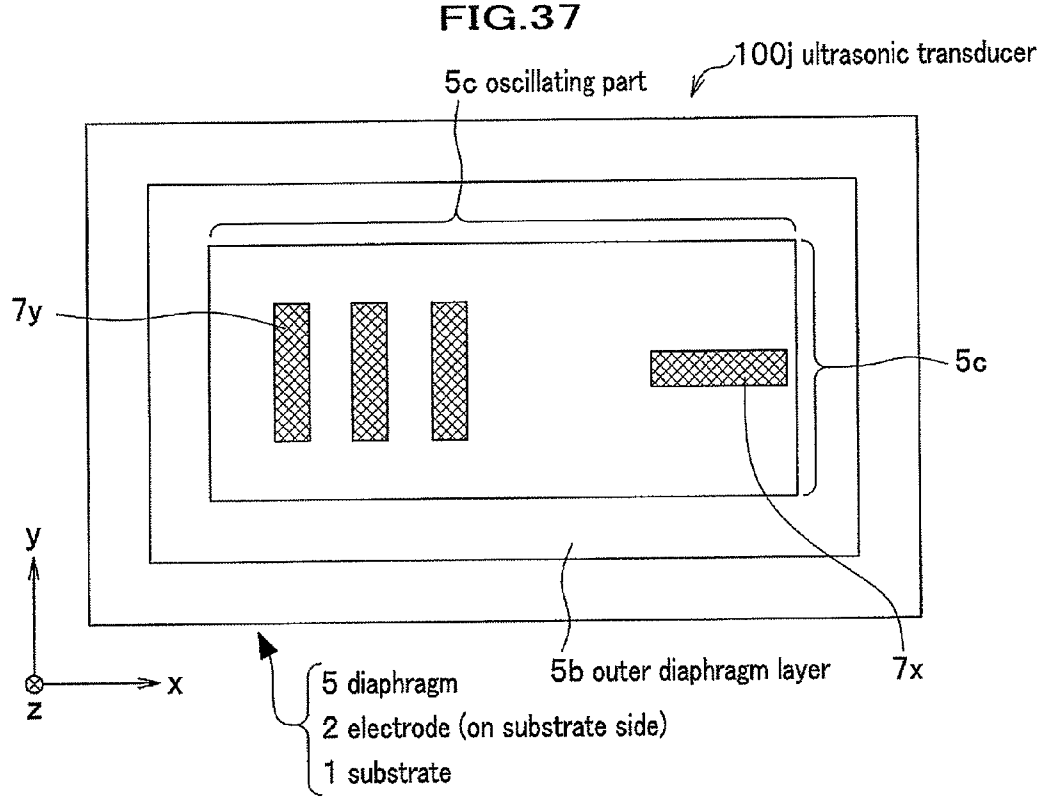
FIG. 37 is a plan view of an ultrasonic transducer in a twelfth embodiment.

FIG. 37 is a plan view of an ultrasonic transducer 100*j*, in a twelfth embodiment, for which the long axis directions of beams 7 are set to different directions.

This ultrasonic transducer 100*j* has a structure having a beam 7*x* which is elongated in x direction and shorter in the long axis direction thereof than the length in x direction of an oscillating part 5*c* of a diaphragm 5, beams 7*y* which are elongated in y direction and shorter in the long axis direction thereof than the length in y direction of the oscillating part 5*c* of the diaphragm 5, the beams 7*x* and 7*y* being arranged on an outer diaphragm layer 5*b*.

In such a manner, the beam 7*x* and 7*y* having different long axis directions may be disposed in mixture at different positions on the same diaphragm 5. Further, the beams 7*x* and 7*y* may have lengths shorter than the planar dimensions of the oscillating part 5*c*, depending on the purpose. Still further, the dimensions of the beams 7*x* and 7*y* may be different from each other.

With the ultrasonic transducer 110*j* in the twelfth embodiment, an oscillation mode/modes can be desirably inhibited or excited for each part of the oscillating part 5*c*, by suitably setting the positions, pitches, quantity of the beams 7*y* and 7*x*.

(Thirteenth Embodiment)

Figure 38:
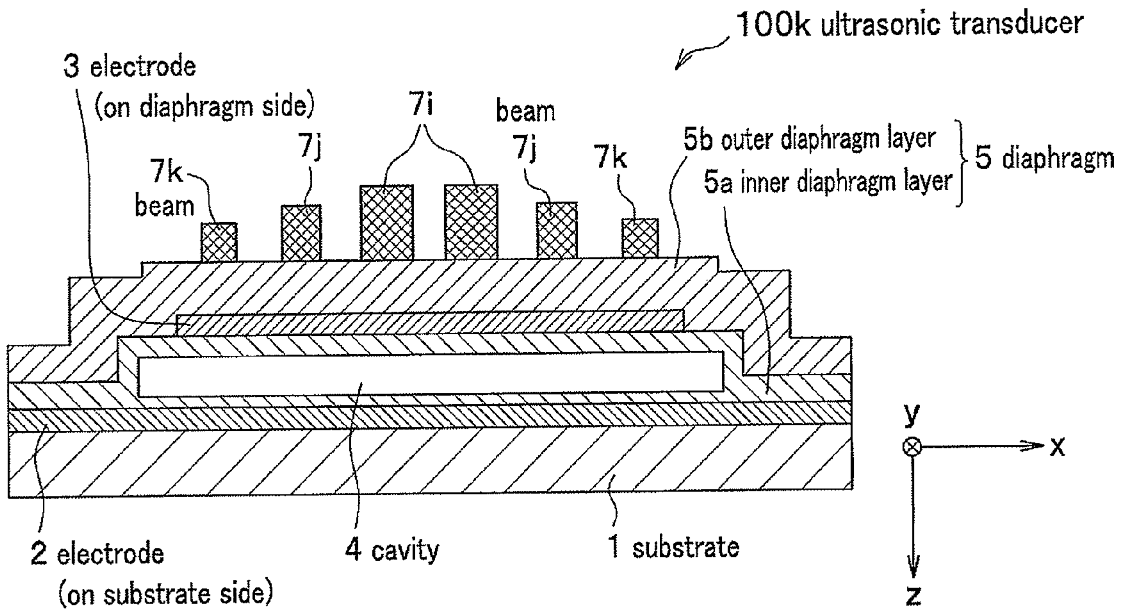
FIG. 38 is a vertical cross-sectional view of an ultrasonic transducer in a thirteenth embodiment.

FIG. 38 is a vertical cross-sectional view of an ultrasonic transducer 100*k* in a thirteenth embodiment.

This ultrasonic transducer 100*k* has a structure having beams 7*i*, 7*j* and 7*k* which are elongated in y direction, have different cross-sections perpendicular to the long axis, and are disposed in mixture on a diaphragm 5.

In this example, on the diaphragm 5, the beams 7*i* having the largest cross-section are disposed adjacent to the center of the diaphragm 5, the beams 7*j* having a smaller cross-section than the beams 7*i* are disposed outside the beams 7*i*, and the beams 7*k* having a smaller cross-section than the beams 7*j* are disposed outside the beams 7*j*. Thus, the stiffness of the portion in the vicinity of the center of the diaphragm 5 is greatly reinforced while the stiffness is less reinforced toward the marginal portion of the diaphragm 5. This disposition is an example and the order of disposing the beams 7*i*, 7*j* and 7*k* may be changed.

With the ultrasonic transducer 100*k* in the thirteenth embodiment, the distribution of stiffness of the diaphragm 5 can be adjusted, and thereby, desired oscillation modes and resonance frequencies f for the respective oscillation modes can be obtained.

(Fourteenth Embodiment)

Figure 39:
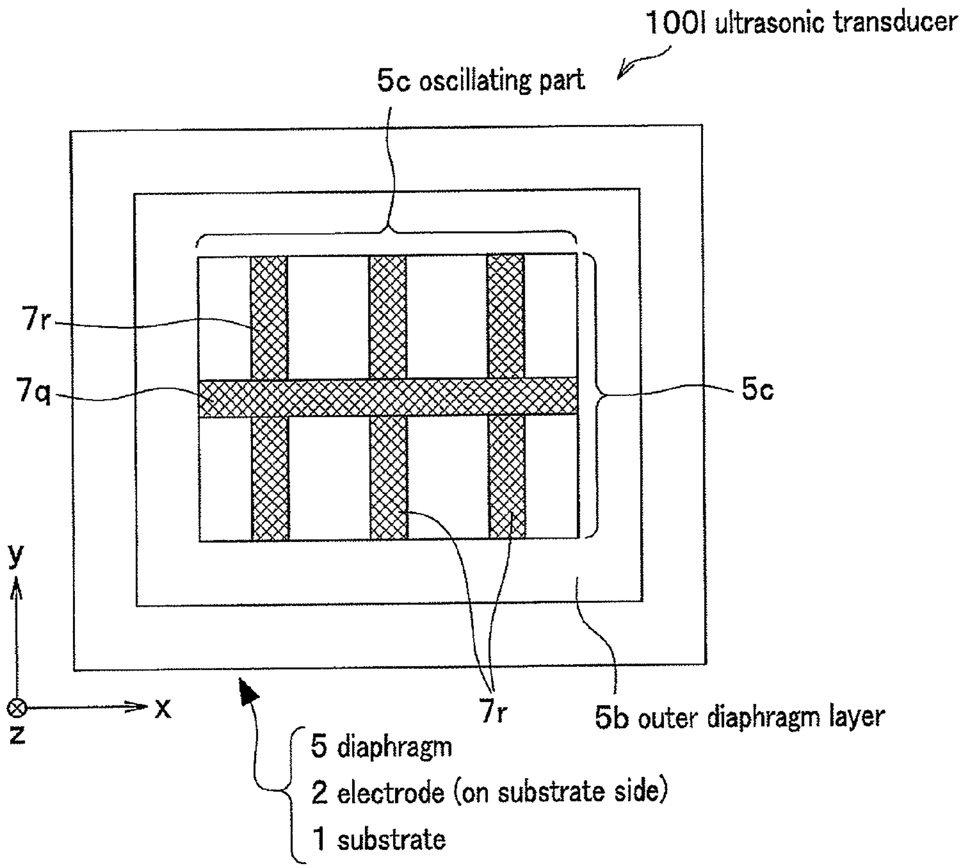
FIG. 39 is a plan view of an ultrasonic transducer in a fourteenth embodiment.

FIG. 39 is a plan view of an ultrasonic transducer 1001, in a fourteenth embodiment, provided with beams 7 of which long axes intersect with each other.

This ultrasonic transducer 1001 has a structure having a beam 7*q* elongated in x direction (horizontal direction in the figure) and beams 7*r* elongated in y direction (vertical direction in the figure) on the top surface of an outer diaphragm layer 5*b*.

In this ultrasonic transducer 1001, the stiffness of the diaphragm 5 with respect to x direction (horizontal direction in the figure) can be changed by the horizontally elongated beam 7*q*, and also, the stiffness of the diaphragm 5 with respect to y direction (vertical direction in the figure) can be changed by the vertically elongated beams 7*r*. Accordingly, even when the planar shape and dimensions of the oscillating part 5*c* of the diaphragm 5 are predetermined, it is possible to independently and arbitrarily set the resonance frequency $f_{bx}$ of an oscillation mode in x direction and the resonance frequency $f_{by}$ of an oscillation mode in y direction.

In this ultrasonic transducer 1001, the planar shape of the oscillating part 5*c* of the diaphragm 5 is substantially a square shape. However, the stiffness of this oscillating part 5*c* is reinforced by the single beam 7*q* elongated in x direction and the three beams 7*r* elongated in y direction. Herein, assuming that the stiffness of the beam 7*q* and the stiffness of each of the beams 7*r* are equal to each other, the oscillating part 5*c* of the diaphragm 5 has a small stiffness in x direction and a large stiffness in y direction despite the substantially square shape thereof.

Thus, by changing the stiffness (cross-sectional area in the short axis direction, material or the like), disposition direction, quantities and the like of beams 7*q* and 7*r*, it is possible to set desired oscillation modes and desired resonance frequencies f for the respective oscillation modes. Herein, the beam 7*q* and each beam 7*r* may be joined with each other, or may intersect with each other in stories with respect to z direction (perpendicular direction to the sheet of the figure).

By the ultrasonic transducers 100, 100*b* to 1001 in the respective embodiments, the following effects can be obtained, for example.

(1) Since beams (beam 7 and the like) are arranged for diaphragms (diaphragm 5 and the like), the thickness of a diaphragm (diaphragm 5 or the like) and the thickness of a beam (beam 7 or the like) can be independently changed, and the balance between the stiffness and the mass of the oscillating part 5*c* can be set freely, which allows control of the sensitivity G and fractional bandwidth $f_h$, achieving a desired center frequency $f_c$.

(2) By adjusting the thickness of a diaphragm (diaphragm 5 or the like) and the thickness of a beam (beam 7 or the like), the frequency spectrum (resonance frequency $f_b$ and fractional bandwidth $f_h$) of the diaphragm (diaphragm 5 or the like) can be changed without changing the planar shape (longitudinal and lateral dimensions) of the diaphragm (diaphragm 5 or the like) and the beam (beam 7 or the like).

(3) Since the frequency spectrum can be changed without changing the planar shape (dimensions in x and y directions) of a diaphragm (diaphragm 5 or the like) and a beam (beam 7 or the like), flexible manufacturing can be carried out using the same manufacturing equipment and the same mask (not shown) by changing the control of a manufacturing process, allowing reduction in time and cost.

COMPARATIVE EXAMPLE

Next, a comparative example will be described, referring to FIGS. 40 and 41.

Figure 40:
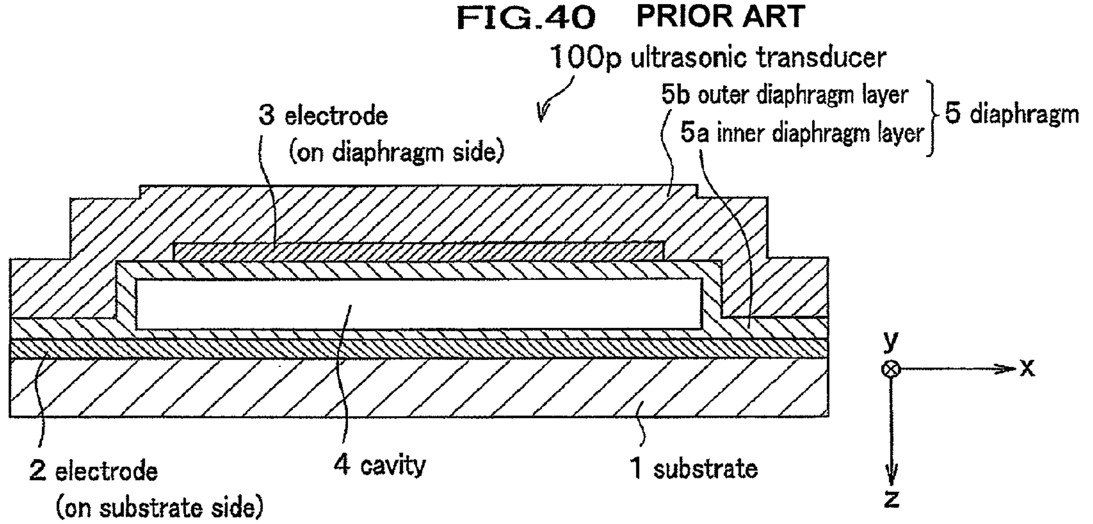
FIG.40 PRIOR ART
FIG. 40 is a vertical cross-sectional view of an ultrasonic transducer of a comparative example (conventional example)

FIG. 40 is a vertical cross-sectional view of an ultrasonic transducer 100*p* of a Comparative Example.

This ultrasonic transducer 100*p* has the same structure as the ultrasonic transducer 100 (refer to FIG. 18) in the third embodiment except that no beam 7 is arranged.

Figure 41:
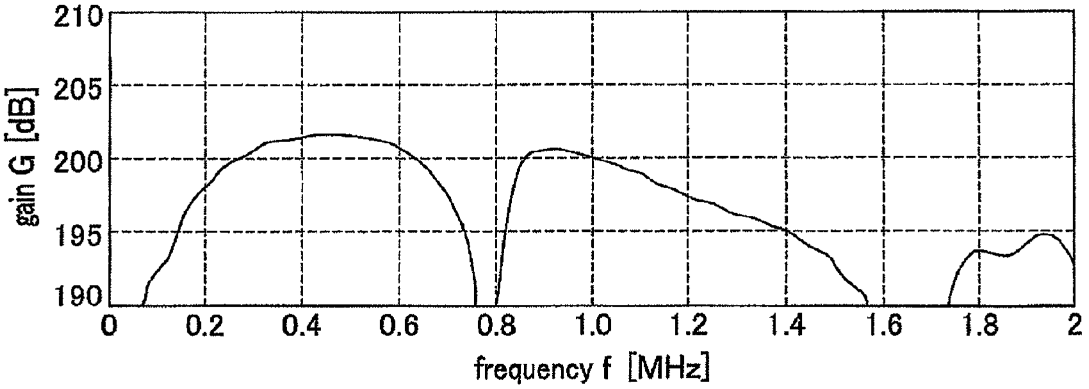
FIG. 41 is a diagram of a graph showing the frequency versus gain response of a diaphragm in a rectangular planar shape with a ratio of longitudinal length to lateral length of 1:2.

FIG. 41 is a diagram of a graph showing the frequency versus gain response of a diaphragm 5 in a rectangular planar shape with a ratio of longitudinal length to lateral length of 1:2.

A notch (an area where gain G rapidly drops) appears near 0.8 MHz on the graph. Accordingly, there is a problem that the value of the frequency versus gain response of the diaphragm 5 is not flat. This notch is generated by the bonding between the lateral oscillation mode and the longitudinal oscillation mode. Therefore, it is understood that one of the oscillation modes can be inhibited and thereby notch is restricted by changing the longitudinal and/or lateral stiffness.

For example, instead of setting the ratio of longitudinal length to lateral length to 1:2, by making the ratio of longitudinal length to lateral length extremely large or small (in other words, making the planar shape of the diaphragm 5 extremely elongated), it is expected that affect by either the longitudinal oscillation mode or the lateral oscillation mode is substantially eliminated, notch is restricted, and a flat frequency spectrum can be obtained over a broadband. However, a diaphragm 5 with a ratio of longitudinal length to lateral length which is extremely large or small enough to restrict notch has problems of extreme difficulty of manufacturing and impracticability.

EXAMPLES

The inventors produced design examples of the ultrasonic transducer 100 (refer to FIG. 18) in the third embodiment and the ultrasonic transducer 100*p* of the comparative example, as described later. Design values were input in details to a computer, highly accurate numerical simulation was carried out regarding characteristic in water, and a result was compared with the calculation result described above (refer to FIG. 24).

For both the ultrasonic transducers 100 and 100*p*, the substrate 1 is formed of silicon, the diaphragm 5 is formed of silicon nitride, and the electrodes 2 and 3 are formed of aluminum. The vertical dimension (up-and-down direction, namely y direction, in FIG. 19) of the diaphragm 5 was set to 40 μm, and the length in the direction perpendicular to this direction on the same plate surface (left-right direction, namely x direction, in FIG. 19) was set approximately to 400 μm. These dimensions were set such as to make the vertical length/horizontal length ratio small enough, considering prevention of unnecessary oscillation modes from being excited. Further, the total thickness of the electrode 2 on the substrate 1 side and the substrate 1 is large enough for the displacement to be neglected substantially. The beams 7 of the ultrasonic transducer 100 are formed of the same material as the diaphragm 5.

For the ultrasonic transducer 100 in the third embodiment, the width w of the beams 7 was set to 20 percent of the pitch between the beams 7. In order to have the resonance frequency $f_b$ of the diaphragm 5 in the third embodiment be the same as that of the diaphragm 5 in the comparative example and make the fractional bandwidth $f_h$ of the diaphragm 5 in the third embodiment is 1.5 times as wide as that in the comparative example, and based on the calculation result (refer to FIG. 24), the diaphragm 5 of the ultrasonic transducer 100 was made 0.54 times as thick as the diaphragm 5 of the ultrasonic transducer 100*p* of the comparative example, and the beams 7 were made 0.66 times as thick as this diaphragm 5 of the ultrasonic transducer 100*p*. Herein, the thicknesses of electrode 2, cavity 4 and electrode 3 were made the same as those of the ultrasonic transducer 100*p* of the comparative example.

For the ultrasonic transducer 100*p* of the comparative example, the cavity 4 above the electrode 2 on the substrate 1 side was formed 300 nm thick, and the inner diaphragm layer 5*a* was formed 200 nm thick. The electrode 3 on the diaphragm 5 side was formed 400 nm thick, and the outer diaphragm layer 5*b* was formed 2000 nm thick.

Figure 42:
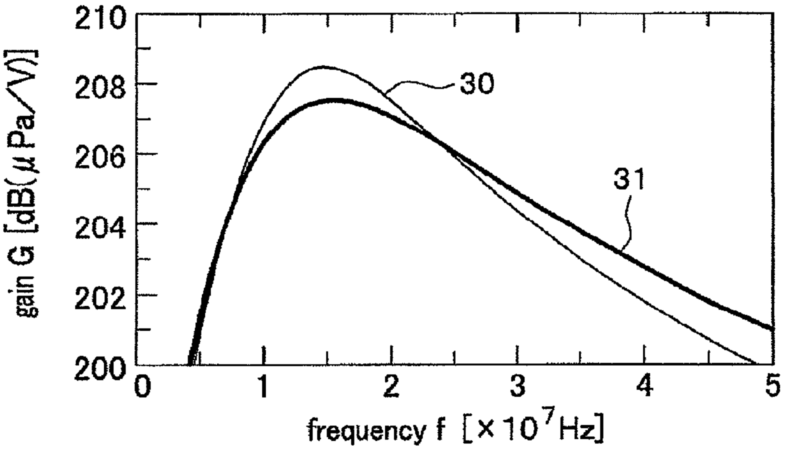
FIG. 42 is a diagram of graphs showing the frequency spectrums in water of the ultrasonic transducer 100 in the third embodiment and the ultrasonic transducer 100*p* of the comparative example.
Figure 43:
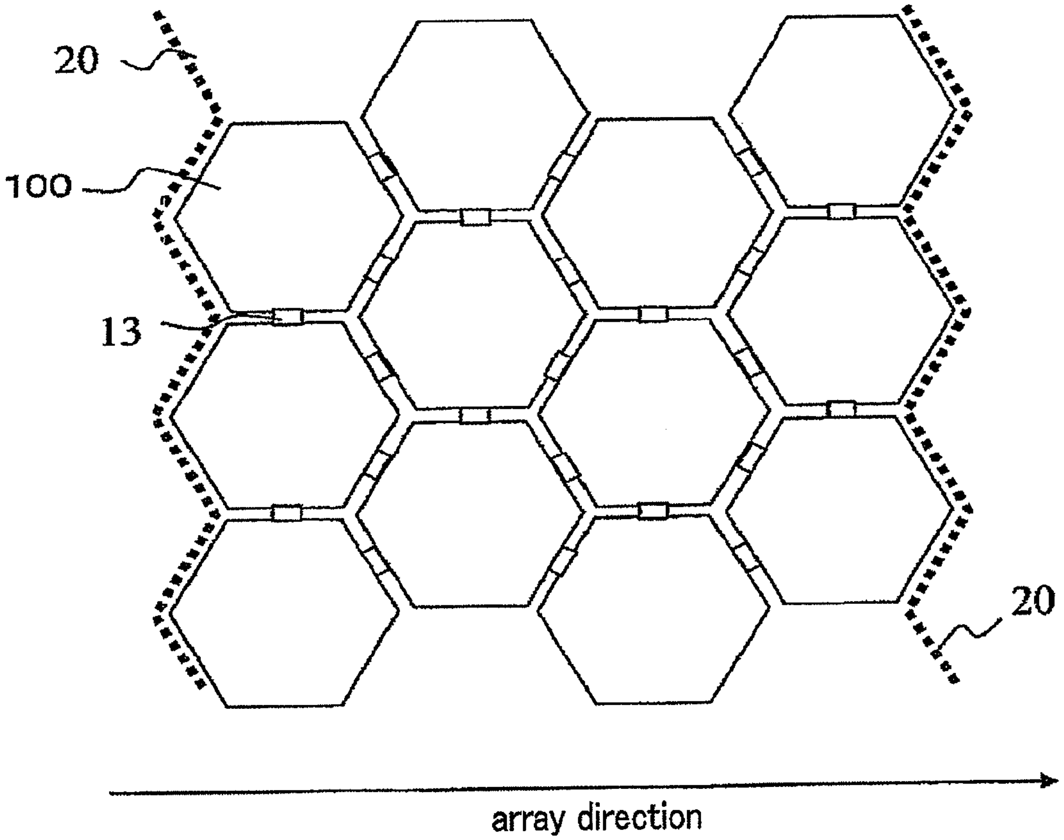
FIG.43 PRIOR ART
FIG. 43 is a top view of a transducer array.

FIG. 42 is a diagram of graphs showing the frequency spectrums in water of the ultrasonic transducer 100 in the third embodiment and the ultrasonic transducer 100*p* of the comparative example.

The value of frequency f is indicated in the horizontal axis direction, and the value of gain G is indicated in the vertical axis direction in a logarithmic scale. A graph 31 represents measured values with the ultrasonic transducer 100 in the third embodiment, and a curve 30 represents measured values with the ultrasonic transducer 100*p* of the comparative example.

For the ultrasonic transducer 100 in the third embodiment, the center frequency $f_c$ was 15.4 MHz and the fractional bandwidth $f_h$ was 157%.

For the ultrasonic transducer 100*p* in the comparative example, the center frequency $f_c$ was 14.8 MHz and the fractional bandwidth $f_h$ was 120%.

Accordingly, it is understood that, when compared with the ultrasonic transducer 100*p* of the comparative example, the ultrasonic transducer 100 in the third embodiment maintains the substantially same value of the center frequency $f_c$, and shows a greater value of the fractional band width $f_h$. This result agree with the tendency of the above described calculated result.

According to the calculation result (refer to FIG. 24), the fractional bandwidth $f_h$ of the ultrasonic transducer 100 in accordance with the invention should be approximately 1.5 times as wide as the fractional bandwidth $f_h$ of the ultrasonic transducer 100*p* of the comparative example. However, according to the result of the numerical simulation (refer to FIG. 42), the ratio is approximately 1.3 times instead of 1.5 times. This is because, while the calculation result (refer to FIG. 24) is based on assumption that the respective elements are homogeneous, the numerical simulation (refer to FIG. 42) follows realistic element structures more faithfully wherein the diaphragm 5 includes the electrode 3 and others and is inhomogeneous accordingly.

There is no practical problem with such a minor difference in most cases. However, for a more accurate calculation result, further accurate calculation may be performed, taking into account effects by other elements, such as the electrode 3, or, a prototype may be produced to adjust calculated values, based on quantitative understanding of the difference between measured values of the prototype and calculated values.

What is claimed is:

1. An ultrasonic probe, comprising:

a substrate; and a plurality of ultrasonic transducers arranged in an array having sub-arrays, on the substrate, wherein each ultrasonic transducer of the plurality of the ultrasonic transducers within a subject sub-array, has a same transducer shape and includes:

a bottom electrode;

a top electrode;

a diaphragm that oscillates together with the top electrode, wherein the diaphragm has a polygonal shape;

a cavity provided between the bottom electrode and the top electrode; and at least one structural beam on at least one of the top electrode and the diaphragm, and that oscillates together with the top electrode and diaphragm;

wherein a planer shape of each said at least one structural beam within the subject sub-array, is the same within the subject sub-array.

2. The ultrasonic probe of claim 1, wherein the diaphragm has a hexagonal shape.

3. The ultrasonic probe of claim 2, wherein each structural beam is formed connecting opposite apexes of the diaphragm.

4. The ultrasonic probe of claim 1, wherein the diaphragm has a rectangular shape.

5. The ultrasonic probe of claim 4, wherein each of the rectangular diaphragms is disposed such that long sides thereof are perpendicular to an array direction of the ultrasonic probe.

6. The ultrasonic probe of claim 4, wherein each of the rectangular diaphragms is disposed such that long sides thereof are along an array direction of the ultrasonic probe.

7. The ultrasonic probe of claim 1, wherein the ultrasonic probe includes a plurality of the structural beams having different widths, and wherein each structural beam provided for a same diaphragm has a same width.

8. The ultrasonic probe of claim 1, wherein an interval between adjacent diaphragms is shorter than or equal to 1/80 of a wavelength at a peak frequency, of the ultrasounds propagating in the substrate.

9. The ultrasonic probe of claim 1, wherein the plurality of the ultrasonic transducers are disposed in a direction perpendicular to an array direction of the ultrasonic probe and form a sub-element with the respective top electrodes electrically connected with each other.

10. The ultrasonic probe of claim 9, comprising a cross point switch for changing a manner of bundling the sub-element.

11. The ultrasonic probe of claim 1, wherein the at least one structural beam is provided on at least one of a surface of or inside of the diaphragm or on the top electrode.

12. The ultrasonic probe of claim 1, wherein the at least one structural beam is more particularly a plurality of structural beams having long axis directions which intersect with each other.

13. The ultrasonic probe of claim 1, wherein the at least one structural beam is formed of a material with a Young's modulus larger or smaller than that of the diaphragm.

14. The ultrasonic probe of claim 1, wherein the at least one structural beam is formed of a same material as that of the top electrode and is formed in a single body including the top electrode.

15. The ultrasonic probe of claim 1, wherein the at least one structural beam is formed of a same material as that of the top electrode.

16. The ultrasonic probe of claim 1, wherein a cross-section of the at least one structural beam with respect to a long axis direction or a short axis direction thereof, has a circular or polygonal shape.

17. The ultrasonic probe of claim 1, wherein the at least one structural beam is more specifically a plurality of structural beams which are disposed at uneven intervals.

18. The ultrasonic probe of claim 1, wherein the at least one structural beam is more specifically a plurality of structural beams which are disposed such that long axis directions thereof include different directions from each other.

19. The ultrasonic probe of claim 1, wherein the at least one structural beam has a shape joining a first beam part in contact with the diaphragm and a second beam part with a smaller dimension with respect to a short axis than that of the first beam part such that long axes of the first and second beams are in a same direction.

20. The ultrasonic probe of claim 1, wherein the planar shape of the at least one structural beam is rectangular.

21. The ultrasonic probe of claim 1, further comprising a connection line electrically connected in common to the plurality of the ultrasonic transducers within the subject sub-array.

22. The ultrasonic probe of claim 1, wherein the at least one structural beam of the ultrasonic transducer is configured with a customized height to provide a customized frequency to the ultrasonic transducer.

23. The ultrasonic probe of claim 1, wherein another construction feature of a first said at least one structural beam, other than the planar shape, is customized in a first predetermined manner to effect a first oscillation frequency of said first said at least one structural beam together with the top electrode and diaphragm, and another construction feature of a second said at least one structural beam, other than the planar shape, is customized in a second predetermined manner to effect a second oscillation frequency of said second said at least one structural beam together with the top electrode and diaphragm.

24. The ultrasonic probe of claim 1, wherein the another construction feature of the first or the second said at least one structural beam, other than the planar shape, which is customized, is one of a height feature and a material-composition.

* * * * *